(12) United States Patent
Ashizawa et al.

(10) Patent No.: US 7,251,007 B2
(45) Date of Patent: Jul. 31, 2007

(54) LIQUID CRYSTAL DISPLAY DEVICE HAVING PARTICULAR SEMICONDUCTOR LAYER

(75) Inventors: Keiichiro Ashizawa, Mobara (JP); Masayuki Hikiba, Mobara (JP); Masuyuki Ohta, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/153,467

(22) Filed: Jun. 16, 2005

(65) Prior Publication Data

US 2005/0275784 A1 Dec. 15, 2005

Related U.S. Application Data

(63) Continuation of application No. 10/779,794, filed on Feb. 18, 2004, now Pat. No. 6,912,033, which is a continuation of application No. 10/400,686, filed on Mar. 28, 2003, now Pat. No. 6,697,142, which is a continuation of application No. 10/038,599, filed on Jan. 8, 2002, now Pat. No. 6,545,736, which is a continuation of application No. 09/234,494, filed on Jan. 21, 1999, now Pat. No. 6,341,003.

(30) Foreign Application Priority Data

Jan. 23, 1998 (JP) .................................. 10-11543

(51) Int. Cl.
G02F 1/1343 (2006.01)
G02F 1/1333 (2006.01)

(52) U.S. Cl. ...................... 349/141; 349/139; 349/143; 349/110

(58) Field of Classification Search ................ 349/141, 349/139, 143, 145, 146, 110
See application file for complete search history.

(56) References Cited

U.S. PATENT DOCUMENTS

| | | | |
|---|---|---|---|
| 5,600,464 A | * | 2/1997 | Ohe et al. ................... 349/123 |
| 5,745,207 A | | 4/1998 | Asada et al. |
| 5,754,266 A | * | 5/1998 | Ohta et al. ................... 349/139 |
| 5,852,485 A | | 12/1998 | Shimada et al. |
| 5,870,160 A | * | 2/1999 | Yanagawa et al. .......... 349/141 |
| 5,907,379 A | | 5/1999 | Kim |
| 5,949,511 A | | 9/1999 | Park |
| 5,978,059 A | | 11/1999 | Ohta et al. |
| 5,986,735 A | * | 11/1999 | Komatsu .................... 349/128 |
| 5,995,186 A | | 11/1999 | Hiroshi |
| 6,014,190 A | | 1/2000 | Kim et al. |
| 6,052,168 A | | 4/2000 | Nishida |
| 6,100,955 A | | 8/2000 | Yanagawa et al. |
| 6,111,625 A | | 8/2000 | Ohta et al. |
| 6,160,601 A | | 12/2000 | Sato |

(Continued)

*Primary Examiner*—Mike Qi
(74) *Attorney, Agent, or Firm*—Antonelli, Terry, Stout & Kraus, LLP.

(57) ABSTRACT

A display device includes a first substrate having formed thereon a plurality of video signal lines and a plurality of gate signal lines, a plurality of pixel electrodes, a plurality of thin film transistors, and a plurality of pixels. Each pixel includes a pixel electrode of the plurality of pixel electrodes and a thin film transistor of the plurality of thin film transistors. The thin film transistor includes a semiconductor layer, a drain electrode electrically connected to a drain signal line, and a source electrode electrically connected to the pixel electrode. The semiconductor layer has an outline so that a nearest portion to a center of the pixel is positioned under the source electrode in plan view.

8 Claims, 35 Drawing Sheets

U.S. PATENT DOCUMENTS

| | | |
|---|---|---|
| 6,188,459 B1 | 2/2001 | Kim |
| 6,233,034 B1 | 5/2001 | Lee et al. |
| 6,281,957 B1 * | 8/2001 | Oh et al. .................... 349/141 |
| 6,335,770 B1 | 1/2002 | Komatsu |
| 6,337,726 B1 | 1/2002 | Kawano et al. |
| 6,400,436 B1 | 6/2002 | Komatsu |

* cited by examiner $x = \sqrt{r^2-(r-h)^2}$

Fig. 27
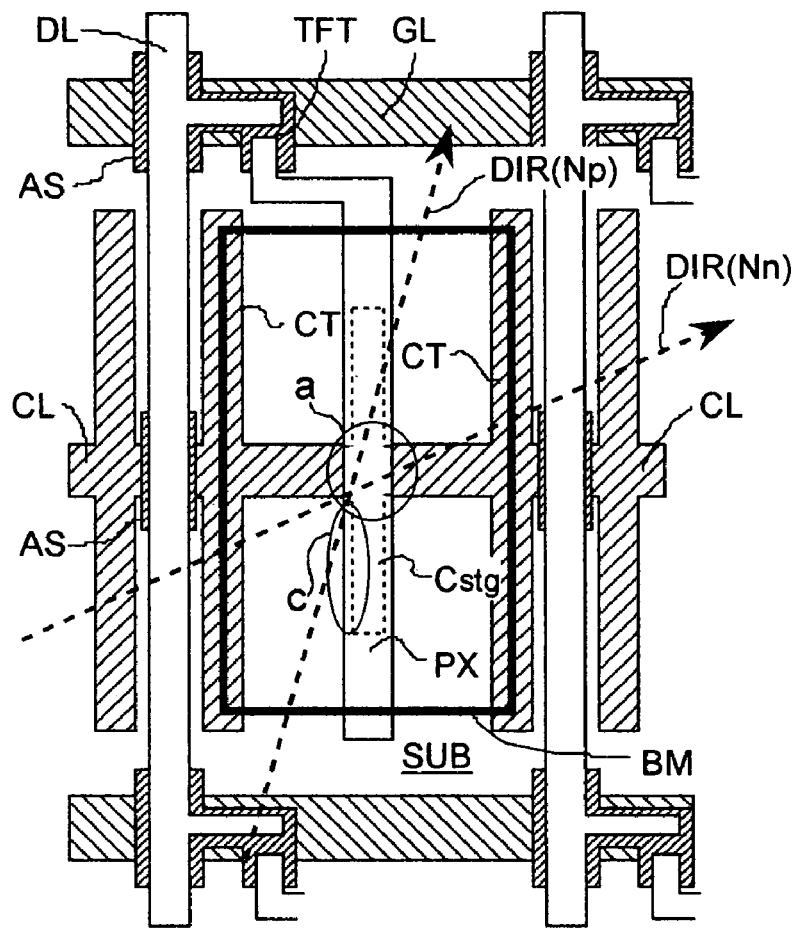
Fig. 28
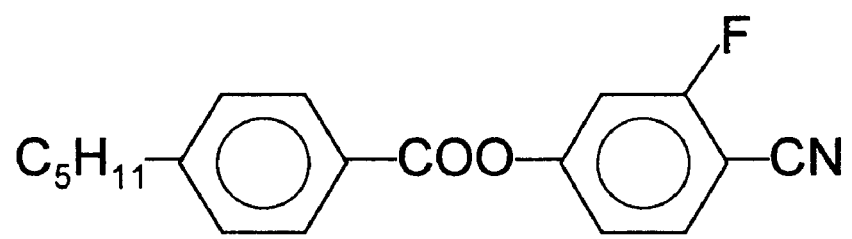
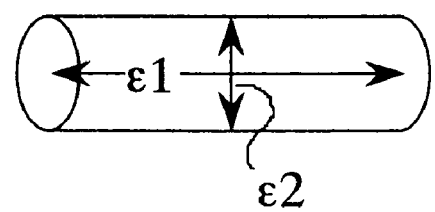

Fig. 29(A)
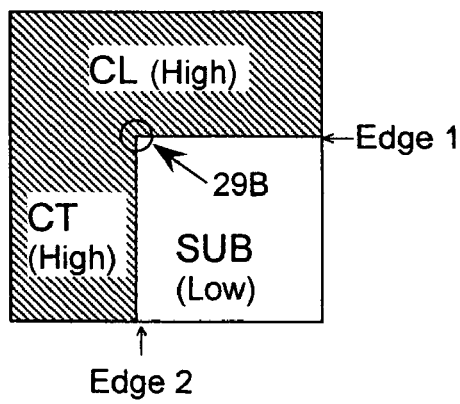
Fig. 29(B)
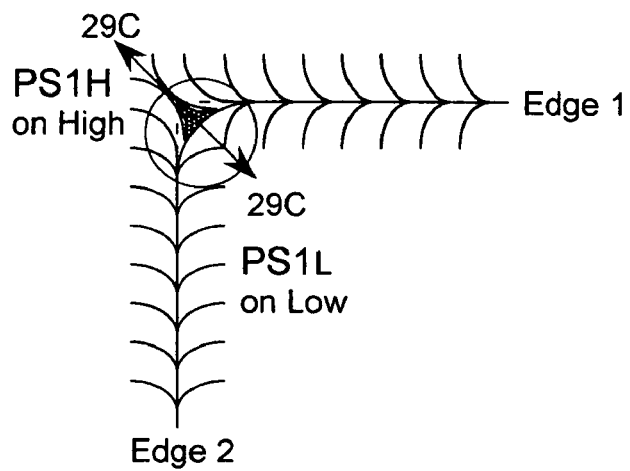
Fig. 29(C)
Fig. 29(D)
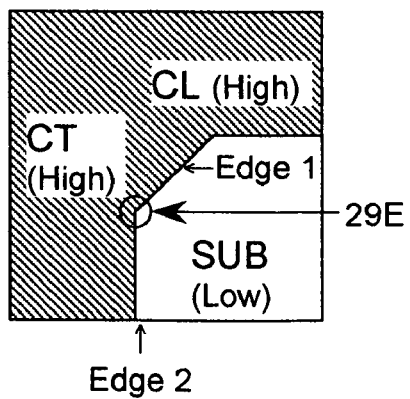
Fig. 29(E)
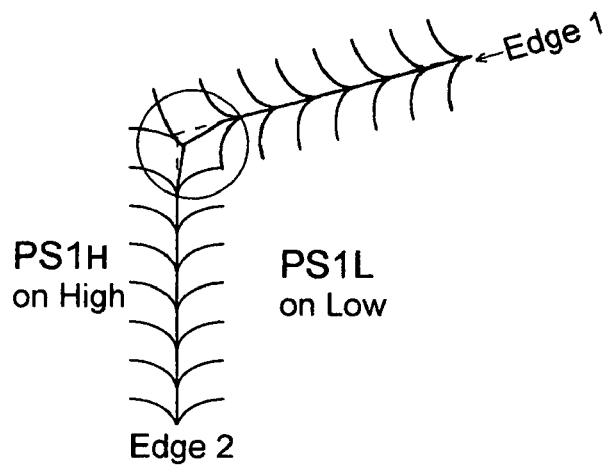

LIQUID CRYSTAL DISPLAY DEVICE HAVING PARTICULAR SEMICONDUCTOR LAYER

CROSS REFERENCE TO RELATED APPLICATION

This is a continuation of U.S. application Ser. No. 10/779,794, filed Feb. 18, 2004 now U.S. Pat. No. 6,912,033, which is a continuation of U.S. application Ser. No. 10/400,686, filed Mar. 28, 2003, now U.S. Pat. No. 6,697,142, which is a continuation of U.S. application Ser. No. 10/038,599, filed Jan. 8, 2002, now U.S. Pat. No. 6,545,736, which is a continuation of U.S. application Ser. No. 09/234,494, filed Jan. 21, 1999, now U.S. Pat. No. 6,341,003, the subject matter of which is incorporated by reference herein.

BACKGROUND OF THE INVENTION

1. Field of the Invention

The present invention relates to a liquid crystal display device and, more specifically, to a liquid crystal display device in which a pair of insulating substrates are opposed to each other via a predetermined gap that is maintained by spacers, a liquid crystal composition (a liquid crystal molecule) is held in the gap, and a storage capacitor portion is formed in each pixel region.

2. Description of the Related Art

High-resolution liquid crystal display devices capable of color display for use in notebook-sized computers and computer monitors are now widely utilized.

Basically, in this type of liquid crystal display device, what is called a liquid crystal panel is formed by holding a layer of a liquid crystal composition between two insulating substrates (hereinafter also referred to simply as substrates) such as glass plates at least one of which is transparent. This type of liquid crystal display device is generally classified into a type (simple matrix type) in which an image is formed by changing the orientation directions of liquid crystal molecules of desired pixels by selectively applying voltages to various electrodes for pixel formation that are formed on the insulating substrates of the liquid crystal panel and a type (active matrix type) in which various electrodes for pixel formation and active elements for pixel selection are formed and an image is formed by changing the orientation directions of liquid crystal molecules of desired pixels by making selections from the active elements.

In general, the active matrix liquid crystal display device employs that is called a vertical electric field type in which electric fields are developed between electrodes formed on one substrate and an electrode formed on the other substrate.

On the other hand, the liquid crystal display device of what is called a lateral electric field type (also called as In-Plane Switching type, abbreviated as "IPS type" hereinafter) has been put into practical use in which the directions of electric fields that act on the liquid crystal layer are approximately parallel with the substrate surfaces. In an example of the lateral electric field type liquid crystal display device, a very wide viewing angle is obtained by forming comb-teeth electrodes for electric field formation on one of the two substrates.

In the lateral electric field liquid crystal display device, an active matrix substrate is provided with scanning signal lines and video signal lines, switching elements formed in the vicinity of the crossing points of the scanning signal lines and the video signal lines, pixel electrodes to which drive voltages are applied via the respective switching elements, and counter electrodes that are formed in the same plane as the pixel electrodes. A color filter substrate is provided with a black matrix made of a resin composition and color filter layers formed for each pixel in an opening region of the black matrix. A liquid crystal panel is formed by holding a liquid crystal composition between the active matrix substrate and the color filter substrate. The liquid crystal display device is configured in such a manner that a backlight is disposed in the rear of the liquid crystal panel and a unified structure is obtained by using top and bottom cases.

Image display is performed by changing the light transmittance of the liquid crystal compound by electric field components that are formed between the pixel electrodes and the counter electrodes so as to extend approximately parallel with the substrate surfaces.

In contrast to the vertical electric field type one, the lateral electric field type liquid crystal display device is superior in viewing angle; that is, it allows a user to view a clear image even when he is located at a position that forms a large angle with the display screen.

The liquid crystal display device having the above configuration is disclosed in Japanese Unexamined Patent Publication No. Hei. 6-160878 and its counterpart U.S. Pat. Nos. 5,598,285, and 5,737,051, for example.

FIG. 1 is a plan view showing one pixel, a light shield region of a black matrix BM, and its vicinity of a conventional lateral electric field type liquid crystal display device.

As shown in FIG. 1, each pixel is provided in a region enclosed by four signal lines that cross each other, that is, a scanning signal line (gate signal line or horizontal signal line) GL, a counter voltage signal line CL, and two adjacent video signal lines (drain signal line or vertical signal line) DL.

Each pixel includes a thin-film transistor TFT, a storage capacitor portion Cstg, a pixel electrode PX, and an counter electrode CT. In FIG. 1, a plurality of scanning signal lines GL and counter voltage signal lines CL are provided at the top and bottom of the pixel direction so as to extend in the right-left or horizontal direction. A plurality of video signal lines DL are provided at the right-left side of the pixel so as to extend in the top-bottom or vertical direction. The pixel electrode PX is connected to the thin-film transistor TFT, and the counter electrode CT is integral with the counter voltage signal line CL.

The pixel electrode PX and the counter electrode CT confront each other, and display is controlled by modulating transmission light or reflection light by controlling the orientation state of a layer of a liquid crystal composition LC (hereinafter also referred to simply as a liquid crystal or a liquid crystal layer) by means of an electric field developed between the pixel electrode PX and the counter electrode CT. Each of the pixel electrode PX and the counter electrode CT assumes a comb-teeth shape and has long and narrow portions extending in the top-bottom or vertical direction in FIG. 1.

The pixel electrode PX and the counter electrode CT are formed in such a manner that the number P of comb-teeth portions of the pixel electrode PX and number C of comb-teeth portions of the counter electrode CT in one pixel necessarily satisfy a relationship C=P+1 (in FIG. 1, C=2 and P=1). The comb-teeth portions of the counter electrode CT and those of the pixel electrode PX are arranged alternately so as to have the comb-teeth portions of the counter electrode CT arranged adjacent to the video signal lines DL. With this structure, shielding from electric lines of force originating from the video signal lines DL can be effected by the counter electrode CT so that electric fields between the counter electrode CT and the pixel electrode PX are not influenced by the electric fields originating from the video signal lines.

The potential of the counter electrode CT is stable because it is always supplied with a potential externally via the counter voltage signal line CL. Therefore, the counter electrode CT has almost no potential variation even if it is adjacent to the video signal lines DL. Further, the above structure makes the geometrical position of the pixel electrode PX more distant from the video signal lines DL, whereby the parasitic capacitances between the pixel electrode PX and the video signal lines DL are greatly reduced and hence a variation of a pixel electrode potential Vs due to video signal voltages can be controlled.

As a result, vertically extending crosstalk lines (an image quality failure called vertical smears) can be prevented.

In a specific construction, widths Wp and Wc of the pixel electrode PX and the counter electrode CT, respectively, are set at 6 μm, which is sufficiently larger than 4.5 μm which is the maximum setting thickness of a liquid crystal layer (described later). It is desirable that the electrode widths Wp and Wc be sufficiently larger than 5.4 μm because it is preferable to provide a margin of 20% or more in view of processing variations in manufacture. As a result, electric field components parallel with the substrate surfaces that are applied to the liquid crystal layer become stronger than those perpendicular to the substrate surfaces, which prevents voltages for driving the liquid crystal to become unduly high. It is preferable that the maximum values of the electrode widths Wp and Wc be smaller than an interval L between the pixel electrode PX and the counter electrode CT. This is because it the interval between the electrodes is too short, electric lines of force are curved sharply and hence regions where electric field components parallel with the substrate surfaces are stronger than those perpendicular to the substrate surfaces are made larger, as a result of which the electric field components parallel with the substrate surfaces cannot be applied to the liquid crystal layer efficiently. To give a margin of 20% to the interval L between the pixel electrode PX and the counter electrode CT, it is necessary that the interval L be larger than 7.2 μm. For example, in a case of constructing a liquid crystal display device having a diagonal size of about 14.5 cm (5.7 inches) and a resolution of 640×480 dots, an interval L that is larger than 7.2 μm can be realized by setting the pixel pitch at about 60 μm and dividing each pixel into two parts.

To avoid disconnection, the electrode width of the video signal lines DL is set at 8 μm, which is somewhat larger than the widths of the pixel electrode PX and the counter electrode CT. To avoid short-circuiting, an interval of about 1 μm is provided between the video signal lines DL and the counter electrode CT. The video signal lines DL and the counter electrode CT are provided in different layers by forming the video signal lines DL and the counter electrode CT above and below a gate insulating film, respectively. On the other hand, the interval between the pixel electrode PX and the counter electrode CT is changed in accordance with the liquid crystal material used, for the following reason. The electric field intensity for attaining the maximum transmittance depends on the liquid crystal material. To obtain the maximum transmittance within the range of the maximum amplitude of a signal voltage that is set by the breakdown voltage of a video signal driver circuit (signal-side driver) used, the electrode interval needs to be set in accordance with the liquid crystal material. The electrode interval becomes about 15 μm when a liquid crystal material that will be described later is used.

In the example configuration being discussed, in a plan view of FIG. 1, a black matrix BM surrounds an opening of the pixel and is formed on the gate line GL, the counter voltage signal line CL, the thin-film transistor TFT, and the drain lines DL, and between the counter electrode CT and the drain lines DL. The storage capacitor portion Cstg is located outside the opening of the black matrix BM (i.e., outside the pixel region) and is composed of the pixel electrode PX, the counter voltage signal line CL, and an insulating film formed between them.

In the liquid crystal display device, an alignment film is applied after formation of the respective electrodes and electrode wiring lines, protective films, and insulating films and is given a liquid crystal alignment control ability by being subjected to a treatment called rubbing.

In the conventional lateral electric field type liquid crystal display device, since the storage capacitor portion Cstg is formed outside each pixel region, there is no large height change or steps in the pixel region and hence the alignment film in the pixel region can be given a uniform liquid crystal alignment control ability.

However, in recent years, liquid crystal display devices have been proposed in which the aperture ratio of the entire screen is increased by forming the storage capacitor portion Cstg in each pixel region. In those devices, the storage capacitor Cstg produces large steps in the pixel region and those steps may cause an alignment defect in a rubbing treatment. As a result, what is called a domain occurs and causes display unevenness.

In particular, alignment defects of the above kind occur frequently in a case where the multilayered film structure that constitutes the storage capacitor portion Cstg has steps extending perpendicularly or approximately perpendicularly to the alignment direction (rubbing direction) of the alignment film. When such an alignment defect occurs, the liquid crystal does not operate normally in the vicinity of the storage capacitor portion Cstg, to cause a domain. This results in a problem that the contrast is lowered and display unevenness occurs, which means a marked reduction in image quality.

SUMMARY OF THE INVENTION

An object of the present invention is to provide a liquid crystal display device having good display quality by solving the above problems in the art, specifically by decreasing the frequency of occurrence of alignment defects that result from the presence of steps of the storage capacitor portion Cstg formed in each pixel region and thereby preventing display failures such as a contrast reduction and display unevenness.

To attain the above object, in the invention, edge sectional shapes of steps of a multilayered film structure formed in each pixel region (actually each opening region of a black matrix), in particular steps of multilayered films such as electrode that constitute a storage capacitor portion, are made gentle.

Specifically, the invention provides a liquid crystal display device comprising an active matrix substrate comprising a plurality of scanning signal lines, a plurality of video signal lines, switching elements formed in the vicinity of respective crossing points of the scanning signal lines and the video signal lines, pixel electrodes to which drive voltages are applied via the respective switching elements, counter electrodes formed in a different plane than the pixel electrodes; a color filter substrate comprising a black matrix made of a resin composition, and color filter layers provided for respective pixels formed in respective opening regions of the black matrix; a liquid crystal composition held between the active matrix substrate and the color filter substrate; and storage capacitor portions located in the respective opening regions of the black matrix, each of the storage capacitor portions being composed of a counter voltage signal line for supplying a signal to an associated one of the counter electrodes, a pixel electrode, and an insulating film provided between the counter voltage signal line and the pixel electrode, wherein image display is performed by varying the light transmittance of the liquid crystal composition by electric field components that develop between the pixel electrodes and the counter electrodes so as to extend approximately parallel with the substrate surfaces, and wherein one of a portion of the counter voltage signal line and a portion of the pixel electrode which form the storage capacitor have an outline within that of the other of the portion of the counter voltage signal line and the portion of the pixel electrode.

With the above configuration, the angles of steps in the storage capacitor portions with respect to the surface of an alignment film become gentle, whereby rubbing defects can be prevented from occurring in the vicinity of the storage capacitor portions. As a result, it becomes possible to provide a liquid crystal display device having good display quality in which the frequency of occurrence of display failures such as a contrast reduction and display unevenness are greatly reduced.

In the above liquid crystal display device, most of a projected outline shape of the portion of one of the counter voltage signal line and the pixel electrode arranged in an upper layer may be located inside a projected outline shape of the portion of the other of the counter voltage signal line and the pixel electrode arranged in a lower layer.

In the above liquid crystal display device, most of a projected outline shape of the portion of one of the counter voltage signal line and the pixel electrode arranged in a lower layer may be located inside a projected outline shape of the portion of the other of the counter voltage signal line and the pixel electrode arranged in an upper layer.

With the above two features, the angles of steps of the electrode films constituting the storage capacitor portions with respect to the surface of an alignment film become gentle, whereby rubbing defects can be prevented from occurring in the vicinity of the storage capacitor portions. As a result, it becomes possible to provide a liquid crystal display device having good display quality in which the frequency of occurrence of display failures such as a contrast reduction and display unevenness are greatly reduced.

These features can be not only applied to the pixel electrode and the pixel, but also to a pair of conductive layers extending in transverse directions and crossing one another in the pixel region and at least one of the conductive layers including the branch portion extending from the crossing in the direction of extension of the other of the conductive layers within the pixel region. The pixel region is defined as a region formed on the liquid crystal display substrate and transmitting light to be modulated by the liquid crystal layer.

Where multilayered films such as electrode films, insulating films, and protective films are formed in each pixel region, the invention is not limited to the case where the multilayered films are ones belonging to the storage capacitor portion.

The second object of the invention is to prevent the liquid crystal display device from display failures caused by the reduction of the voltage applied to its liquid crystal layer.

This problem appears the liquid crystal display having such two kinds of conductive layers defined as first and second conductive layers as follows. The first and second conductive layers are formed above a main surface of one of substrates facing to the liquid crystal layer. The first conductive layer extends in first direction, and has a first voltage. The second conductive layer extends in second direction, and has a second voltage. Each of the first and second conductive layers has at least one portion therefrom in a different direction and joined thereto at a corner, and is covered with an insulating film.

When the first voltage differs from the second voltage, the display failures appear in the liquid crystal layer. Namely, applying the different electrical signals or voltages the first and second conductors induces this problem, even if the first and second conductive layers are isolated from one another by an insulating film, or are formed on the main surfaces of different substrates from one another.

To attain this object, the invention forms the corner with at least one of a curve and at least one obtuse.

Specifically, the invention provides following two structures for the liquid crystal display device having a pixel electrode, an counter electrode, and an counter voltage signal line for supplying a signal to the counter electrode formed between a liquid crystal layer and one of a pair of substrates sealing the liquid crystal layer therebetween.

One of the structures is described that the counter voltage signal line extending in one direction crosses the pixel electrode extending in a transverse direction, at least one of the counter voltage signal line and the pixel electrode has branch portions extending in the direction of extension of the other the counter voltage signal line and the pixel electrode, and edges of the counter voltage signal line and the pixel electrode with the branch portions thereof are connected with at least one of a curve and at least one obtuse angle.

The other of the structures is described that the counter voltage signal line extending in one direction is connected to the counter electrode extending in transverse direction to the one direction so as to connect their edges with at least one of a curve and at least one obtuse, and the counter voltage signal line and the pixel electrode cross one another.

In both of the inventions, the pixel electrode, the counter electrode, the counter voltage signal line, and the substrate on which these electrodes and the signal line are covered with an insulating layer, and preferably the insulating film formed on the pixel electrode is different from that formed on the counter electrode and the counter voltage signal line. The crossing region in accordance to an overlapping of the counter voltage signal line and the pixel electrode is formed in the light transmission region delimited by a light shielding material.

The detailed structures of this invention will be explained later.

BRIEF DESCRIPTION OF THE DRAWINGS

FIGS. 20(A) and 20 (B) are sectional views taken along line 20A-20A in FIG. 16 and line 20B-20B in FIG. 19, respectively;

FIGS. 27 is a plan view of another kind of the electrode structures for reducing the alignment defect during the rubbing treatment;

FIG. 28 is an explanatory figure showing relationship between one of actual liquid crystal molecules and its model used in this specification;

FIGS. 29(A)-29(E) are explanatory figures showing the relationship between the electrode structure and a shape of a protective films formed thereon, FIGS. 29(A)-29(C) show the electrode structure and the protective film formed thereon in circled portion e of FIG. 14(A), and FIGS. 29(D) and 29(E) shows the improved electrode structure and the protective film formed thereon;

FIGS. 30(A)-30(C) show the electrode structure and the protective film formed thereon in circled portion a of FIG. 14(A), and FIGS. 30(D) and 30(E) shows the improved electrode structure and the protective film formed thereon;

DETAILED DESCRIPTION

1. Details of a Liquid Crystal Display Device

First of all, the details of the liquid crystal display device to which the inventions mentioned above are applied will be described with reference to FIGS. 2 to 12.

<Sectional Structure of Matrix Area (Pixel Portions)>

Figure 2:
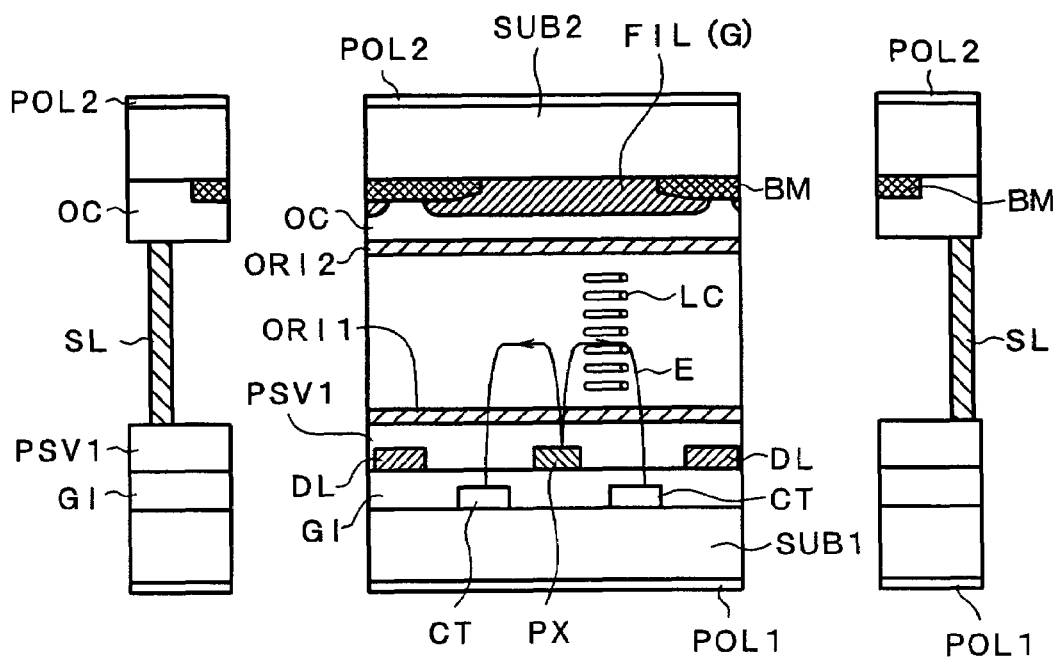
FIGS. 2(A)-2(C) is a sectional view of electrodes for one pixel (FIG. 2(A)) and their vicinity (FIGS. 2(B), 2(C)) in an image display area and substrate peripheral portions of a liquid crystal panel that constitutes a lateral electric field type liquid crystal display device.
Figure 3:
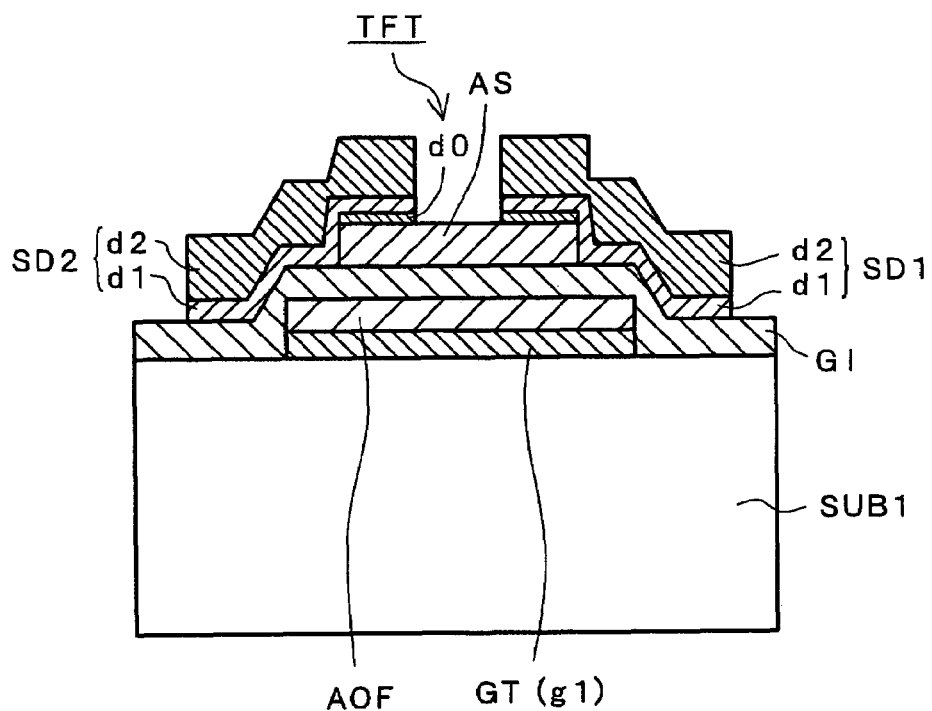
FIG. 3 is a sectional view of a thin-film transistor TFT.

FIG. 2 is a sectional view of electrodes for one pixel (FIG. 2(A)) and left and right side sectional views (FIGS. 2(B) and 2(C)) in an image display area and substrate peripheral portions of a liquid crystal panel that constitutes a lateral electric field type liquid crystal display device. FIG. 3 is a sectional view of a thin-film transistor TFT. As shown in FIG. 2(A), in the lateral electric field type liquid crystal panel, a thin-film transistor TFT, a storage capacitor Cstg (not shown), and electrodes (a counter electrode CT, a pixel electrode PX, a video signal line DL, etc.) are formed on a bottom substrate (transparent glass substrate) SUB1. Color filters FIL and a pattern of a light shield black matrix BM are formed on a top substrate (transparent glass substrate) SUB2. It is possible to form a pattern of the light shield black matrix BM on the bottom transparent glass substrate SUB1 as proposed in Japanese Patent Publication No. Hei. 8-806463. An alignment film ORI1 and an alignment film ORI2 for controlling the liquid crystal initial alignment are formed on the inside surfaces (i.e., the surfaces on the side of a liquid crystal LC) of the respective transparent glass substrates SUB1 and SUB2. Polarizing plates POL1 and POL2 are provided on the outside surfaces of the respective transparent glass substrates SUB1 and SUB2 so that their polarizing axes are perpendicular to each other (crossed Nicols arrangement).

TFT Substrate{tc\l1 "TFT substrate}

Next, the components provided on the side of the bottom transparent glass substrate SUB1 (TFT substrate) will be described in detail.

<Thin-Film Transistor>

The thin-film transistor TFT operates in such a manner that the source-drain channel resistance of decreases when a positive bias is applied to a gate electrode GT and increases when no bias is applied. As shown in FIG. 3, the thin-film transistor TFT has the gate electrode GT, a gate insulating film GI, an i-type semiconductor layer AS made of an i-type (intrinsic; not intentionally doped with any conductivity type determining impurity) amorphous silicon (a-Si), and a source electrode SD1 and a drain electrode SD2 that are paired. Essentially, the source and drain are determined depending on the polarity of a bias that is applied between them. It should be understood that the source and drain are interchanged because the bias polarity is changed during operation in the circuit of this liquid crystal display device. However, for convenience of description, the source and drain will be fixed in the following description.

Gate Electrode GT{tc\l1 "Gate Electrode GT}

The gate electrode GT is formed so as to be continuous with a scanning signal line GL; that is, part of the scanning signal line GL serves as the gate electrode GT. The gate electrode GT is so formed as to be larger than and hence cover completely the active region, that is, the i-type semiconductor layer AS, of the thin-film transistor TFT (when viewed from below). Therefore, the gate electrode GT plays not only its original role but also a role of preventing ambient light and back light from entering the i-type semiconductor layer AS. In this example, the gate electrode GT is a single-layer conductive film g1, which is a sputtered aluminum (Al) film, for instance. An Al anodic oxide film AOF is formed on the conductive film g1.

<Scanning Signal Line GL>

The scanning signal line GL is formed in the same manufacturing process as the gate conductive film g1 and is integral with it. A gate voltage Vg is supplied to the gate electrode GT from an external circuit via the scanning signal line GL. An Al anodic oxide film AOF is also formed on the scanning signal line GL. To decrease the probability of short-circuiting with the video signal line DL, the scanning signal line GL is made narrower at the position where it crosses the video signal line DL. Further, the scanning signal line GL is branched into two parts so that even if short-circuiting occurs the short-circuited line can be separated by laser trimming.

<Counter Electrode CT>

The counter electrode CT is a conductive film g1 that is in the same layer as the gate electrode GT and the scanning signal line GL. An Al anodic oxide film AOF is also formed on the counter electrode CT. Since the counter electrode CT is completely covered with the anodic oxide film AOF, it is not short-circuited with the video signal line DL even if it is made closer to the video signal line DL infinitely.

It is possible to cross the counter electrode CT and the video signal line DL with each other. A counter electrode voltage Vcom is applied to the counter electrode CT. In this embodiment, the counter electrode voltage Vcom is set at a potential which is lower than the middle DC potential of a minimum-level drive voltage Vdmin and a maximum-level drive voltage Vdmax that are applied to the video signal line DL by a feed-through voltage $\Delta Vs$ that occurs when the thin-film transistor TFT is turned off. When it is desired to approximately reduce the power supply voltage of integrated circuits used in a video signal driver circuit by one half, an AC voltage may be applied to the counter electrode CT.

<Counter Voltage Signal Line CL>

The counter voltage signal line CL (see FIG. 1) is formed in the same manufacturing step as the conductive films g1 of the gate electrode GT, the scanning signal line GL, and the counter electrode CT, and is integral with the counter electrode CT. The counter electrode voltage Vcom is supplied to the counter electrode CT from an external circuit via the counter voltage signal line CL. An Al anodic oxide film AOF is also formed on the counter voltage signal line CL. As in the case of the scanning signal line GL, to decrease the probability of short-circuiting with the video signal line DL, the counter voltage signal line GL is made narrower at the position where it crosses the video signal line DL. Further, the scanning signal line CL may be branched into two parts so that even if short-circuiting occurs the short-circuited line can be separated by laser trimming.

<Insulating Film GI>

In the thin-film transistor TFT, the insulating film GI serves as a gate insulating film for applying an electric field to the semiconductor layer AS in cooperation with the gate electrode GT. The insulating film GI is formed in a layer above the layer of the gate electrode GT and the scanning signal line GL. For example, the insulating film GI is a silicon nitride film formed at a thickness of 120-270 nm (in this embodiment, 240 nm) by plasma CVD. The gate insulating film GI is so formed as to surround the entire matrix portion AR. Peripheral portions of the insulating film GI are removed to expose external connection terminals DTM and GTM. The insulating film GI also contributes to electrically insulating the scanning signal line GL and the counter voltage signal line CL from the video signal line DL.

<i-Type Semiconductor Layer AS>

The i-type semiconductor layer AS is formed with amorphous silicon at a thickness of 20-220 nm (in this embodiment, about 200 nm). Layers d0 are $n^+$-type amorphous silicon semiconductor layers for ohmic contact that are doped with phosphorus (P). The i-type semiconductor layer AS exists under the layers d0. The layers d0 are left only in areas where conductive films d1 (and d2) exist over the layers d0.

At the crossing portion of the scanning signal line GL and the video signal line DL and the crossing portion of the counter voltage signal line CL and the video signal line DL, i-type semiconductor layers AS are also provided between those lines. These i-type semiconductor layers AS decrease the possibility of short-circuiting between those lines at the crossing portions.

<Source Electrode SD1 and Drain Electrode SD2>

Each of the source electrode SD1 and the drain electrode SD2 is composed of the conductive film d1 that is in contact with the $n^+$-type semiconductor layer d0 and the conductive film d2 that is formed on the conductive film d1. The conductive film d1 is a chromium (Cr) film formed at a thickness of 50-100 nm (in this embodiment, about 60 nm) by sputtering. The thickness of the Cr film should not exceed about 200 nm because the stress increases with the thickness. The Cr film serves to provide good adhesion with the $n^+$-type semiconductor layer d0 and to prevent Al of the conductive film d2 from diffusing into the $n^+$-type semiconductor layer d0; that is, the Cr film is used as what is called a barrier layer.

Other examples of the conductive film d1 are refractory metal films (Mo, Ti, Ta, and W) and refractory metal silicide films ($MoSi_2$, $TiSi_2$, $TaSi_2$, and $WSi_2$).

The conductive film d2 is formed at a thickness of 300-500 nm (in this embodiment, 400 nm) by sputtering Al. The Al film can be formed to have a large thickness because the stress in the Al film is smaller than in the Cr film. The Al film serves to decrease the resistance values of the source electrode SD1, the drain electrode SD2, and the video signal line DL and to facilitate covering the steps caused by the gate electrode GT and the i-type semiconductor layers AS (i.e., improve the step coverage).

After the conductive films d1 and d2 have been patterned by using the same mask pattern, part of a film for forming the $n^+$-type semiconductor layer d0 is removed by using the same mask or using the conductive films d1 and d2 as a mask. That is, the portion of the film for forming the $n^+$-type semiconductor layer d0 except the portions under the conductive films d1 and d2 is removed in a self-aligned manner. Since the etching is performed so as to remove the entire thickness of the film for forming the $n^+$-type semiconductor layer d0, a slight surface portion of the i-type semiconductor layer AS is also etched. The degree of etching of the i-type semiconductor layer AS may be controlled by the etching time.

<Video Signal Line DL>

The video signal line DL is composed of a second conductive film d2 and a third conductive film d3 that are in the same layer as the source electrode SD1 and the drain electrode SD2. The video signal line DL is formed so as to be integral with the drain electrode SD2.

<Pixel Electrode PX>

The pixel electrode PX is composed of a second conductive film d2 and a third conductive film d3 that are in the same layer as the source electrode SD1 and the drain electrode SD2. The pixel electrode PX is formed so as to be integral with the source electrode SD1.

<Storage Capacitor Cstg>

Figure 1:
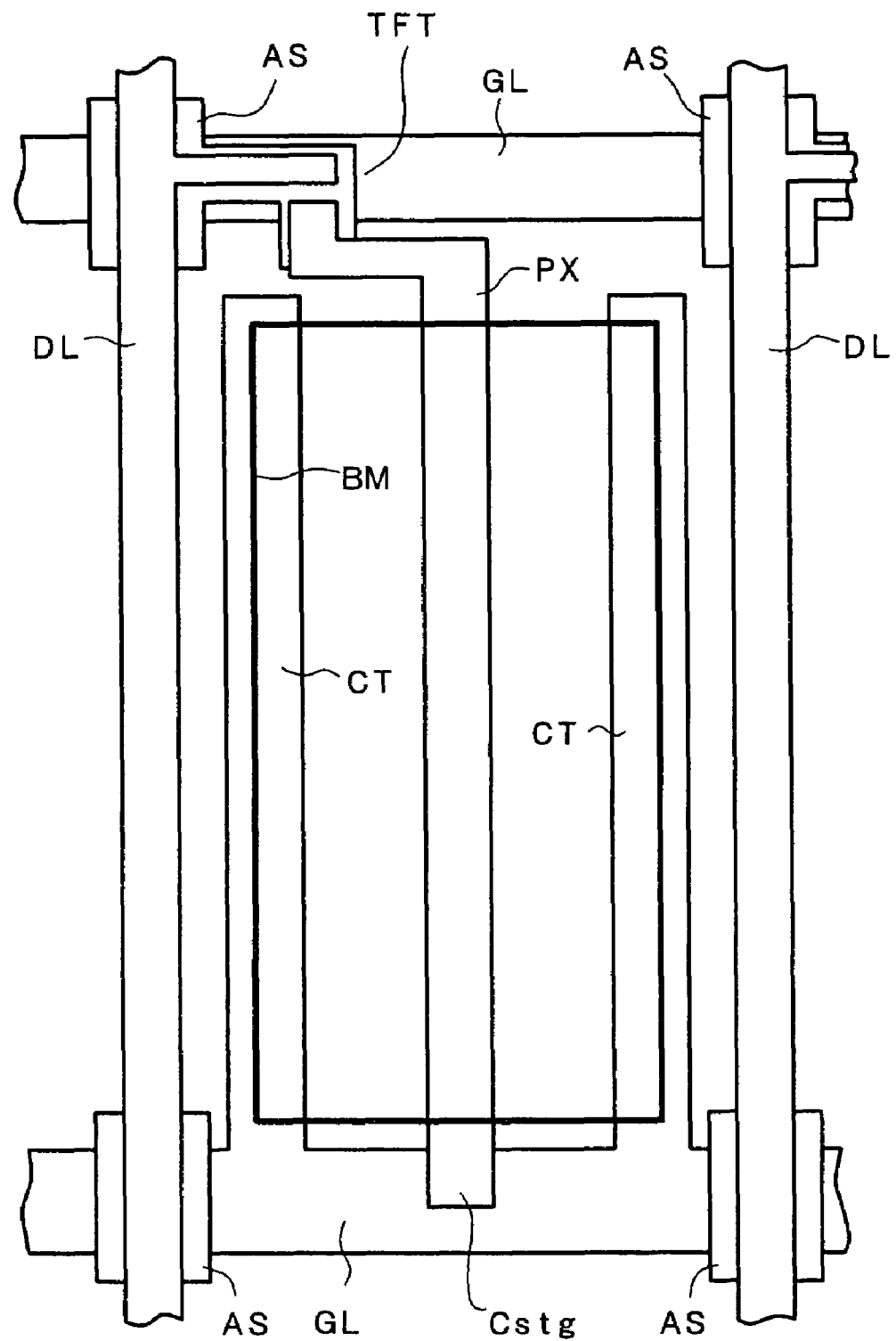
FIG. 1 is a plan view showing one pixel, a light shield region of a black matrix BM, and its vicinity of a conventional lateral electric field type liquid crystal display device.

The pixel electrode PX is so formed as to coextend with part of the counter voltage signal line CL at its end as shown in FIG. 1. This coextending structure provides the storage capacitor (capacitor element) Cstg having the pixel electrode PX as one electrode and the counter voltage signal line CL as the other electrode. The dielectric film of the storage capacitor Cstg is composed of the anodic oxide film AOF and the insulating film GI that is for example formed as the passivation film and used as the gate insulating film GI of the thin-film transistor TFT.

Color Filter Substrate{tc\I1 "Color Filter Substrate}

Next, the components provided on the side of the top transparent glass substrate SUB2 (color filter substrate) will be described in detail with reference to FIGS. 2(B), 2(C), and 6.

<Light Shield Film: Black Matrix BM>

The light shield film BM (what is called a black matrix) is formed on the transparent glass substrate SUB2 to prevent a reduction in contrast ratio or the like due to entrance to the display screen side of unnecessary transmission light coming from gaps other than the gaps between the pixel electrode PX and the counter electrode CT. The light shield film BM also serves to prevent ambient light or back light from entering the i-type semiconductor layer AS. That is, since the i-type semiconductor layer AS of the thin-film transistor TFT is sandwiched between the light shield film BM and the gate electrode GT that is larger than usual, ambient natural light or back light does not enter it.

The closed, rectangular outline of the black matrix BM shown in FIG. 1 indicates the opening in which the light shield film BM is not formed. The same indications as FIG. 1 are employed in the other plan-views of the pixel in this specification. The outline pattern shown in those figures is just an example.

In the lateral electric field type liquid crystal display device, the black matrix BM is generally made of a resin composition because its resistivity should be as high as possible. The Japanese Unexamined Patent Publication No. Hei. 9-43589 and its counterpart U.S. Pat. No. 5,831,701 discloses a proper range of the resistivity of the black matrix BM. According to this publication, the resistivity of the liquid crystal composition LC should be larger than $10^N$ $\Omega \cdot cm$ and the resistivity of the black matrix BM should be larger than $10^M$ $\Omega \cdot cm$ where $N \geq 9$ and $M \geq 6$. It is desirable that N and M satisfy relationships $N \geq 13$ and $M \geq 7$. Also for the purpose of reducing the surface reflection of the liquid crystal display device, it is desirable that the black matrix BM be made of a resin composition.

In contrast to a case where the black matrix BM is made of a metal film such as a Cr film, the use of a resin composition makes a metal film etching step unnecessary and hence can simplify a manufacturing process of the color filter substrate. Where a metal film is used, the manufacturing process includes 1) metal film formation, 2) resist application, 3) exposure, 4) development, and 5) resist peeling. On the other hand, where a resin is used, the manufacturing process includes 1) resist application, 2) exposure, and 3) development. Therefore, the process can greatly be shortened.

However, resin compositions have lower light shield performance than metal films. Although making a resin film thicker increases its light shield performance, it increases the thickness variation of the black matrix BM. For example, a thickness variation of 10% means a variation of ±0.1 μm when the thickness of the black matrix BM is 1.0 μm and a variation of ±0.2 μm when it is 2 μm.

Further, making the black matrix BM thicker increases the thickness variation of the color filter substrate, as a result of which it becomes difficult to increase the gap accuracy of the liquid crystal display panel. For the above reasons, it is desirable that the thickness of the resin film be 2 μm or less.

To provide an OD value of about 4.0 or more with a film thickness of 1 μm in a case where blackening is effected by, for instance, increasing the carbon content, the resistivity of the black matrix BM becomes lower than about $10^6$ $\Omega \cdot cm$. Such a black matrix BM cannot be used under the current technological situations. The OD value is defined as the light absorption coefficient multiplied by the film thickness.

In view of the above, in this embodiment, the light shield film BM is made of a resin composition in which a black inorganic pigment is mixed into a resist material, and is formed at a thickness of about 1.3±0.1 μm. Examples of the inorganic pigment are palladium and nickel that is formed by non-electrolyte electrode plating. The resistivity and the OD value of the black matrix BM are set at about $10^9$ Ω·cm and about 2.0, respectively.

A calculation result of a light transmission amount that will be obtained when a black matrix made of the above resin composition is used is as follows.

$$(OD \text{ value}) = \log(100/Y) \quad (1)$$

$$Y = \int A(\lambda)B(\lambda)C(\lambda)d(\lambda)/\int A(\lambda)C(\lambda)d(\lambda) \quad (2)$$

where A is the luminous efficiency, B is the transmittance, C is the light source spectrum, and λ is the wavelength of incident light.

When light shielding is effected by using a film having an OD value 2.0, Y=1% is obtained from Equation (1). If it is assumed that the intensity of the incident light is 4,000 cd/m², a transmission light amount is calculated as about 40 cd/m². This light intensity can not satisfactorily be recognized visually by a human.

The light shield film BM is also formed in a peripheral area in frame-like form, and the peripheral pattern is made continuous with the pattern in the matrix area having a number of dot-like openings.

<Color Filters FIL>

Color filters FIL are formed as a repetition of red, green, and blue stripes at positions confronting the respective pixels. The color filters FIL are so formed as to be laid on the edge portions of the light shield film BM.

The invention relates to a projected layout of these overlap portions. The details will be described later.

For example, the color filters FIL can be formed in the following manner. First, a dyeing base member such as an acrylic resin is formed on the surface of the top transparent glass substrate SUB2, and its portions not located in the red filters forming regions are removed by photolithography. Subsequently, red filters R are formed by dyeing the remaining portions of the dyeing base member with a red dye and then performing a fixing treatment. Then, green filters G and blue filters B are sequentially formed by executing similar steps.

<Overcoat Film OC>

An overcoat film OC is provided to prevent the dyes of the color filters FIL from leaking to the liquid crystal LC and to planarize the steps caused by the light shield film BM. The overcoat film OC is made of a transparent resin material such as an acrylic resin or an epoxy resin.

Liquid Crystal Layer and Polarizing Plates{tc\l1 "Liquid Crystal Layer and Polarizing Plates}

Next, the liquid crystal layer, the alignment films, the polarizing plates, etc. will be described.

<Liquid Crystal Layer>

The liquid crystal LC is a nematic liquid crystal having a positive permittivity anisotropy value Δε (called as "a positive dielectric anisotropy", also) of 13.2 and a refractive index anisotropy value Δn of 0.081 (589 nm, 20° C.) and a nematic liquid crystal having a negative permittivity anisotropy value Δε of −7.3 and a refractive index anisotropy value Δn (also called "birefringence") of 0.053 (589 nm, 20° C.).

The thickness of the liquid crystal layer (i.e., the gap) is set larger than 2.8 μm and smaller than 4.5 μm when the permittivity anisotropy value Δε is positive. This is because a permittivity characteristic having almost no wavelength dependence in the visible range when the retardation Δ·n is larger than 0.25 μm and smaller than 0.32 μm, and that most of liquid crystals having a positive permittivity anisotropy value Δε have a refractive index anisotropy value Δn that is larger than 0.07 and smaller than 0.09.

On the other hand, when the permittivity anisotropy value Δε is negative, the thickness of the liquid crystal layer (i.e., the gap) is set larger than 4.2 μm and smaller than 8.0 μm. This is to make the retardation Δn·d larger than 0.25 μm and smaller than 0.32 μm, as in the case of liquid crystals having a positive permittivity anisotropy value Δε. Most of liquid crystals having a negative permittivity anisotropy value Δε have a refractive index anisotropy value Δn that is larger than 0.04 and smaller than 0.06.

In a state that the liquid crystal layer is combined with the alignment films and the polarizing plates, the maximum transmittance is obtained when liquid crystal molecules are turned by 45□ from the rubbing direction toward the electric field direction. The thickness of the liquid crystal layer (i.e., the gap) is controlled by polymer beads.

The kind of liquid crystal LC is not restricted except that it should be a nematic liquid crystal.

A larger permittivity anisotropy value Δε makes it easier to set the drive voltage at a smaller value. A smaller refractive index anisotropy value Δn makes it easier to set the thickness of the liquid crystal layer (i.e., the gap) larger, whereby the liquid crystal sealing time can be shortened and the gap variation can be reduced.

<Alignment Films (Orientation Films)>

Figure 4:
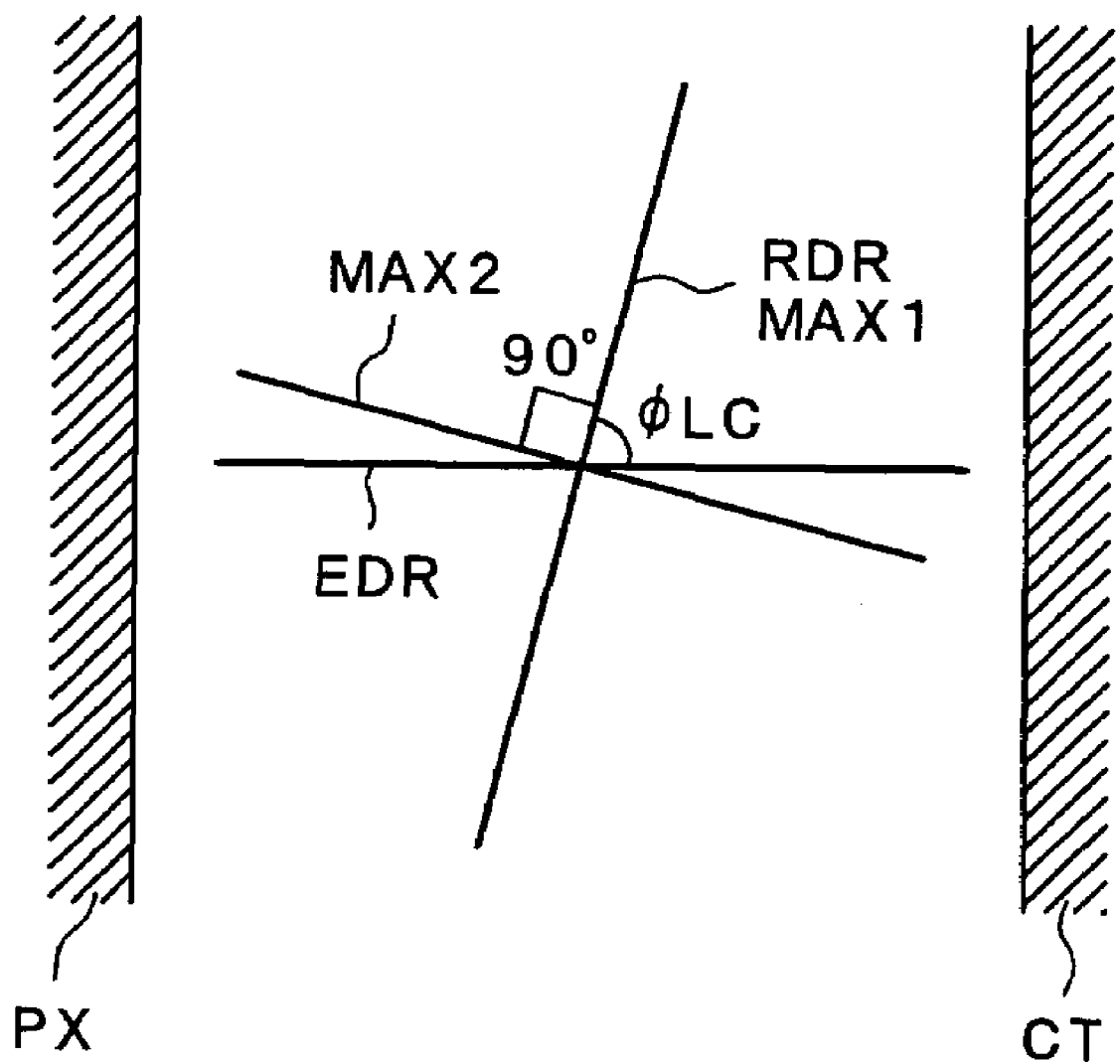
FIG. 4 illustrates an angular relationship between the rubbing direction RDR and the applied electric field direction EDR.

The alignment films ORI are made of polyimide. The rubbing directions RDR for the top and bottom substrates are set parallel with each other, and are set so as to form an angle φLC of 75° with the applied electric field direction EDR. This relationship is illustrated in FIG. 4.

The angle between the rubbing direction RDR and the applied electric field direction EDR may be set not smaller than 45° and smaller than 90° when the liquid crystal LC has a positive permittivity anisotropy value Δε and set larger than 0° and not larger than 45° when the liquid crystal LC has a negative permittivity anisotropy value Δε.

<Polarizing Plates>

The polarizing plates POL are G122DU (product name) of Nitto Denko Corp. A polarized light transmission axis MAX1 of the bottom polarizing plate POL1 is set coincident with the rubbing direction RDR and a polarized light transmission axis MAX2 of the top polarizing plate POL2 is set perpendicular to the rubbing direction RDR.

This provides a normally closed characteristic in which the transmittance increases as the voltage applied to each pixel of the invention (i.e., the voltage applied between the pixel electrode and the counter electrode CT) is increased.

In the lateral electric field type liquid crystal display device to which the invention is directed, a display abnormality may occur when a high voltage of static electricity or the like is applied externally to the surface of the top substrate SUB2. Therefore, it is necessary to form a transparent conductive film layer having a sheet resistance of less than $1 \times 10^8$ Ω/□ above or on the surface of the top polarizing plate POL2, form a transparent conductive film layer of ITO or the like having a sheet resistance of less than $1 \times 10^8$ Ω/□ between the polarizing plate POL2 and the top transparent substrate SUB2, or mixing conductive particles of ITO, $SnO_2$, $In_2O_3$, or the like into an adhesive layer of the polarizing plate POL2 to thereby make its sheet resistance lower than $1\times10^8$ Ω/□. As for this measure, The Japanese Unexamined Patent Publication No. Hei. 9-105918 discloses in detail a method of improving a shield function.

<Matrix Peripheral Structures>

Figure 5:
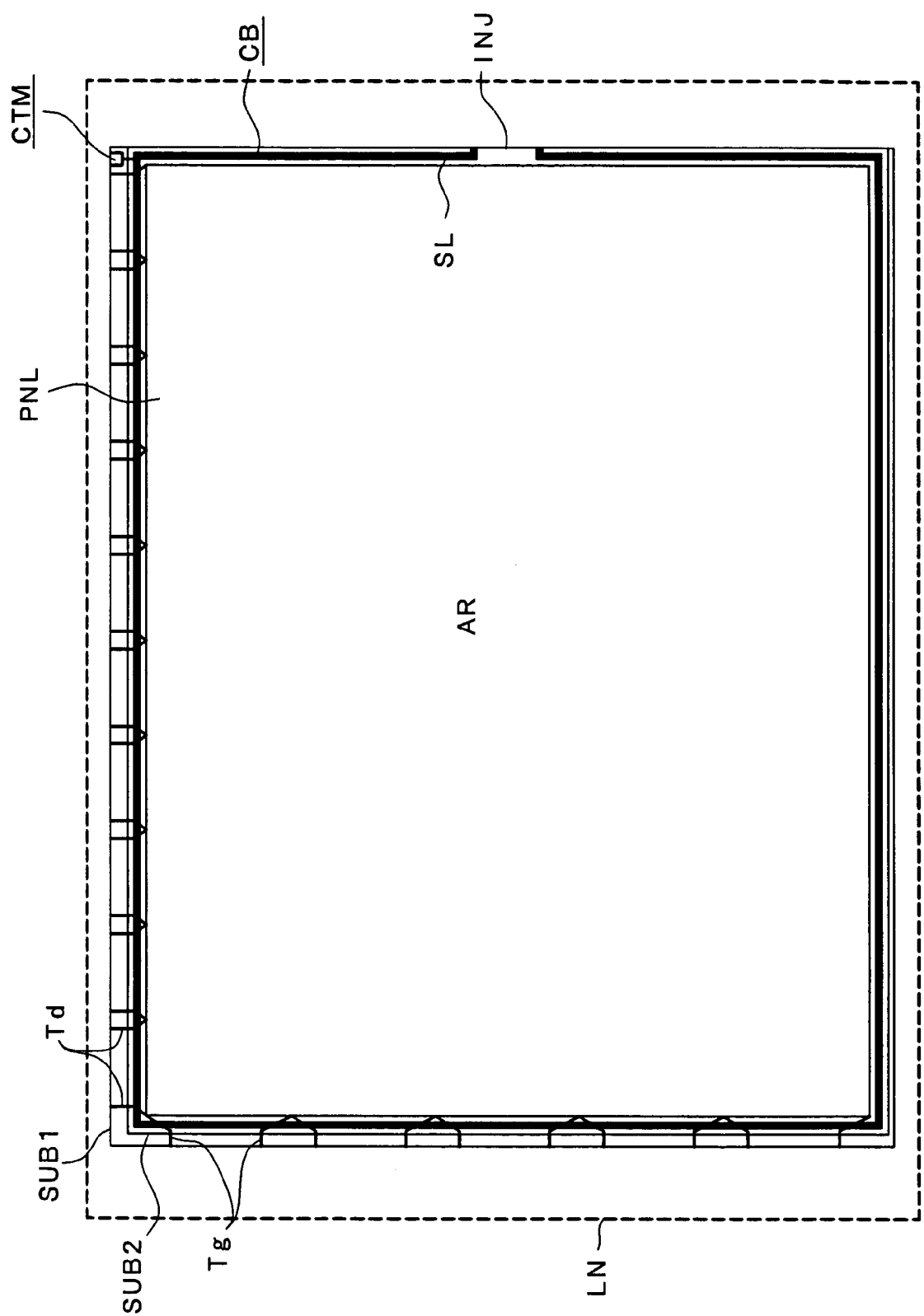
FIG. 5 is a plan view showing the main part of peripheral portions of a matrix (AR) of a display panel including top and bottom substrates.

FIG. 5 is a plan view showing the main part of peripheral portions of the matrix (AR) of the display panel PNL including the top and bottom glass substrates SUB1 and SUB2. FIG. 6 is a sectional view of external connection terminals GTM to which a scanning circuit is connected from the left side and its vicinity. FIG. 7 is a sectional view of a tape carrier package TCP shown in FIG. 6.

The display panel shown in FIG. 5 is manufactured as follows. In the case of a small-size panel, to increase the throughput, one glass substrate is divided after being subjected to processing for a plurality of devices. In the case of a large-size panel, to commonly use manufacturing facilities, a glass substrate whose size is standardized for all product types is processed and then reduced in size so as to be suitable for each product type. In either case, a glass plate is cut after being subjected to a series of steps.

Figure 6:
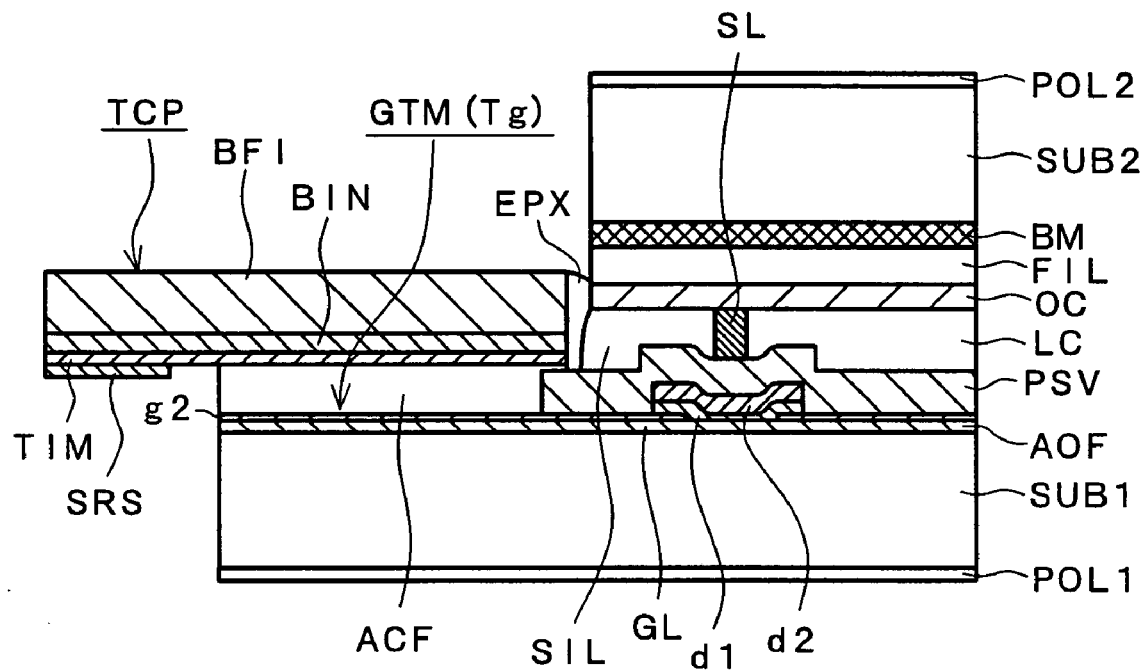
FIG. 6 is a sectional view of external connection terminals GTM to which a scanning circuit is connected from the left side and its vicinity.
Figure 7:
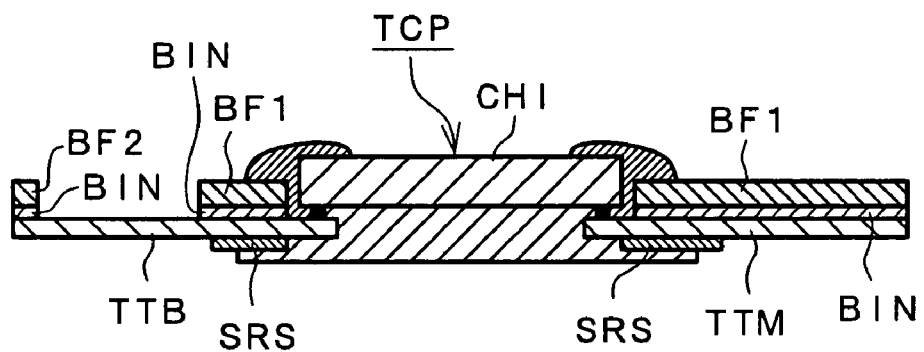
FIG. 7 is a sectional view of a tape carrier package shown in FIG. 6.

FIGS. 5 and 6 correspond to the latter case, and show a state that both of the top and bottom substrates SUB1 and SUB2 have been cut. Symbol LN denotes edges of those substrates before cutting. In either case, in the completed state, the ends of the top substrate SUB2 is located inside the ends of the bottom substrate SUB1 in portions including external connection terminal groups Tg and Td or a terminal CTM (the top portion and the left portion in FIGS. 5) to expose those terminals.

Each of the terminal groups Tg and Td is a collection of a plurality of connection terminals GTM for a scanning circuit or connection terminals DTM for a video signal circuit and their lead-out wiring portions in which they are collected for each tape carrier package TCP (see FIGS. 6 and 7) on which an integrated circuit chip CHI is mounted.

The lead-out lines of each terminal group extending from the matrix area to the external connection terminal portion are inclined as they approach the both ends to adapt the terminals DTM and GTM of the display panel PNL to the arrangement pitch of the packages TCP and the connection terminal pitch of each package TCP.

The counter electrode terminal CTM is a terminal for supplying a counter electrode voltage to the counter electrode CT externally. The counter voltage signal lines CL of the matrix area are lead out to the side (right side in FIG. 5) opposite to the terminals GTM for a scanning circuit and are together connected to a common bus line CB, which is in turn connected to the counter electrode terminal CTM.

A sealing pattern SL is formed between the transparent glass substrates SUB1 and SUB2 along their edges so as to seal the liquid crystal LC except for a liquid crystal injection inlet INJ. The sealing material is an epoxy resin, for instance.

The alignment films ORI1 and ORI2 are formed inside the sealing pattern SL. The polarizing plates POL1 and POL2 are provided on the outside surfaces of the bottom transparent glass substrates SUB1 and the top transparent glass substrates SUB2, respectively.

The liquid crystal LC is sealed in the region partitioned by the sealing pattern SL between the bottom alignment film ORI1 and the top alignment film ORI2 that set the alignment direction of liquid crystal molecules. The bottom alignment film ORI1 is formed on top of the protective film PSV1 that is formed on the bottom transparent glass substrate SUB1.

The liquid crystal display device is assembled as follows. First, various layers are laid separately on the bottom transparent glass substrate SUB1 and the top transparent glass substrate SUB2. After a sealing pattern SL is formed on the substrate SUB2, the substrates SUB1 and SUB2 are placed one on another. Subsequently, a liquid crystal LC is injected through an opening INJ of the sealing pattern SL and then the injection inlet INJ is sealed with an epoxy resin or the like. Finally, the substrates SUB1 and SUB2 are cut.

<Connection Structure of Tape Carrier Package TCP>

As mentioned above, FIG. 7 shows a sectional structure of a tape carrier package TCP in which an integrated circuit chip CHI of a scanning signal driver circuit V or a video signal driver circuit H is mounted on a flexible wiring board and FIG. 6 is a sectional view showing the main part of a structure in which the tape carrier package TCP of FIG. 6 is connected to, in this case, the terminals GTM for a scanning signal circuit of the liquid crystal display panel PNL.

In FIGS. 6 and 7, an input terminals/wiring portion TTB of the integrated circuit CHI and an output terminals/wiring portion TTM of the integrated circuit CHI are made of Cu, for instance. Bonding pads PAD of the integrated circuit CHI are connected to inside tip portions (commonly called inner leads) of the portions TTB and TTM by what is called face-down bonding.

Outside tip portions (commonly called outer leads) of the portions TTB and TTM, which correspond to the inputs and outputs, respectively, of the integrated circuit chip CHI, are connected to a CRT/TFT conversion circuit/power supply circuit SUP by soldering or the like and to the liquid crystal display panel PNL via anisotropic conductive films ACF.

The package TCP is connected to the panel PNL so that its tip portion covers the protective film PSV1 of the panel PNL from which the connection terminals GTM are exposed. Since the protective film PSV1 is covered with one side portion of the package TCP, the external connection terminals GTM (or DTM) are resistant to galvanic corrosion.

Symbol BF1 denotes a base film that is made of polyimide or the like, and SRS denotes a solder resist film as a mask for preventing solver from sticking to an undesirable portion during soldering.

The gap between the top and bottom glass substrates SUB2 and SUB1 outside the sealing pattern SL is protected by an epoxy resin EPX or the like after cleaning. The space between the package TCP and the top substrate SUB2 is charged with a silicone resin SIL to effect multiple protection.

<Equivalent Circuit of Entire Display Device>

Figure 8:
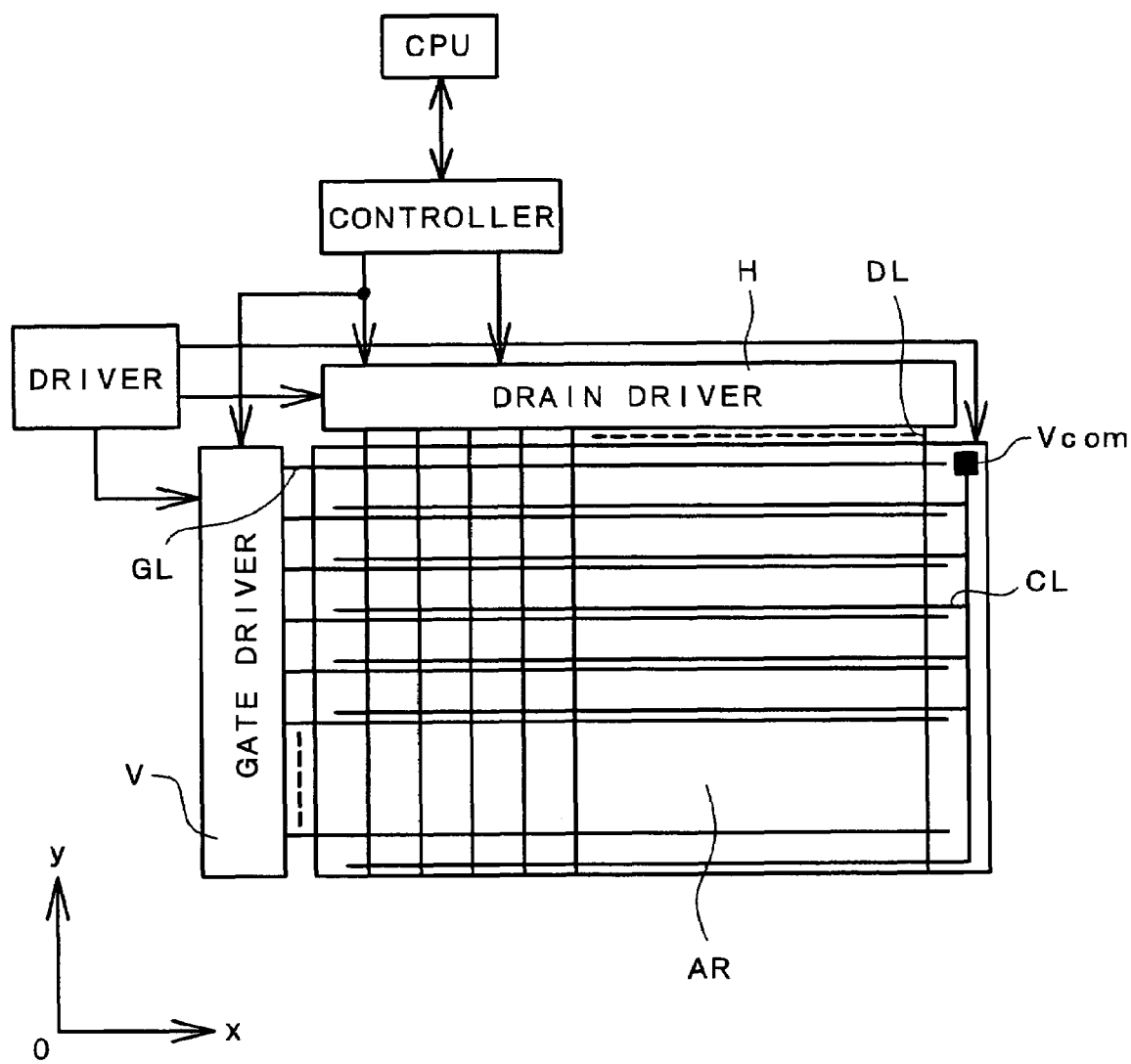
FIG. 8 is a general circuit diagram of an equivalent circuit of the liquid crystal display device according to the invention.
Figure 9:
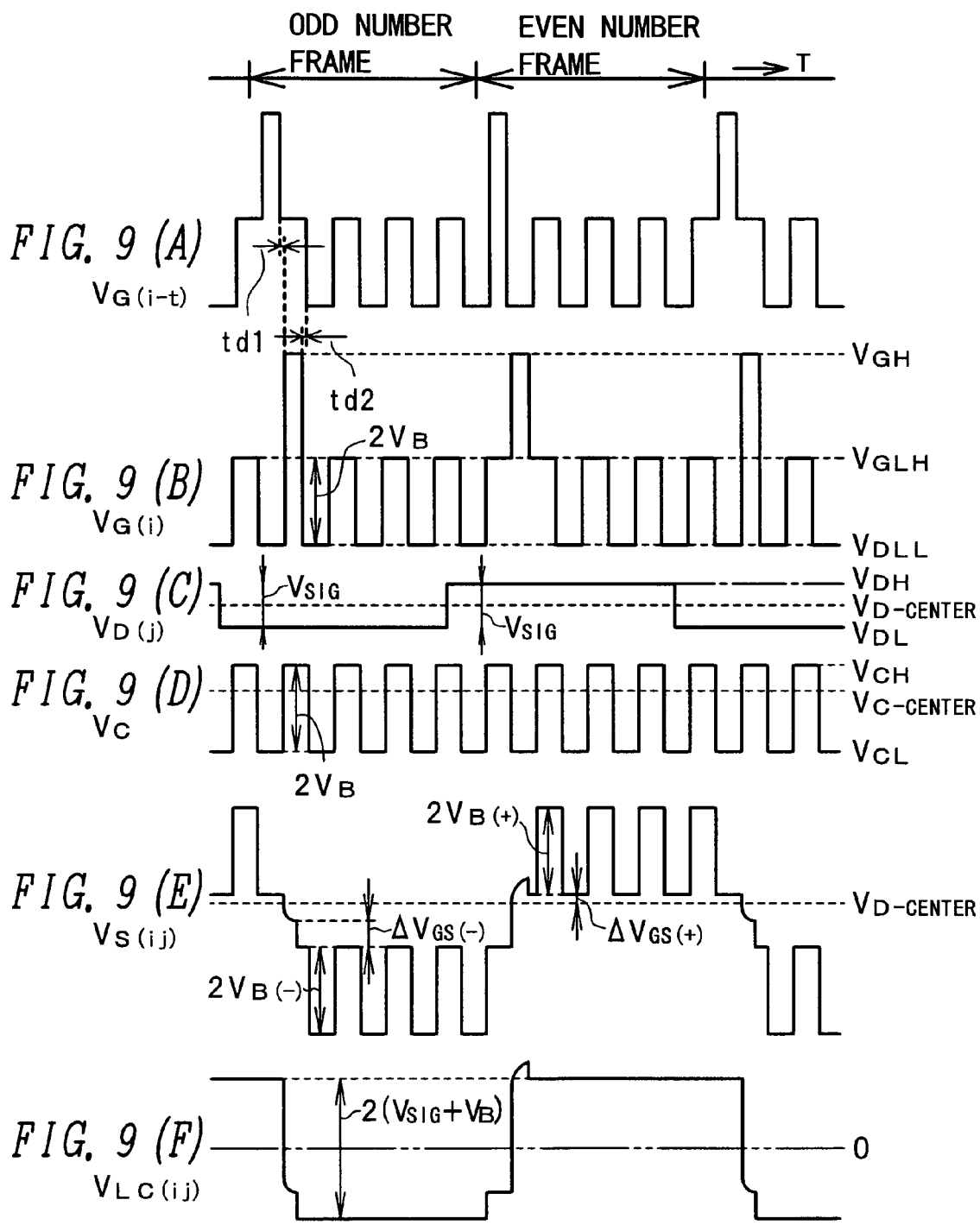
FIGS. 9(A)-9(F) are a drive waveform diagram of the liquid crystal display device according to the invention.

FIG. 8 is a general circuit diagram of an equivalent circuit of the liquid crystal display device according to the invention. In the liquid crystal display panel, the image display section is constituted of a set of a number of pixels that are arranged in matrix form. Each pixel is so configured as to be able to independently control, that is, modulate, transmission light that is emitted from a backlight provided in the rear of the liquid crystal display panel.

In the active matrix substrate which is one component of the liquid crystal display panel, the gate signal lines GL and the counter voltage signal lines CL that extend in the x-direction (row direction) and parallel arranged in the y-direction (column direction) and the video signal lines (drain signal lines) DL that are insulated from the signal lines GL and CL, extend in the y-direction, and parallel arranged in the x-direction are formed in the effective pixel area AR.

A unit pixel is formed in each rectangular region enclosed by a scanning signal line (gate signal line) GL, a counter voltage signal line CL, and drain signal lines DL.

The liquid crystal display panel is provided with the vertical scanning circuit V and the video signal driver circuit H as external circuits. Scanning signals (voltages) are sequentially supplied from the vertical scanning circuit V to the respective gate signal lines GL, and video signals (voltages) are supplied to the respective drain signal lines DL from the video signal driver circuit H with proper timing with respect to the scanning signals.

The vertical scanning circuit V and the video signal driver circuit H receive power supply voltages from a liquid crystal driving power supply circuit 3 as well as display data and control signals that are produced by a controller 2 by dividing image information that is supplied from a CPU 1.

<Driving Method>

FIGS. 9(A)-9(F) shows drive waveform diagrams of the liquid crystal display device according to the invention. A counter electrode voltage is an AC rectangular wave having two values VCH and VCL. The non-selection voltage of scanning signals VG(i-1) and VG(i) are varied between VGH and VGHL every scanning period in synchronism with the counter electrode voltage. The amplitude of the counter electrode voltage is set equal to that of the non-selection voltage.

A video signal voltage is a voltage that is desired to be applied to the liquid crystal layer minus ½ of the amplitude of the counter electrode voltage.

Although the counter electrode voltage may be a DC voltage, the use of an AC voltage can decrease the maximum amplitude of the video signal voltage and enables use of a video signal driver circuit (signal-side driver) that is low in breakdown voltage.

<Function of Storage Capacitor Portion Cstg>

The storage capacitor portion Cstg is provided to store video information that has been written to a pixel for a long time (after turning off of a thin-film transistor TFT).

In contrast to the type in which electric fields develop perpendicularly to the substrate surfaces, in the type employed by the invention in which electric fields develop parallel with the substrate surfaces, a pixel electrode and an counter electrode form almost no capacitance (what is called liquid crystal capacitance) and hence the storage capacitor portion Cstg is an indispensable component.

The storage capacitor portion Cstg also acts to reduce influence of a gate potential variation $\Delta Vg$ on a gate electrode potential Vs when the thin-film transistor TFT is switched. This is expressed by the following formula:

$$\Delta Vs = \{Cgs/(Cgs+Cstg+Cpix)\} \times \Delta Vg$$

where Cgs is the parasitic capacitance formed between the gate electrode GT and the source electrode SD1 of the thin-film transistor TFT, Cpix is the capacitance formed between the pixel electrode PX and the counter electrode CT, and $\Delta Vs$ is a variation of the pixel electrode potential Vs caused by $\Delta Vg$, that is, what is called a feed-through voltage.

The variation $\Delta Vs$, which may cause a DC component that is applied to the liquid crystal LC, can be reduced by increasing the storage capacitance Cstg. Reducing the DC component that is applied to the liquid crystal LC is effective in increasing the life of the liquid crystal LC and in decreasing the degree of what is called sticking, that is, a phenomenon that a previous image remains on the liquid crystal display screen after switching is made to a new image.

Since the gate electrode GT is so formed as to completely cover the i-type semiconductor layer AS as described above, the overlap area between the gate electrode GT and each of the source electrode SD1 and the drain electrode SD2 increases accordingly and hence the parasitic capacitance Cgs increases, which results in a reverse effect that the pixel electrode potential is prone to be affected by the gate (scanning) signal Vg. However, this demerit can be eliminated by providing the storage capacitor portion Cstg.

<Manufacturing Method>

Next, a description will be made of a manufacturing method of the components on the side of the substrate SUB1 of the above-described liquid crystal display device.

Figure 10:
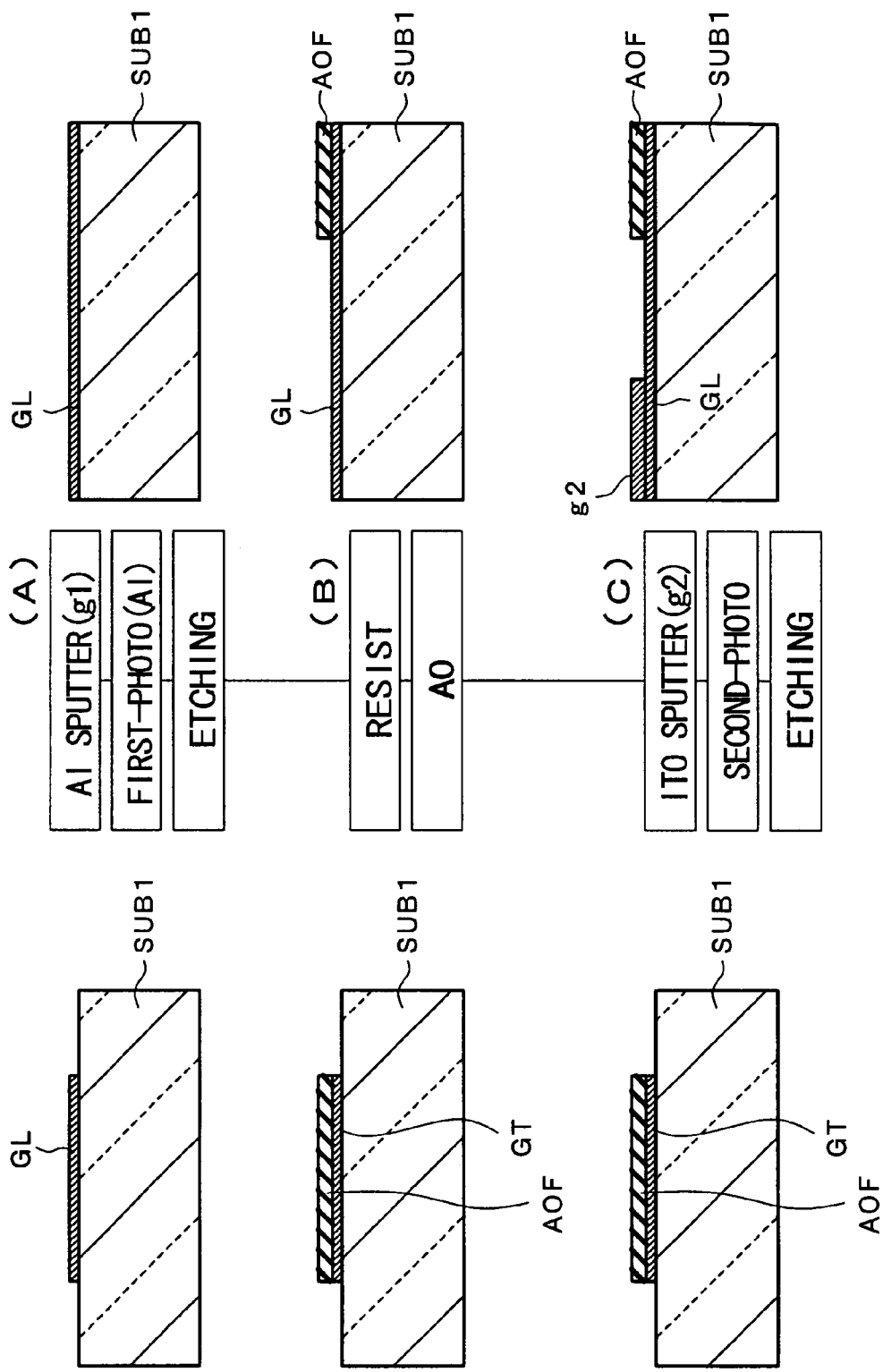
FIGS. 10 through 12 show a manufacturing process of a liquid crystal display device according to the invention.
Figure 11:
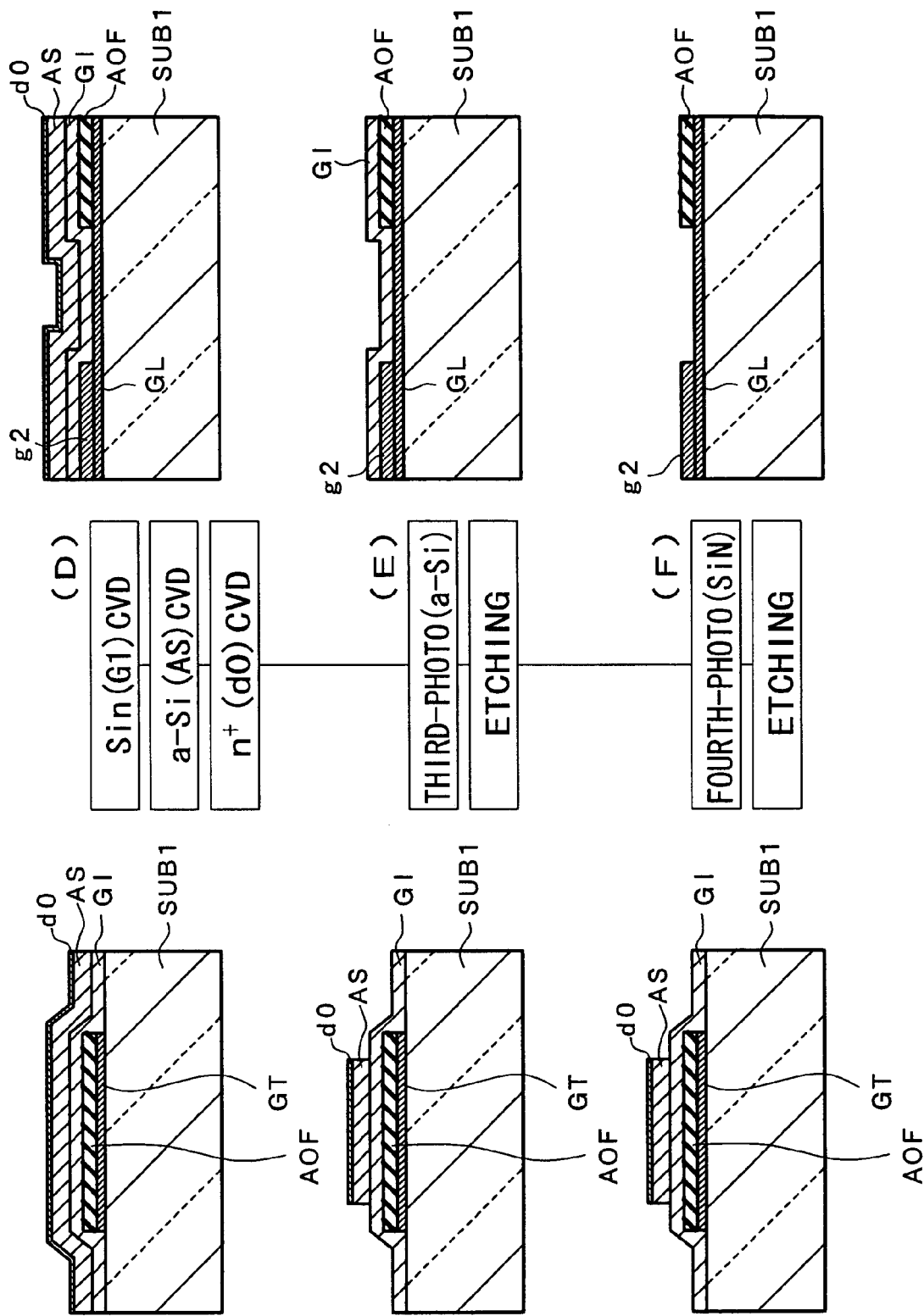
Figure 12:
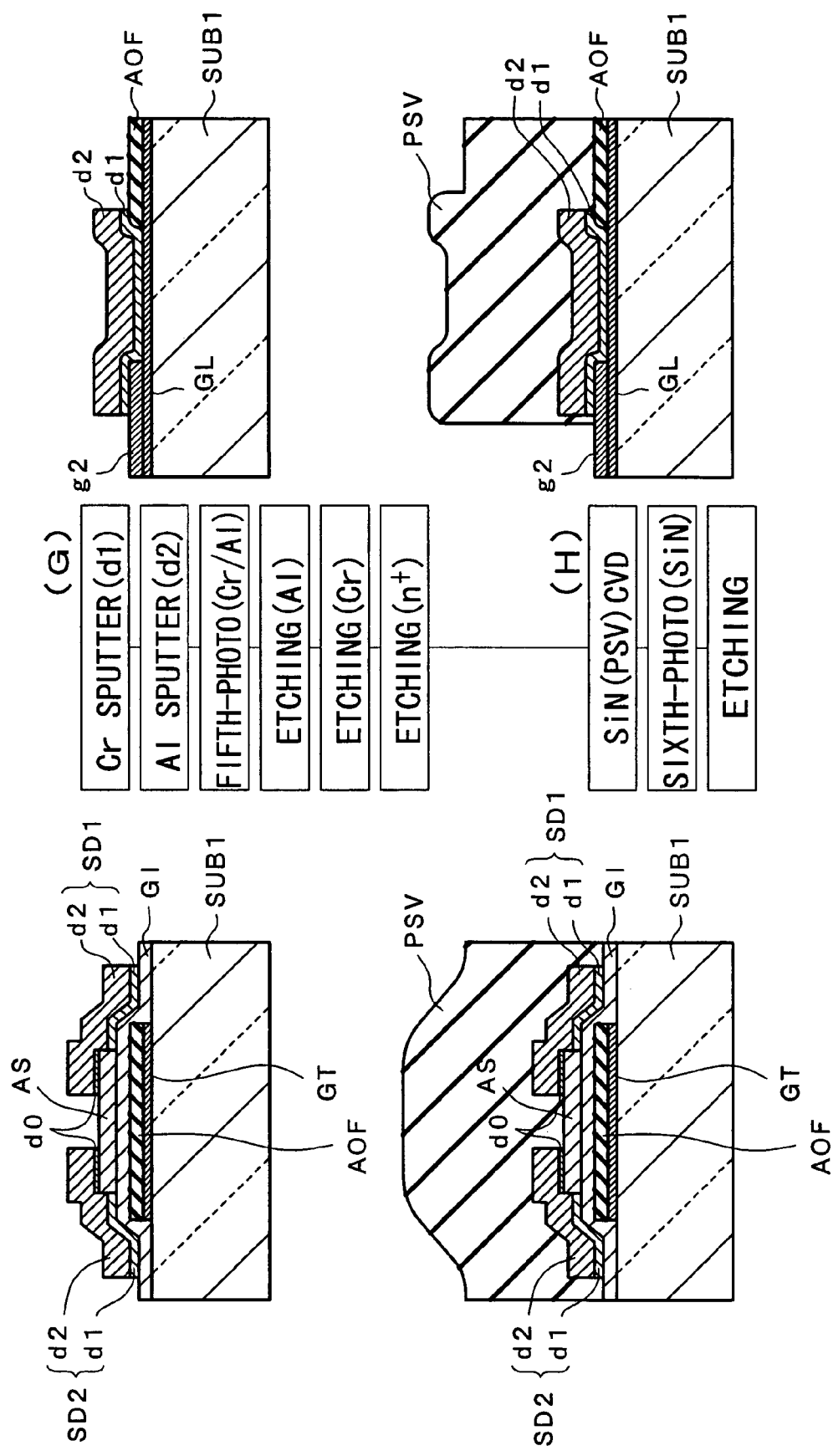

FIGS. 10-12 show a manufacturing process of the liquid crystal display device according to the invention. In FIGS. 10-12, parenthesized characters at the central part are abbreviated names of steps, and sectional views of a thin-film transistor TFT portion and a gate electrode terminal and its vicinity both of which indicate a flow of the process are shown in the left part and the right part, respectively. Steps A, C in FIGS. 10, B, C in FIGS. 11, A and B in FIG. 12 correspond to respective photolithography processes and show a state that processing to be executed after the photolithography process has been finished and a photoresist has been removed.

In the invention, each of the photolithography processes means a series of operations including application of a photoresist, selected exposure using a mask, and development. Repeated descriptions of the photolithography processes will be avoided. Each of steps A-I will be described below.

Step A (FIG. 10):

A 300-nm-thick conductive film g1 of Al—Pd, Al—W, Al—Ta, Al—Ti—Ta, or the like is formed on a bottom transparent glass substrate SUB1 made of an AN635 glass (product name) by sputtering. After execution of a photolithography process, the conductive film g1 is etched selectively with a mixed liquid of phosphoric acid, nitric acid, and glacial acetic acid. As a result, gate electrodes GT, scanning signal lines GL, counter electrodes CT, counter voltage signal lines CL, electrodes PL1, gate terminals GTM, a first conductive layer of a common bus line CB, and a first conductive layer of a counter electrode terminal CTM, anodized bus lines SHg (not shown) that are connected to the gate terminals GTM, and anodized pads (not shown) that are connected to the anodized bus lines SHg are formed.

Step B (FIG. 10):

After formation of an anodized mask AO by direct drawing, the substrate SUB1 is immersed in an anodization liquid obtained by diluting an ammonia solution of 3%-tartaric acid (pH is adjusted to 6.25±0.05) at a ratio of 1:9 with an ethylene glycol liquid and the forming current density is set at 0.5 mA/cm² (constant current forming).

Anodization is continued until the forming voltages reaches 125 V that is necessary to obtain an aluminum ($Al_2O_3$) film having a desired thickness. It is desirable that this state be held for tens of minutes (constant voltage forming). This is important to obtain a uniform $Al_2O_3$ film. As a result, the conductive films g1 are anodized and 180-nm-thick anodic oxide films AOF are formed on the gate electrode GT, the scanning signal lines GL, the counter electrodes CT, the counter voltage signal lines CL, and the electrodes PL1.

Step C (FIG. 10):

A 140-nm-thick ITO film as a transparent conductive film g2 is formed by sputtering. After execution of a photolithographic process, the transparent conductive film g2 is selectively etched with an etching liquid that is a mixed acid solution of hydrochloric acid and nitric acid. As a result, uppermost layers of the gate terminals GTM, drain terminals DTM, and a second conductive film of the counter electrode terminal CTM are formed.

Step A (FIG. 11):

A 220-nm-thick silicon nitride film is formed by introducing an ammonia gas, a silane gas, and a nitrogen gas into a plasma CVD apparatus, and then a 200-nm-thick i-type amorphous silicon film is formed by introducing a silane gas and a hydrogen gas into the plasma CVD apparatus. Subsequently, a 30-nm-thick $n^+$-type amorphous silicon film is formed by introducing a silane gas, a hydrogen gas, and a phosphine gas into the plasma CVD apparatus.

Step B (FIG. 11):

After execution of a photolithography process, island-like i-type semiconductor layers AS are formed by selectively etching the $n^+$-type amorphous silicon film and the i-type amorphous silicon film by using $SF_6$ as a dry etching gas.

Step C (FIG. 11):

After execution of a photolithography process, the silicon nitride film is selectively etched by using $SF_6$ as a dry etching gas.

Step A (FIG. 12):

A 60-nm-thick conductive film d1 made of Cr is formed by sputtering, and then a 400-nm-thick conductive film d2 made of Al—Pd, Al—Si, Al—Ta, Al—Ti—Ta, or the like is formed by sputtering. After execution of a photolithography process, video signal lines DL, source electrodes SD1, drain electrodes SD2, pixel electrodes PX, electrodes PL2, second and third conductive layers of the common bus line CB, and bus lines SHd (not shown) that short-circuit drain terminals are formed by etching the conductive film d2 with a liquid similar to the liquid used in step A and etching the conductive film d1 with a solution of ceric ammonium nitrate.

Then, the portions of the $n^+$-type semiconductor layer d0 located between the sources and the drains are removed selectively by etching the $n^+$-type amorphous silicon film by introducing $SF_6$ into a dry etching apparatus.

Step B (FIG. 12):

A 500-nm-thick silicon nitride film is formed by introducing an ammonia gas, a silane gas, and a nitrogen gas into the plasma CVD apparatus. After execution of a photolithography process, a protective film PSV1 is formed by selectively etching the silicon nitride film by using $SF_6$ as a dry etching gas.

Figure 13:
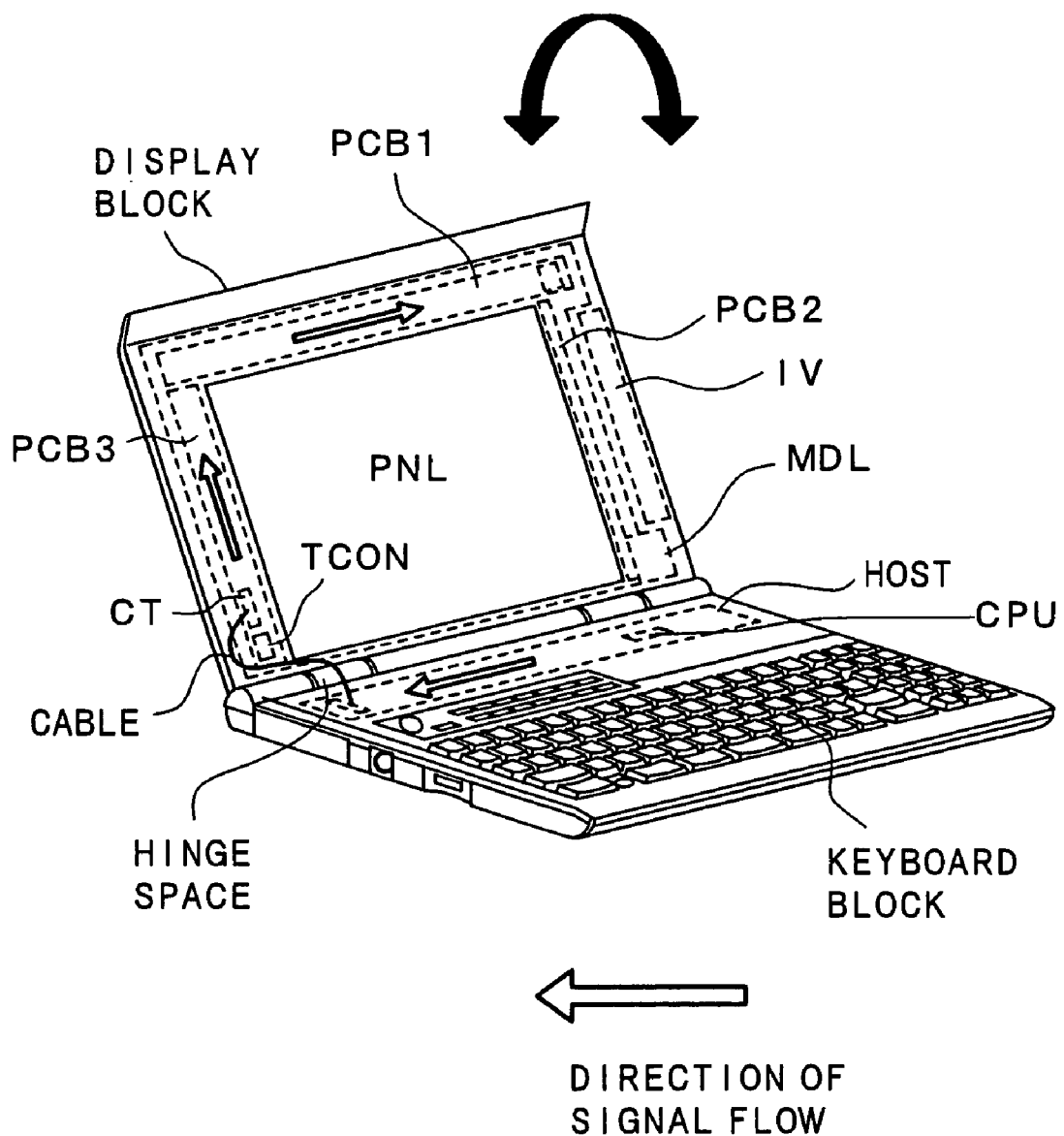
FIG. 13 shows a notebook-sized personal computer that is an example of an information apparatus in which a liquid crystal display device of the invention is incorporated.

FIG. 13 shows a notebook-sized personal computer that is an example of an information apparatus in which a liquid crystal display device of the invention is incorporated.

In this personal computer, a keyboard section incorporating a host having a CPU and a display section incorporating a liquid crystal display device are joined to each other by means of a hinge. Display data generated by the host of the keyboard section are sent from a driver circuit board PCB3 that is mounted with TCON for performing CRT/TFT signal conversion and generating various timing signals to driver circuit boards PCB1 and PCB2 that is mounted with a pixel driver chip. As a result, an image is generated on a liquid crystal panel PNL.

It goes without saying that the liquid crystal display device of the invention can be used not only in the above type of notebook-sized personal computer but also other types of personal computers such as a desk-top type one and as other types of monitors.

2. The Electrode Structure in the Pixel

Figure 14A:
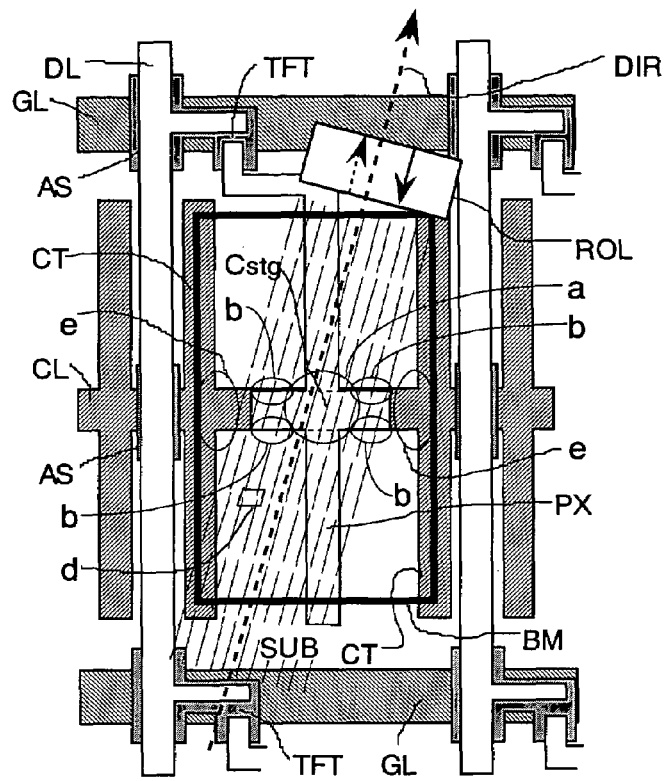
FIGS. 14(A)-14(C) are a plan view of the electrode structure for obtaining larger storage capacitance Cstg, a enlarged image of a part of its uppermost surface after rubbing treatment, and an image of the rubbing treatment around the storage capacitance, respectively.
Figure 15:
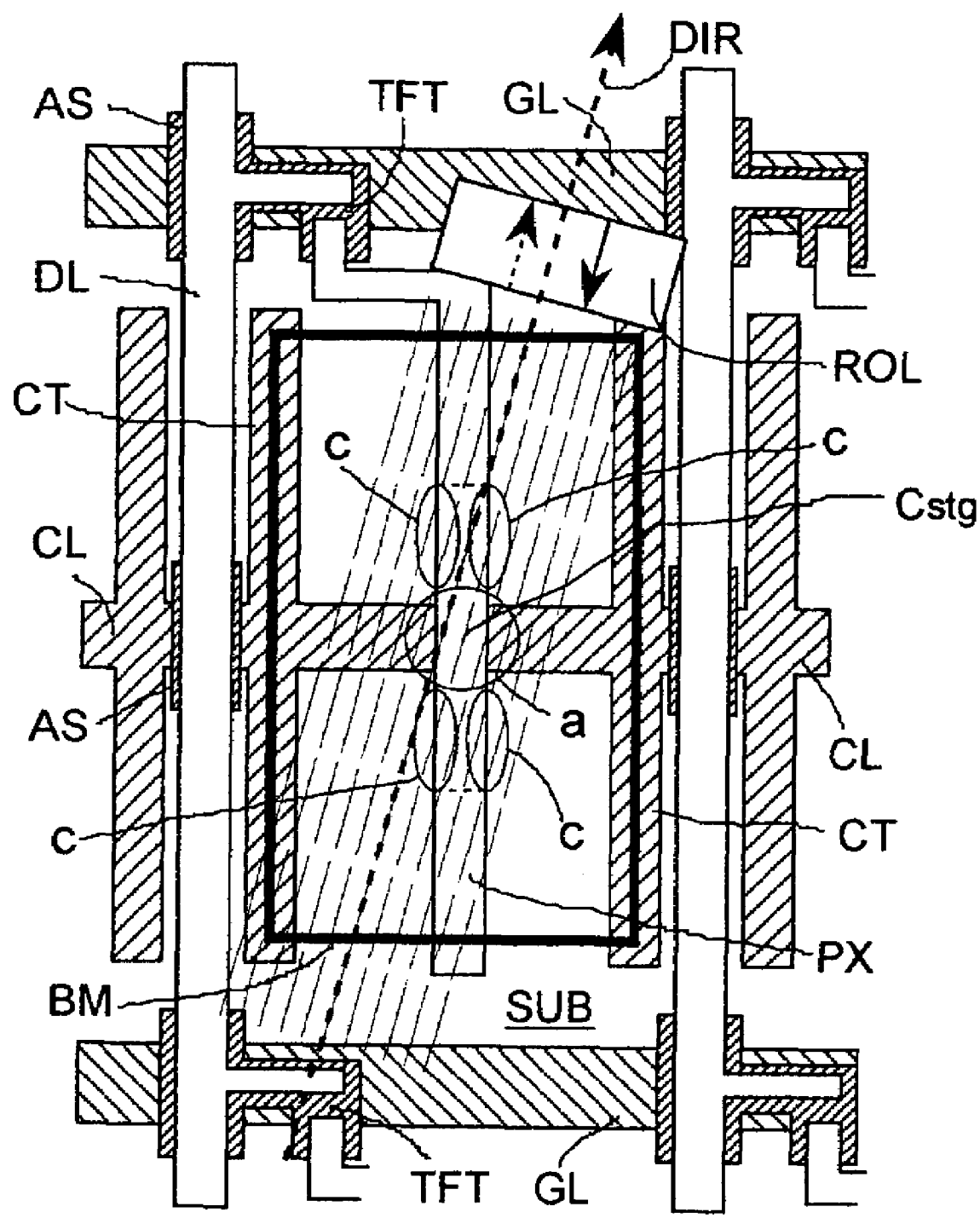
FIGS. 15 is the other plan view of the electrode structure for obtaining larger storage capacitance Cstg.

The inventors considered a liquid crystal display device as disclosed in FIG. 15 of PCT gazette WO95/25291 corresponded to U.S. Pat. No. 5,786,876 and proposed a liquid crystal display device of IPS type having a pixel portion as shown in FIG. 14(A) in order to improve the above-mentioned storage capacitor portion Ctsg. FIG. 14(A) shows the layout of electrode formed on the substrate SUB corresponding to SUB1 in FIG. 2.

In contrast to the layout shown in FIG. 1, the proposed structure in FIG. 14(A) has a storage capacitance formed of the overlapping of the pixel electrode PX and a counter voltage signal line CL via insulating film (not shown) in the pixel region. The pixel region is defined by an opening of the black matrix which is a region within a thick-lined frame denoted as BM in FIG. 14(A). The structure is further characterized in that a cross-shaped pixel electrode has its branches extending from the crossing so as to overlap the counter voltage signal line. The pixel electrode PX and the counter electrode CT form an electric field with a component substantially parallel to the substrate on which the circuit shown in FIG. 14(A) is formed. The potential of the pixel electrode PX depends on an output of a switching device (transistor TFT, in FIG. 14(A)) controlled by a scanning signal provided by scanning signal line (gate signal line) GL. The potential of the counter electrode CT is determined by a counter voltage signal line CL electrically connected to each counter electrode of the pixels arranged along the scanning signal line GL.

The cross-shaped pixel electrode in FIG. 14A enlarges an area where the pixel electrode PX overlaps with the counter voltage signal line CT to attain higher capacitance for maintaining an electric field applied on a pixel region which determines the orientation of the liquid crystal molecules. Thus, the pixel having the electrodes with a layout of FIG. 14(A) can maintain its optical transmittance stable. Furthermore, as each of the pixel electrodes branches ends in the pixel region (not extending outside of the pixel region), electrical charges can go into or out from the pixel electrode PX over the counter voltage signal line CT easily and rapidly when the switching device TFT passes the charges therethrough. Therefore, the pixel can also respond to the scanning signal quickly.

In spite of these advantages by the structure of FIG. 14(A), unexpected failures are found in controlling the orientations of the liquid crystal molecules by applying the field. The inventors recognized that a probability of this failure depends on an intersecting angle defined between an extending direction of the branch of the pixel electrode PX and a rubbing direction described later.

As shown in FIG. 14(A) for illustration purposes and which is not drawn to scale, a rubbing treatment is a process to rub a rubbing roller ROL having fiber around its circumference against an uppermost surface of a substrate, which will face to a liquid crystal layer later. The uppermost surface to be treated is usually formed of an alignment film (also called, an orientation film). In this process, as the rubbing roller moves along the direction shown by an arrow DIR, piles of the fiber around the rubbing roller make dents extending in a predetermined direction shown as fine stripes on the uppermost surface.

Figure 14B:
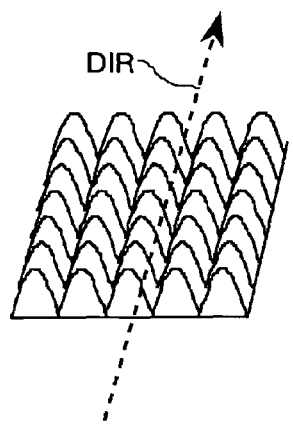

Precisely speaking, the rubbing roller is considered to align the polymers forming the alignment film, and their alignments depend not only on the direction DIR but on the rotating direction of the rubbing roller as well. However, fine undulations (corrugations) as shown in FIG. 14(B) (enlarged portion d of FIG. 14(A)) can be observed on the uppermost surface by an atomic force microscope (AFM) after the rubbing treatment. Thus, the extending direction of the dents in the following description represent the alignment direction of the polymers, also. On the other hand, the rubbing direction DIR in the following descriptions may deviate from the direction to which the rubbing roller goes on.

In a condition when an electric field is not applied to the liquid crystal layer or is so faint as to drive liquid crystal molecules therein for displaying purpose (called a non-field condition, expediently), liquid crystal molecules are oriented along extending directions of the dents (the alignment direction of the polymers, mentioned above). Therefore, a result of the rubbing treatment can be evaluated by orientating directions of liquid crystal molecules in the non-field condition or their variations according to applied fields. The above-mentioned orientating directions of liquid crystal molecules in the non-field condition are also called as "Initial orientating (alignment) direction".

The failures in controlling orientations of liquid crystal molecules mentioned before (called "alignment defects", hereinafter) occur in circled portions "a" and "b" of FIG. 14A where the rubbing roller rolls over the pixel electrode PX or its branches overlapping the counter voltage signal line CL as a result of a step or elevation thereat. The inventor also proposed another structure as shown in FIG. 15 forming branches of the counter voltage signal line CL extending up and down from its crossing with the pixel electrode PX instead of the branches of the pixel electrode PX as FIG. 14(A). Upper and lower ends of branches of the counter voltage signal line CL are shown by dotted lines in FIG. 15. An elevation or step as a result of an overlap of the counter voltage signal line CL and the pixel electrode PX extending from the main surface of the substrate SUB appears at circled portions c in FIG. 15 instead of circled portions b in FIG. 14(A). In this structure of FIG. 15, the alignment defects can be avoided at circled portions a and c looking like circled portions a and b in FIG. 14(A).

According to these results, the alignment defects are considered to be caused by a difference of elevation on a rubbing direction onto a surface of the substrate and an angle defined by an extending direction of the elevation and the rubbing direction.

Figure 14C:
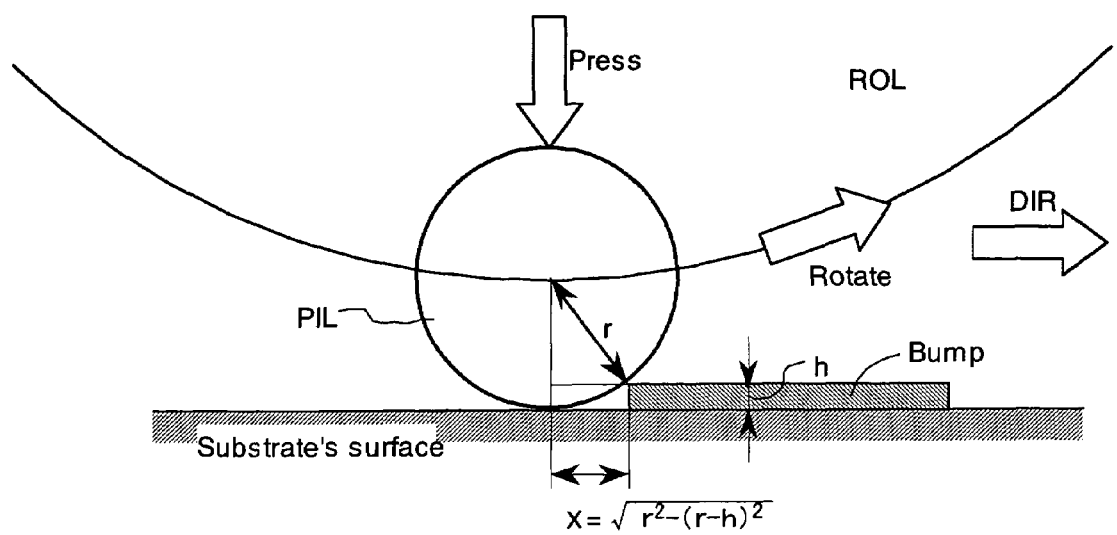

A fiber on a circumference of a rubbing roller has its pile with a tip of c.a. 20 μm in radius densely. Thus, the circumference of the rubbing roller can be seen as a cluster of spheres having radii of 20 μm arranged thereon from a surface to be rubbed. FIG. 14(C) compares a tip of the piles contacting a substrate surface to a sphere denoted FIL having radius of "r". The rubbing roller ROL moves in a direction (shown as an outlined arrow DIR) reversed to its rotation (shown as an outlined arrow "Rotate") so as to increase a friction between the pile PIL and the substrate's surface. The rubbing roller also pushes the pile PIL against the substrate's surface by applying proper pressure (shown as an outlined arrow "Press").

In FIG. 14(C), the rubbing roller ROL is approaching from the left side of the substrate surface to a bump having a height "h" from the surface. The bump is defined as an elevation formed on the substrate surface and representing a step on the plane to be rubbed, in this specification. Moving the rubbing roller to the right side from the position shown in FIG. 14(C), the pile PIL is pushed up by an upper surface of the bump and leaves from the surface of the substrate. Then, the rubbing roller ROL moves over the bump. Consequently, the portion of the substrate surface onto which the pile PIL cannot contact or can be hardly pressed even if it can contact, appears in a length of x extending from the left edge of the bump. Thus, dents extending along the predetermined direction as shown FIG. 14(B) cannot be formed or can hardly form a sufficient pattern on this portion, so that liquid crystal molecules facing this portion cannot be oriented to satisfy the above-mentioned initial orientating (alignment) direction.

The conventional liquid crystal display device having a structure shown in FIG. 1 covers bumps formed in a pixel region by a pixel electrode PX, etc. with a protective film (an insulating film formed of silicon oxide, silicon nitride, etc.), and limits the rubbing defects around the bumps so as not to impede the displaying performance. However, the inventors recognize that even if the overlapping of the electrode PX and the signal lines CL in FIG. 14(A) is covered with the protective film, the rubbing defects still impedes the displaying performance and deteriorates the image quality of the liquid crystal display device.

3. Preferred Electrode Structures for Suppressing "Alignment Defects"

Preferred electrode structures for suppressing "alignment defects" are hereinafter described in detail. In the following description, components having the same function are given the same reference symbol in the drawings and will not be described repeatedly.

Figure 16:
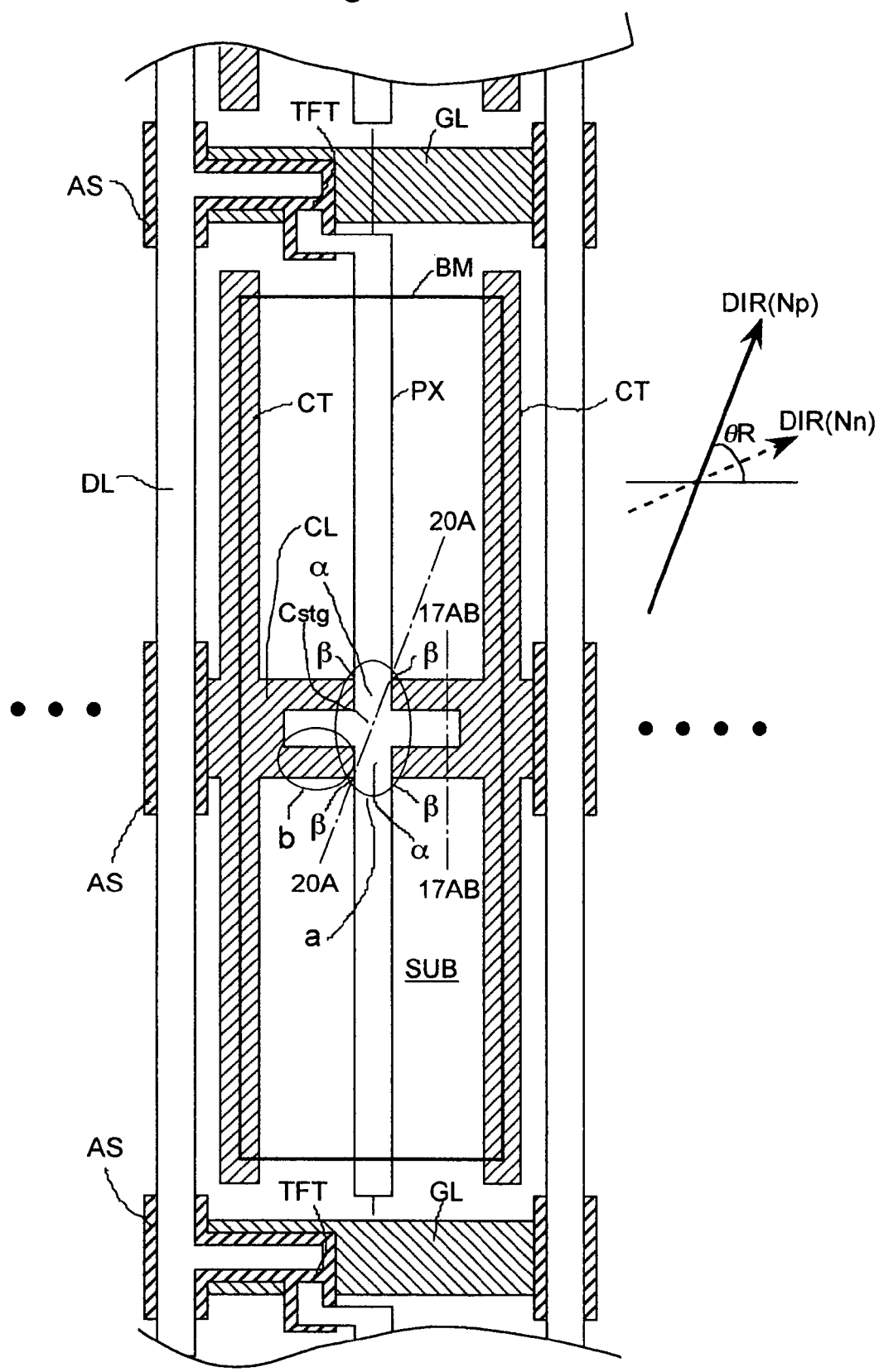
FIG. 16 is a schematic plan view of one pixel that is enclosed by a light shield film, that is, the main structure of a liquid crystal display device according to a first embodiment of the present invention.

FIG. 16 is a schematic plan view of one pixel that is enclosed by a light shield film, that is, the main structure of a liquid crystal display device according to a first embodiment of the invention.

Referring to FIG. 16, when a thin-film transistor TFT that is constituted of a video signal line DL, a scanning signal line GL, and an a-Si film is turned on, a signal voltage of the video signal line DL is transmitted to a pixel electrode PX and held by a storage capacitor portion Cstg that is composed of an counter voltage signal line CL and the pixel electrode PX (a dielectric film (insulating film) PS1 formed between the counter voltage signal line CL and the pixel electrode PX is not shown in FIG. 16).

A liquid crystal existing between the pixel electrode PX and the counter electrode CT is driven by the signal held by the storage capacitor portion Cstg.

The counter voltage signal line CL is located approximately at the center of the opening (pixel region) of a black matrix BM, and the initial alignment direction of liquid crystal molecules form an angle θR with the counter voltage signal line CL. In general, the angle θR is 60°-90°.

Figure 17:
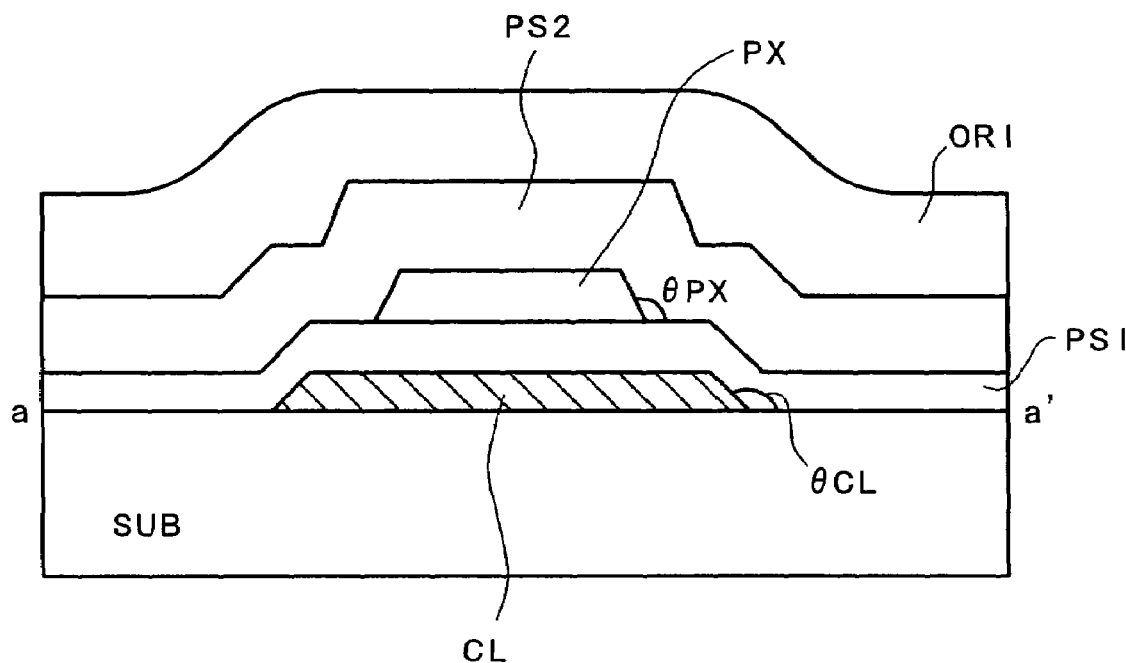
FIGS. 17(A) and 17(B) are sectional views of the storage capacitor portion Cstg taken along line a-a' in FIG. 1.
Figure 17:
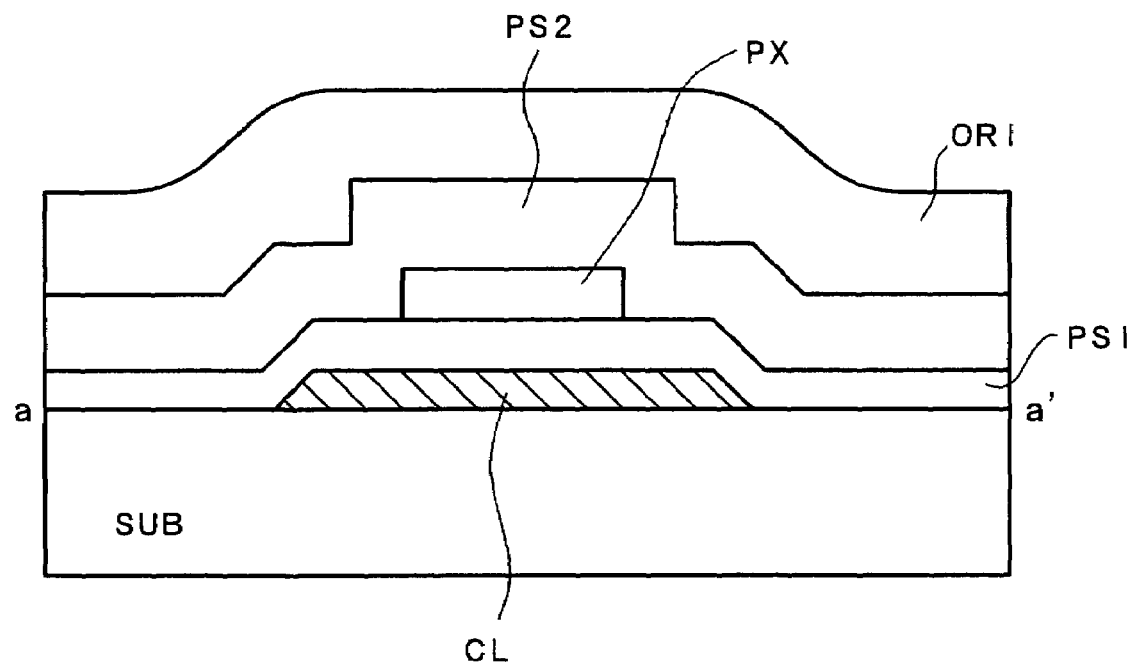

FIGS. 17(A) and 17(B) are different possible sectional view constructions of the storage capacitor portion Cstg taken along line 17AB-17AB in FIG. 16. The capacitor portion Cstg has been previously described. Therefore, forming the counter voltage signal line CL of a sputtered aluminum film, its dielectric film denoted as the passivation film PS1 is composed of the anodic oxide film AOF and the insulating film GI in FIG. 12 as the gate insulating film GI of the thin-film transistor TFT. As shown in FIG. 17(A), end portions of the counter voltage signal line CL and the pixel electrode PX have respective inclination angles θCL and θPX with respect to the surface of a substrate SUB. This substrate SUB is for example denoted by symbol SUB1 in FIGS. 2 and 3, previously. Symbols PS1 and PS2 denote passivation films (protective films, i.e., insulating films).

In alignment treatment on the liquid crystal composition is performed in such a manner that the surface of an alignment film ORI that has been applied to the passivation film PS2 that covers the entire substrate surface including the pixel electrode PX (see FIG. 17(A)) with a buffing cloth made of Rayon fiber. Having the layered structure including the electrode films and the insulating film, the storage capacitor portion Cstg is thicker than the other portions in the pixel region (effective display region) and hence obstructs the liquid crystal alignment treatment. That is, in the rubbing treatment in which a roller (rubbing roller) wound with the buffing cloth is moved, while being rotated, so that the distance from the alignment film ORI is kept such a constant value that the buffing cloth is in contact with the alignment film ORI, the rubbing roller runs onto the above step portion. At the peripheries of the step portion, the buffing cloth does not contact the alignment film ORI normally or the rubbing amount is varied, as a result of which what is called a rubbing defect may occur. The alignment film ORI is denoted for example by symbol ORI1 in FIG. 2, previously.

In this embodiment, as shown in FIG. 17(A), relationships $\theta PX<\theta CL$ and $90°<\theta CL$ hold and the pattern of the pixel electrode PX (upper layer) and the pattern of the counter voltage signal line CL are so formed that the overlapping pixel patterns is within the counter voltage signal line pattern, that is, the projected shape of the counter voltage signal line CL occupies most of the outline shape of the layered structure that constitutes the storage capacitor portion Cstg. Therefore, the boundary between the pattern of the entire storage capacitor Cstg and the other portions in the pixel region is smooth (has a gentle slope) and hence does not obstruct the rubbing treatment. The frequency of occurrence of alignment defects can thus be reduced.

Consider a case such as shown in FIG. 17(B) that the inclination angle $\theta PX$ is close to 90° or even smaller than 90° and a rubbing defect occurs at an end of the pixel electrode PX. Even in this case, if the counter voltage signal line CL is made of an opaque metal material, the rubbing defect does not affect display because the rubbing defect portion is shielded from light.

Figure 18:
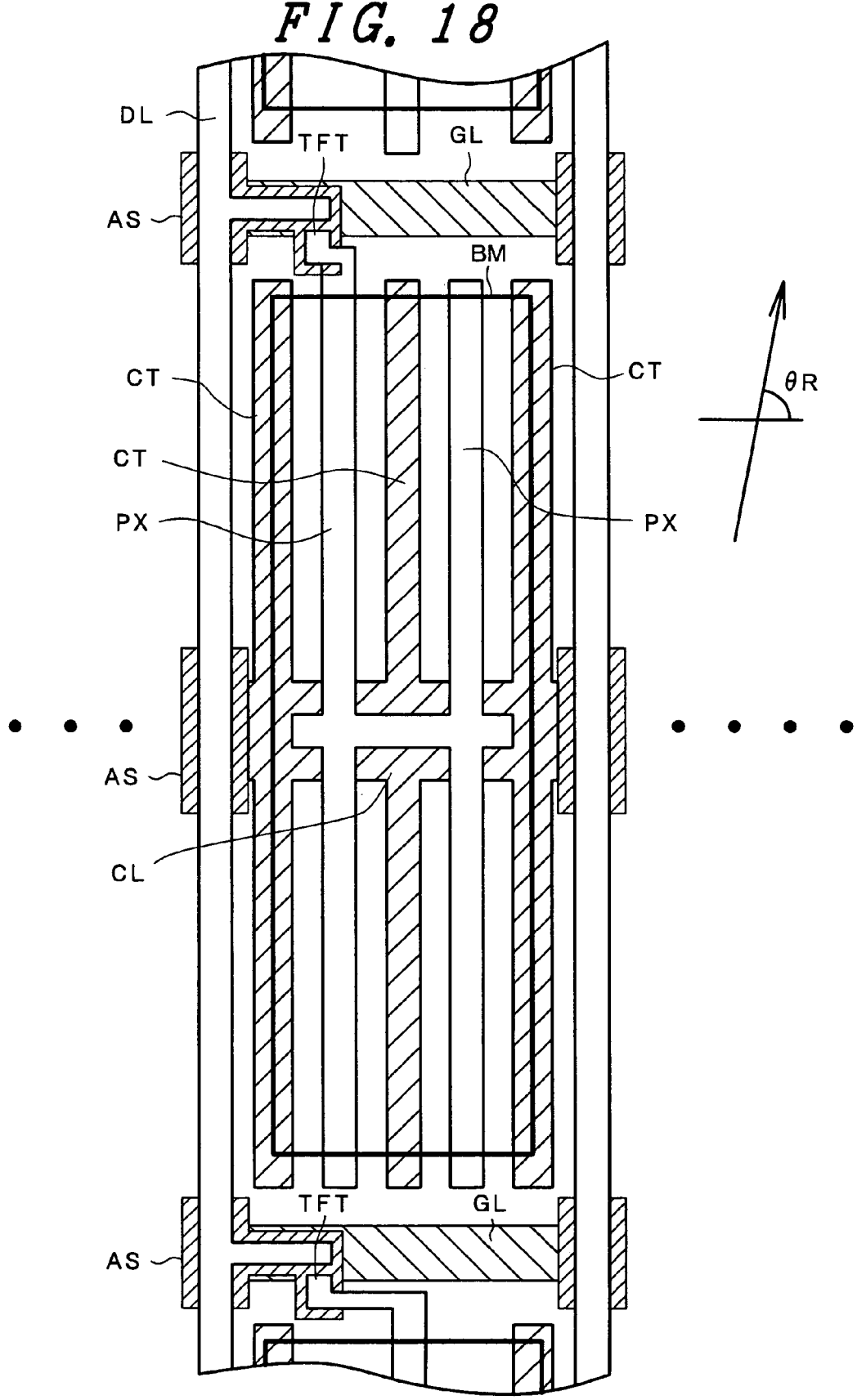
FIG. 18 is a schematic plan view of one pixel that is enclosed by a light shield film, that is, the main structure of a liquid crystal display device according to a second embodiment of the invention.

FIG. 18 is a schematic plan view of one pixel that is enclosed by a light shield film, that is, the main structure of a liquid crystal display device according to a second embodiment of the invention.

This embodiment has the same configuration as the first embodiment of FIG. 16 except that the numbers of comb-teeth portions of pixel electrodes PX and counter electrodes CT are increased. This configuration is suitable for a liquid crystal display device having a large screen.

Figure 19:
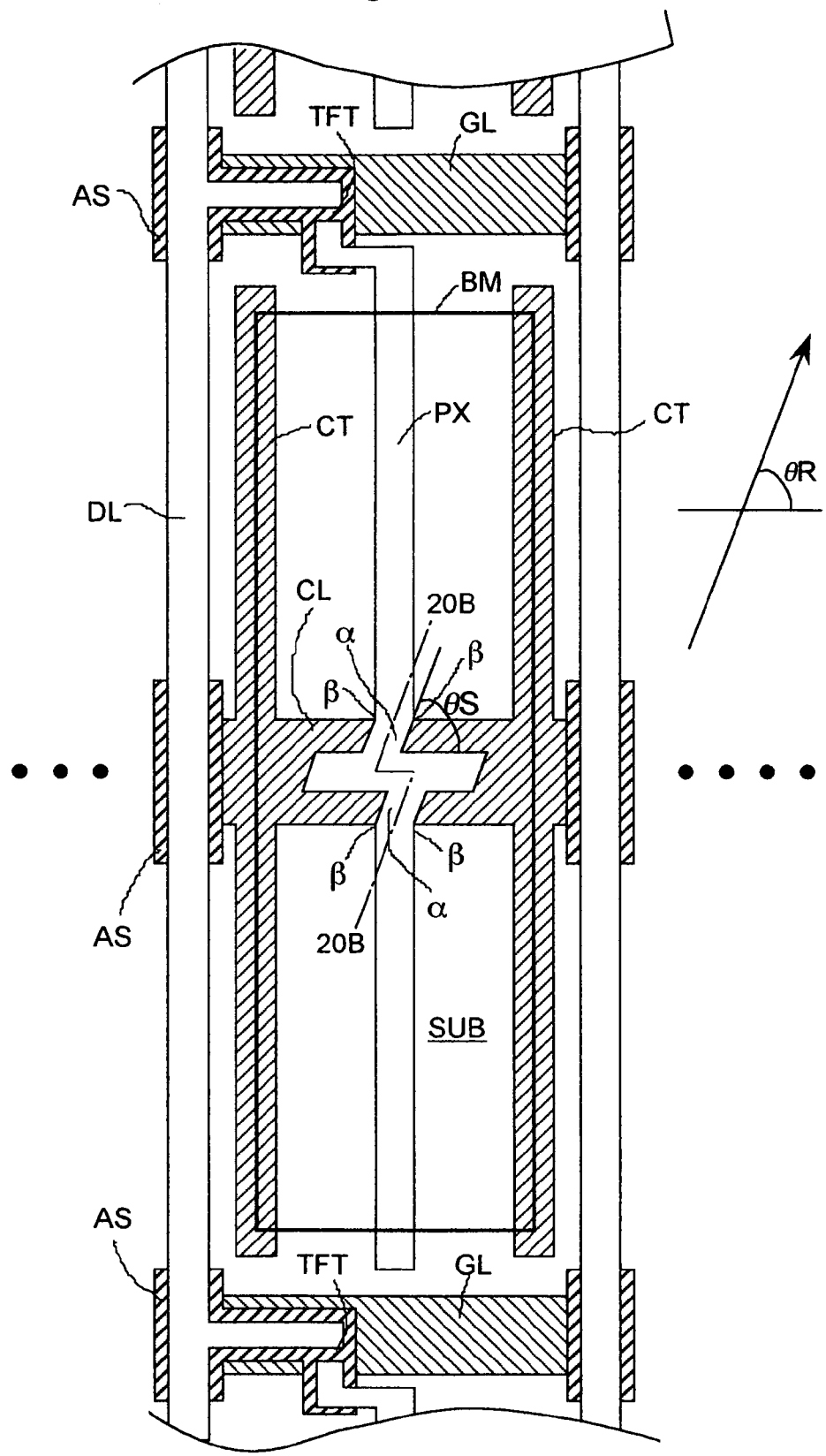
FIG. 19 is a schematic plan view of one pixel that is enclosed by a light shield film, that is, the main structure of a liquid crystal display device according to a third embodiment of the invention.
Figure 20:
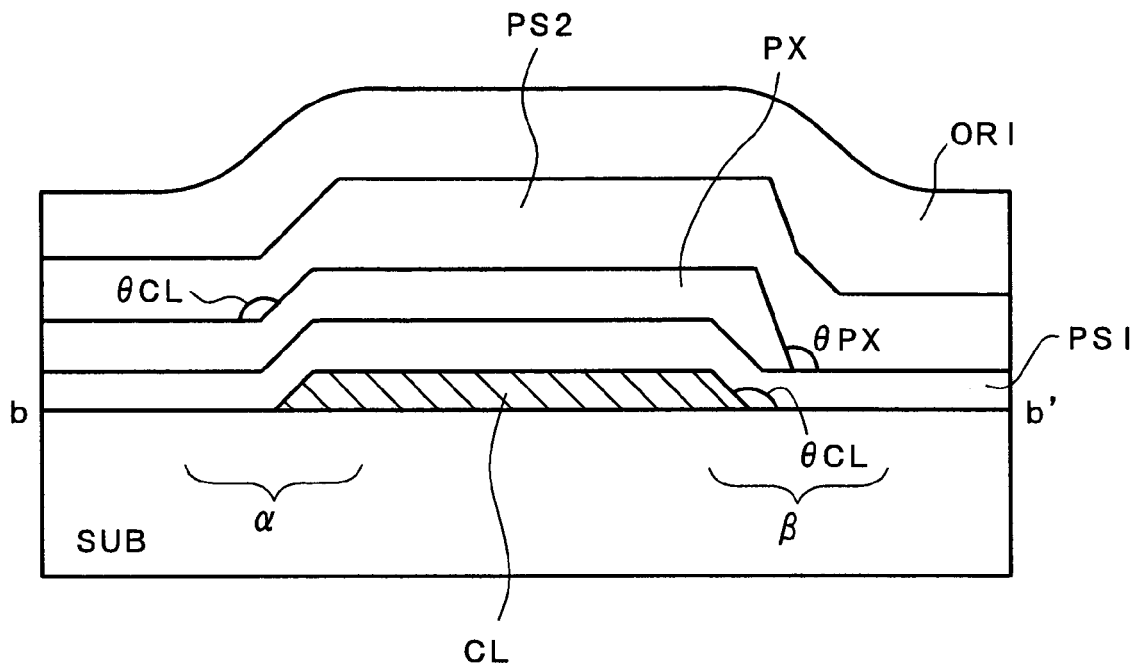
Figure 20:
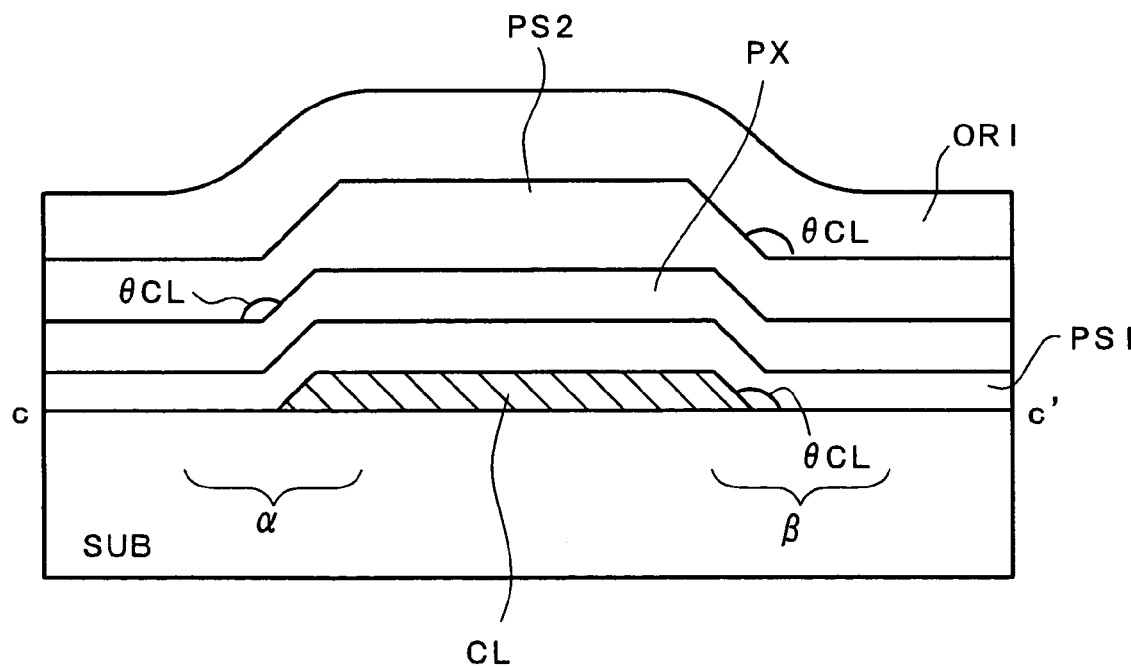

FIG. 19 is a schematic plan view of one pixel that is enclosed by a light shield film, that is, the main structure of a liquid crystal display device according to a third embodiment of the invention. FIGS. 20(A) and 20(B) are sectional views taken along line 20A-20A in FIG. 16 and line 20B-20B in FIG. 19, respectively.

In the first embodiment, as shown in FIG. 16, the portions of the pixel electrode PX that are connected to the storage capacitor Cstg cross the level differences at the peripheries of the counter voltage signal line CL.

In the portions indicated by symbol a in FIG. 16 (also indicated by symbol $\alpha$ in FIG. 20(A)) of the pixel electrode PX at the crossing portions, the inclination angle is approximately equal to the inclination angle $\theta CL$ of the gently sloped peripheries the counter voltage signal line CL (lower layer). Therefore, even the probability that a large level difference causes a rubbing defect is low.

However, in the peripheral portions (indicated by symbol $\beta$ in FIG. 16; also indicated by symbol $\beta$ in FIG. 20(A)) of the pixel electrode PX at the crossing portions, the inclination angle $\theta PX$ is larger than $\theta CL$. Because of the steep inclination in the rubbing direction, a rubbing defect likely occurs in these peripheral portions.

In view of the above, in this embodiment, the direction $\theta S$ of the peripheries of the pixel electrode PX at the crossing portions with respect to the counter voltage signal line CL is made equal to the rubbing direction $\theta R$ as shown in FIG. 19.

FIG. 20(B) is a sectional view taken along line 20B-20B in FIG. 19 that is parallel with the rubbing direction $\theta R$. In the portions indicated by symbol $\alpha$ in FIG. 19 (also indicated by symbol a in FIG. 20(B)) of the pixel electrode PX at the crossing portions, the inclination angle is approximately equal to the inclination angle $\theta CL$ of the gently sloped peripheries the counter voltage signal line CL (lower layer). Therefore, even the probability that a large level difference causes a rubbing defect is low.

In the peripheral portions (indicated by symbol $\beta$ in FIG. 19; also indicated by symbol $\beta$ in FIG. 20(B)) of the pixel electrode PX at the crossing portions where the first embodiment is problematic, there is the same level difference as in the portions indicated by in FIG. 20(A). However, since the direction $\theta S$ of the peripheries of the pixel electrode PX at the crossing portions is made equal to the rubbing direction $\theta R$, the level difference portions (indicated by symbol $\beta$) do not obstruct the movement of the rubbing roller. Therefore, the frequency of occurrence of rubbing defects is low.

Figure 21:
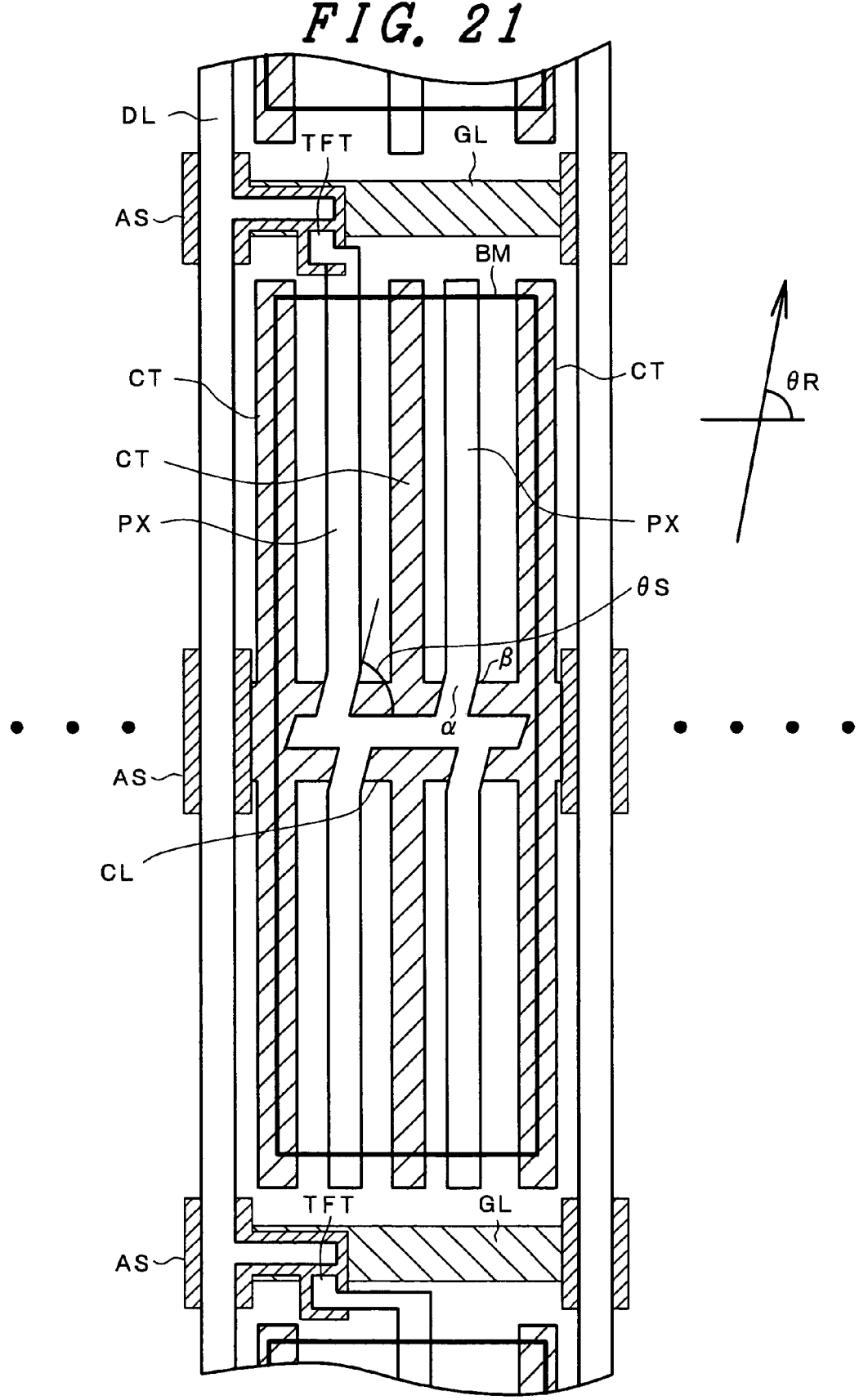
FIG. 21 is a schematic plan view of one pixel that is enclosed by a light shield film, that is, the main structure of a liquid crystal display device according to a fourth embodiment of the invention.

FIG. 21 is a schematic plan view of one pixel that is enclosed by a light shield film, that is, the main structure of a liquid crystal display device according to a fourth embodiment of the invention.

This embodiment has the same configuration as the third embodiment of FIG. 19 except that the numbers of comb-teeth portions of pixel electrodes PX and counter electrodes CT are increased. This configuration is suitable for a liquid crystal display device having a large screen.

Figure 22:
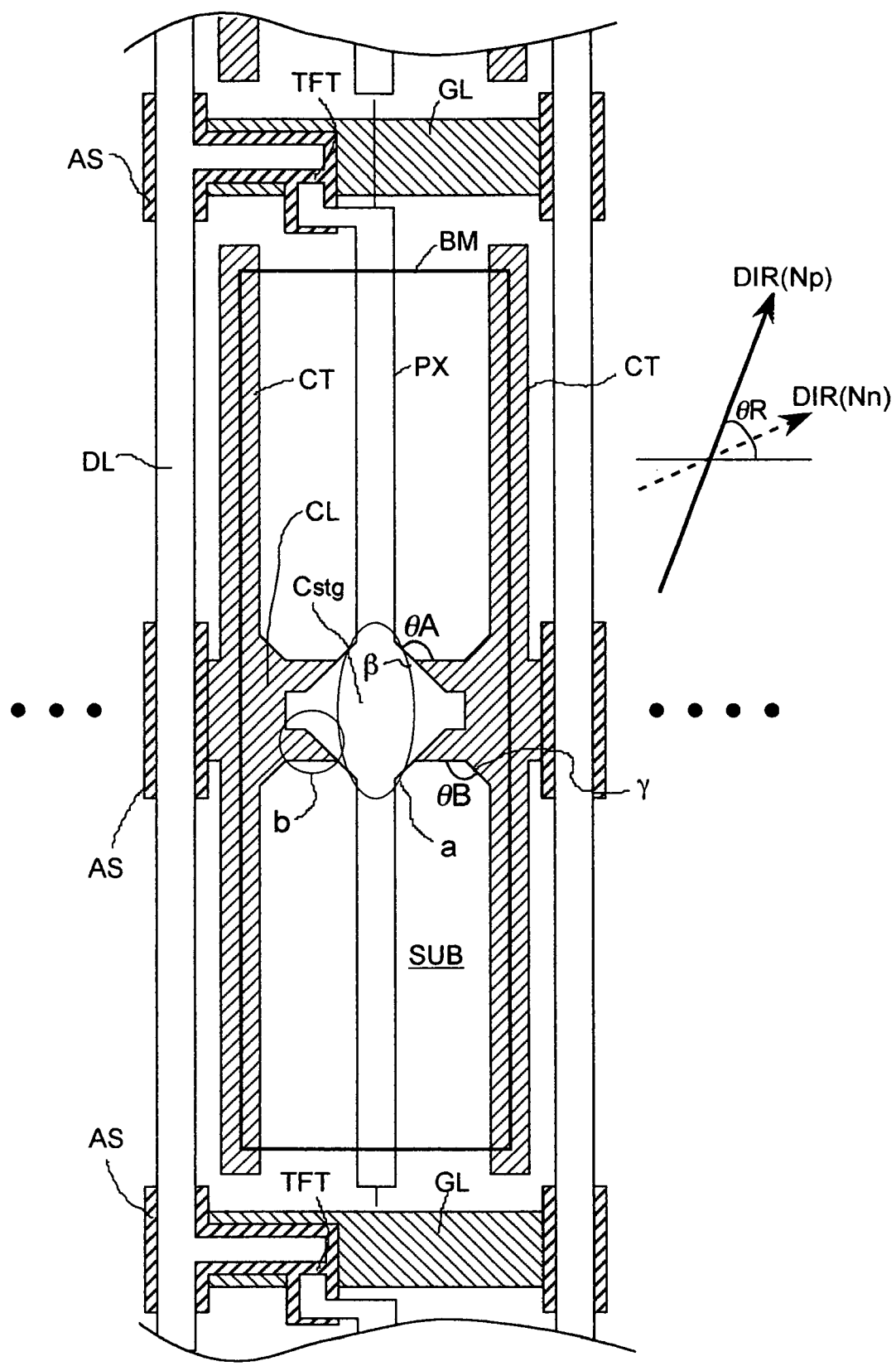
FIG. 22 is a schematic plan view of one pixel that is enclosed by a light shield film, that is, the main structure of a liquid crystal display device according to a fifth embodiment of the invention.

FIG. 22 is a schematic plan view of one pixel that is enclosed by a light shield film, that is, the main structure of a liquid crystal display device according to a fifth embodiment of the invention. In the third embodiment, the occurrence of a rubbing defect is prevented by equalizing the direction $\theta S$ of the peripheries of those portions of the pixel electrode PX that are connected to the storage capacitor Cstg to the rubbing direction $\theta R$ at the crossing portions having a level difference where those portions of the pixel electrode PX cross the counter voltage signal line CL.

On the other hand, in this embodiment, a crossing angle $\theta A$ and a joining angle $\theta B$ at wiring crossing portions $\beta$ and wiring joining portions $\gamma$, respectively, that are exposed in the opening of the light shield film BM are made obtuse angles (smaller than 180°). As a result, the passivation films can be formed smoothly in the vicinity of the wiring crossing portions $\beta$ and the wiring joining portions $\gamma$. Therefore, the level differences can be reduced and the occurrence of a rubbing defect can be prevented.

The cross-section of the wiring crossing portions $\beta$ is the same as that of the portions $\beta$ shown in FIG. 20(A) (third embodiment). By virtue of the crossing angle $\theta A$ being an obtuse angle, the passivation film PS2 can be formed smoothly and hence the alignment film ORI can also be formed smoothly on the passivation film PS2. Therefore, the movement of the rubbing roller can be made smooth and the occurrence of a rubbing defect can be prevented. Similarly, as for the wiring joining portions γ, by virtue of the joining angle θB being an obtuse angle, the passivation films PS1 and PS2 can be formed smoothly and hence the occurrence of a rubbing defect can be prevented.

Figure 23:
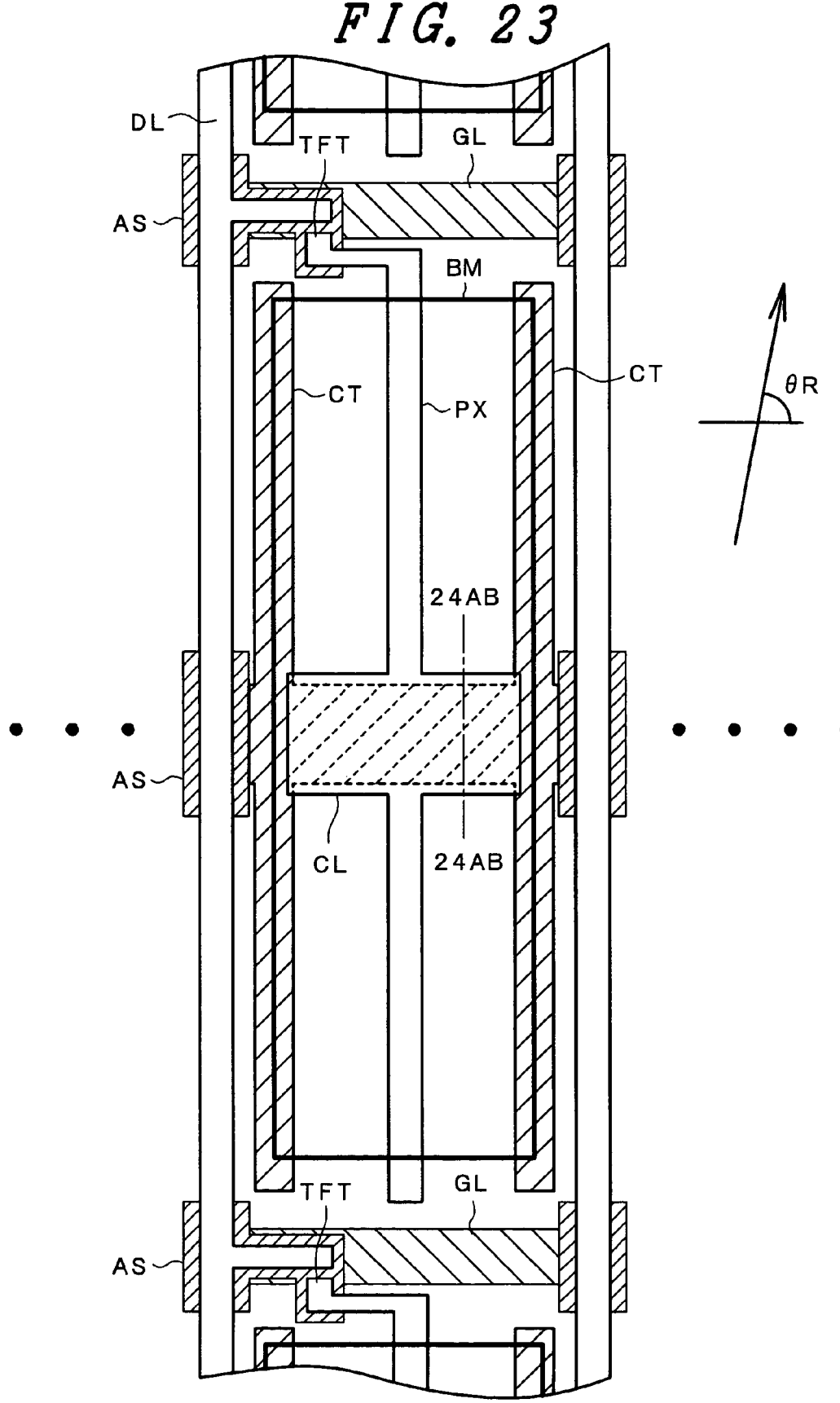
FIG. 23 is a schematic plan view of one pixel that is enclosed by a light shield film, that is, the main structure of a liquid crystal display device according to a sixth embodiment of the invention.
Figure 24:
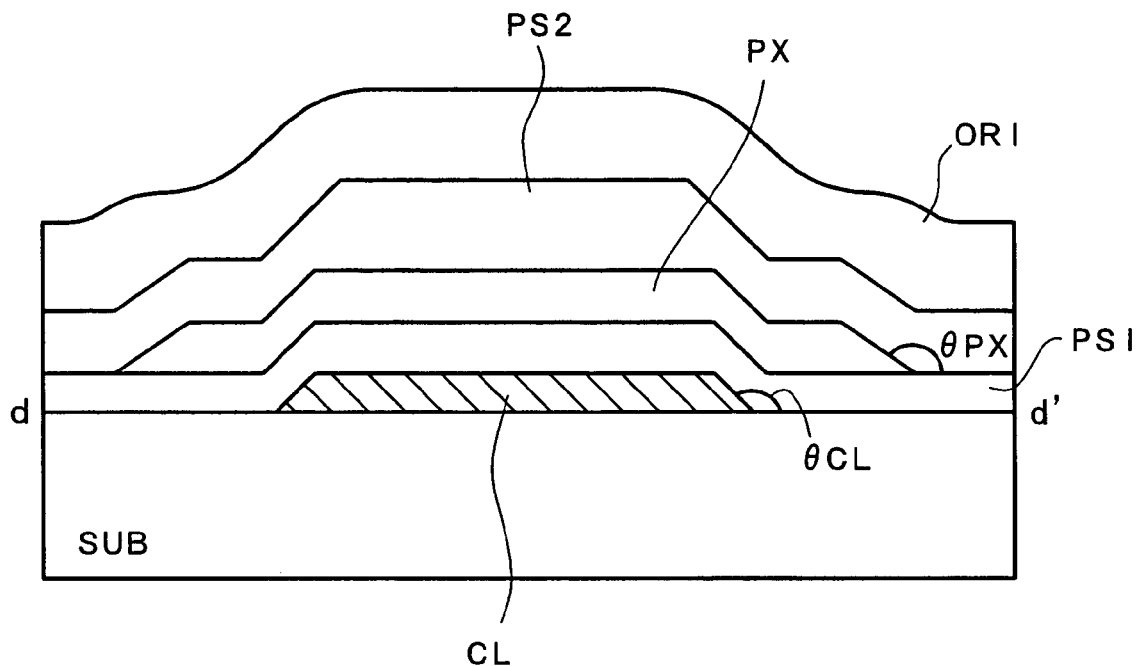
FIGS. 24(A) and 24(B) are sectional views taken along line 24AB-24AB in FIG. 23.
Figure 24:
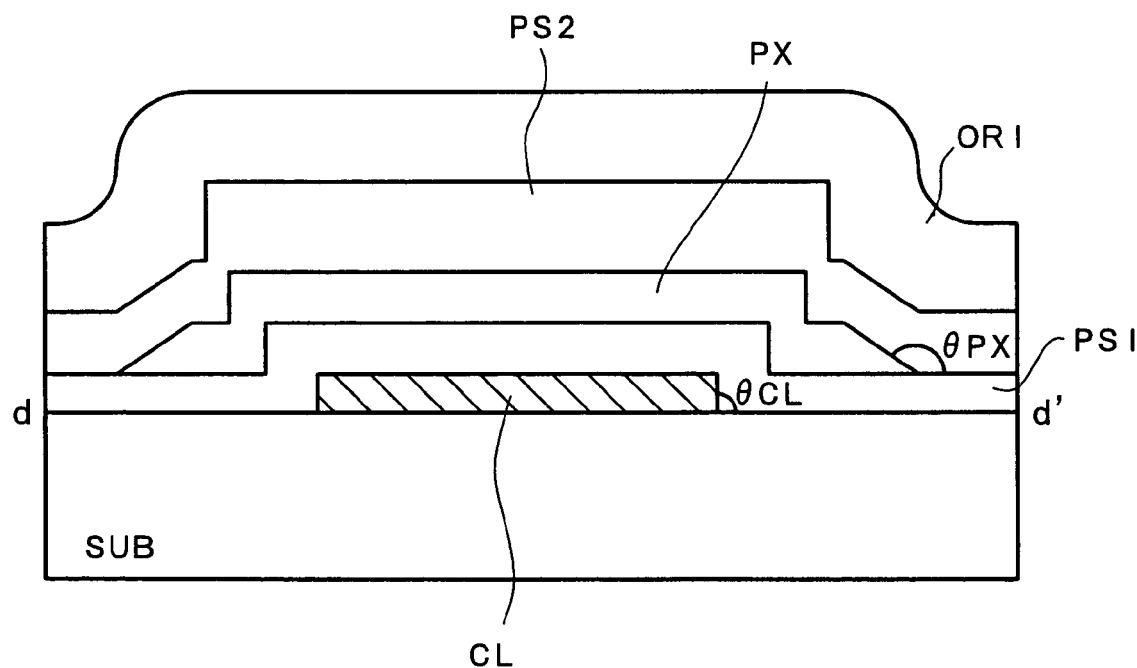

FIG. 23 is a schematic plan view of one pixel that is enclosed by a light shield film, that is, the main structure of a liquid crystal display device according to a sixth embodiment of the invention. FIGS. 24(A) and 24(B) are sectional views representing two different possible constructions taken along line 24AB-24AB in FIG. 23.

In the storage capacitor portion Cstg shown in FIG. 23, the projected outline shape of the pixel electrode PX (upper layer) extends beyond the peripheries of the counter voltage signal line CL (lower layer), to occupy most of the projected outline shape of the storage capacitor portion Cstg.

In this embodiment, as shown in FIG. 24(A), an inclination angle θPX of peripheries of the pixel electrode PX is set larger than an inclination angle θCL of the peripheries of the counter voltage signal line CL (θPX>θCL) and larger than 90° (θPX>90°).

By virtue of the structure that the pattern of the pixel electrode PX (upper layer) extends beyond the counter voltage signal line CL (lower layer), the boundary film ORI can be formed smoothly at the boundary of the storage capacitor Cstg and hence the occurrence of a rubbing defect can be prevented.

Consider a case that the inclination angle θCL of the peripheries of the counter voltage signal line CL is 90° or close to 90° or even smaller than 90□ as shown in FIG. 24(B) and a rubbing defect occurs at portions of the pixel electrode PX corresponding to the peripheries of the counter voltage signal line CL. Even in this case, if the pixel electrode PX is made of an opaque metal material or the like, the rubbing defect does not affect display because the rubbing defect portion is shielded from light.

Figure 25:
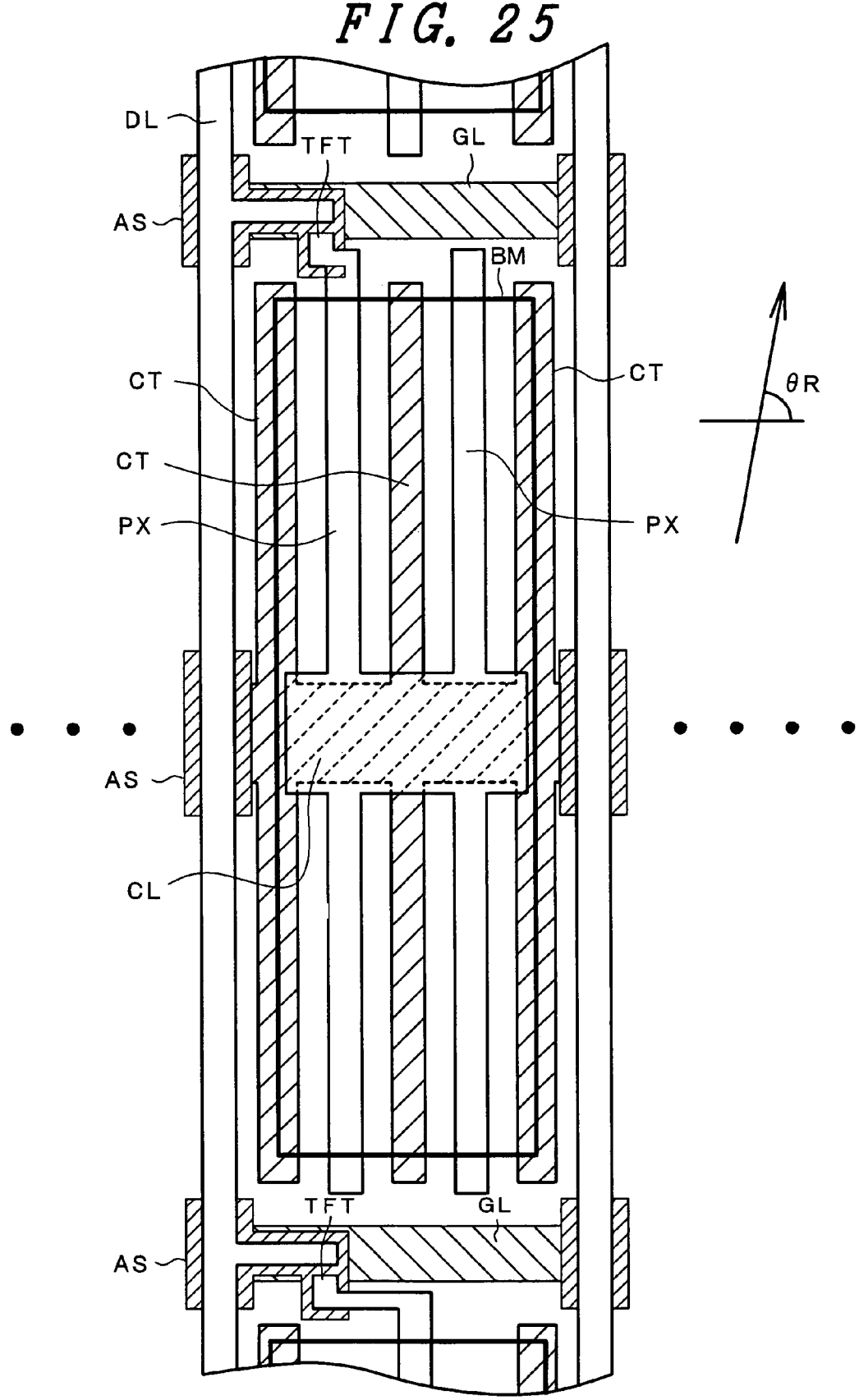
FIG. 25 is a schematic plan view of one pixel that is enclosed by a light shield film, that is, the main structure of a liquid crystal display device according to a seventh embodiment of the invention.

FIG. 25 is a schematic plan view of one pixel that is enclosed by a light shield film, that is, the main structure of a liquid crystal display device according to an seventh embodiment of the invention.

This embodiment has the same configuration as the sixth embodiment of FIG. 23 except that the numbers of comb-teeth portions of pixel electrodes PX and counter electrodes CT are increased. This configuration is suitable for a liquid crystal display device having a large screen.

The preceding first to seventh embodiments are based on the inventors recognition that the rubbing defects (causing the alignment defects) depend on mainly a bump existing on the rubbing direction. The structural feature common to these embodiments is explained with respect to FIG. 16 which has the most simplified electrode structure in these embodiments.

As FIG. 16 shows, this common structural feature is to arrange the conductive layers extending along different directions and crossing each other in the pixel region in the following manner. One of the conductive layers overlaps with another conductive layer so as to have the outline thereof within the outline of the another conductive layer at the overlapping portion, and at least one of the conductive layers extends along the direction of another of the conductive layers at the overlapping portion. Each of the conductive layers represents an object forming a bump and increasing a height of the bump as a result of overlapping with another conductive layer inside a pixel region. Generally speaking, such objects are in the form of conductive layers carrying electric signals or applying voltage inside the pixel region.

Figure 26A:
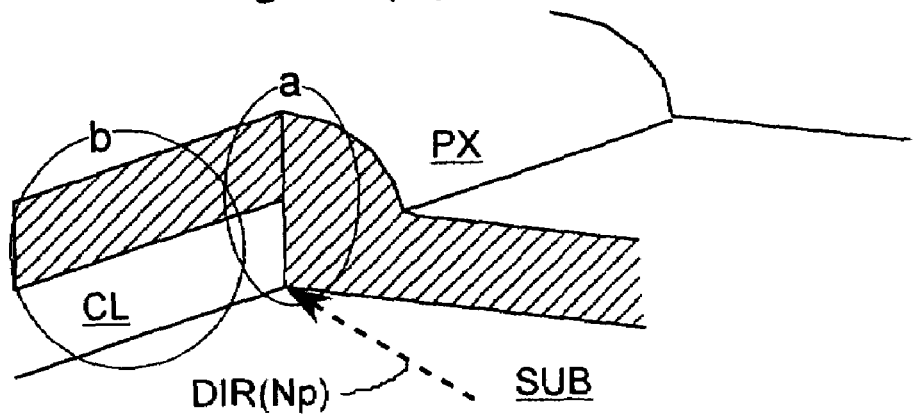
FIGS. 26(A)-26(C) are sketches of circled portions "a" at each of which the pixel electrode gets over the counter voltage signal line CL, of FIGS. 14A, 16, 22, in this order.
Figure 26B:
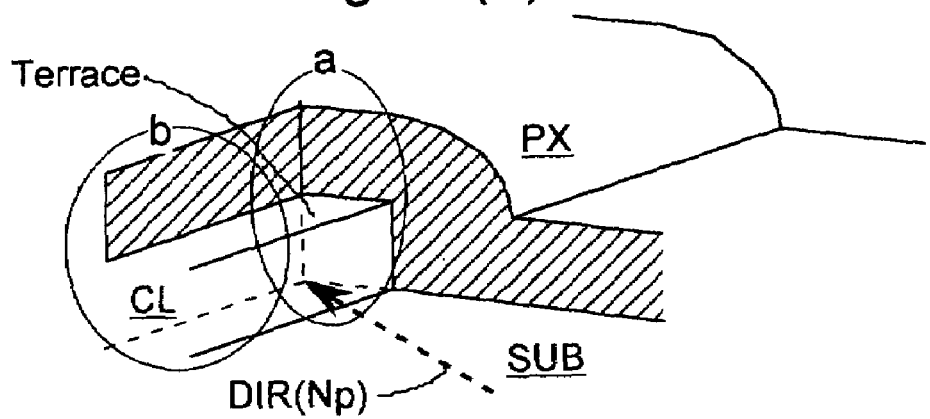

Comparing the structures of FIG. 14(A) and FIG. 16, the portions a and b in FIG. 14(A) causing rubbing defects are represented in FIG. 26(A), and the portions a and b in FIG. 16 are represented in FIG. 26(B). Comparing FIGS. 26(A) and 26(B), it is apparent that a "terrace" of the counter voltage signal line CL appears on the rubbing direction DIR(Np) in FIG. 26(B). If the bump in FIG. 14(C) has a terrace at its side in the manner of the portion b in FIG. 26B, the rubbing roller can move on the substrate surface closer to the bump, and then moves over the terrace. Thus, the distance x in FIG. 14(C) is reduced. Applying this model to the structure of FIG. 26(B), the rubbing defects around the overlapping of the counter voltage signal line CL and the pixel electrode PX can be reduced sufficiently to prevent the pixel of FIG. 16 from deteriorating its displaying performance and image quality.

Based on this consideration, the structure of FIG. 27 can also provide the same effect as that of the structure of FIG. 16 for suppressing the alignment defects. In FIG. 27, the counter voltage signal line CL has the branch portions extending along the pixel electrode PX and having outlines within the pixel electrode. Because the branch portions of the counter voltage signal line CL are disposed under the pixel electrode PX (as shown by dotted rectangles), they form the terraces on the upper surface of the pixel electrode PX along their outlines. This terrace avoids the alignment defects in the same way as that in FIG. 16.

The structure of FIG. 27 is advantageous to the liquid crystal display device using nematic liquid crystal materials called "Nn-type" as will be explained below.

In spite of the preceding explanation on the structure of FIG. 15, the alignment defects can increase significantly even in this structure in the case of using the Nn-type liquid crystal materials, because the probability of the alignment defects depends on the relationship of a rubbing direction and an extending direction of the bump elevated by the overlapping of the conductive layers.

Liquid crystal molecules generally have structures extending one direction clearly. FIG. 28 illustrates one of liquid crystal molecules as an example. This molecule has a fluorine atom and a cyanic base bonded to a benzene-ring (aromatic ring) at its end. In this specification, liquid crystal molecules are represented as a cylinder. Liquid crystal molecules are also characterized by their dielectric constants. There are two kinds of the dielectric constants existing in a liquid crystal molecule, one is denoted as $\epsilon_1$ in FIG. 28 along a major axis of the molecule (the cylinder), and another is denoted as $\epsilon_2$ along a minor axis of the molecule. Generally, values of $\epsilon_1$ and $\epsilon_2$ are different form each other and the difference called "Dielectric Anisotropy" is defined as $\Delta\epsilon = \epsilon_1 - \epsilon_2$.

Liquid crystal materials for IPS-type liquid crystal display devices, generally are of two types of nematic liquid crystal molecules. One is "Np-type" having a larger $\epsilon_1$ than its $\epsilon_2$ (thus $\Delta\epsilon > 0$), and another is the "Nn-type" having a smaller $\epsilon_1$ than its $\epsilon_2$ (thus $\Delta\epsilon < 0$).

Designing a liquid crystal display device using Np-type liquid crystal molecules, the molecules are oriented so as to arrange their major axes along an extending direction of its pixel electrode PX or its counter electrode CT, or to suppress angles at which their major axes meet an extending direction of the electrode PX or CT display devices.

On the other hand, designing a liquid crystal display device using Nn-type liquid crystal molecules, the molecules are oriented so as to arrange their major axes vertical to an extending direction of its pixel electrode PX or its counter electrode CT, or to enlarge angles at which their major axes meet an extending direction of the electrode PX or CT display devices.

Therefore, a rubbing direction suitable for the liquid crystal display device using Np-type is different from that for the device using Nn-type. These differences are illustrated in each of FIGS. 16 and 27 with an arrow DIR(Np) for Np-type and an arrow DIR(Nn) for Nn-type. Comparing the structures of FIGS. 15 and 27 with attention to the rubbing direction DIR(Nn) and referring to the explanation on the circled portions a and b, it is apparent how alignment defects appear at the circled portions a and c in FIG. 15.

Figure 26C:
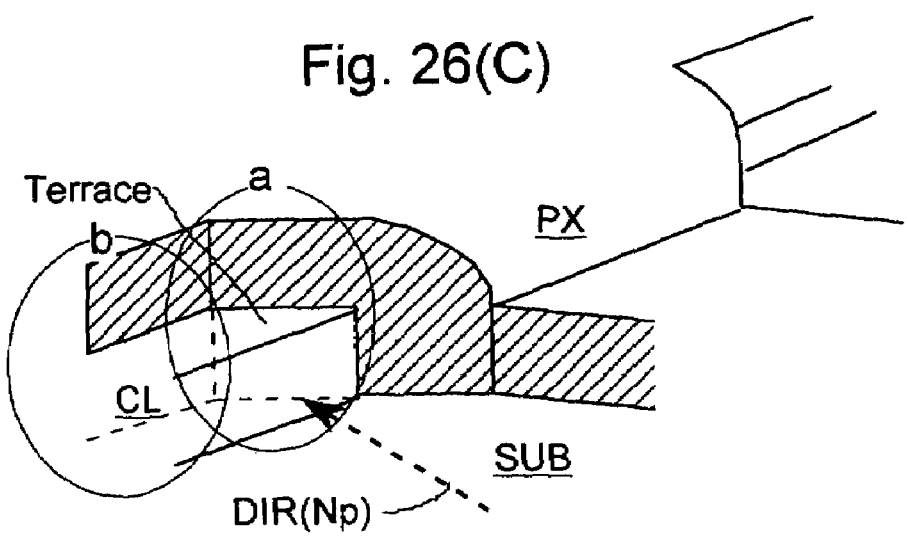

The important fact to be recognized in both of the structures of FIGS. 16 and 27 is that the rubbing roller inevitably moves over the above-mentioned "terrace" regardless of its direction whenever it moves over the overlapping of the counter voltage signal line CL and the pixel electrode PX. This fact is also found in the structures of FIG. 22 by applying the same consideration with FIG. 26(C) as that for FIG. 16 with FIG. 26(B). Forming corners of at least one of the counter voltage signal line CL and the pixel electrode PX at the crossing portion of them with a plurality of obtuse angles as shown in FIG. 22, the "terraces" also appear at the crossing portion as shown in FIG. 26(C). Thus, each of the structures of FIGS. 16, 22, and 27 can suppress the above mentioned alignment defects regardless of their rubbing directions. Even if the counter voltage signal line CL is substituted for the counter electrode CT, each of the structures also prevents displaying performance and image quality of the liquid crystal display device incorporating the same it from being deteriorated by the alignment defects.

As mentioned previously, the rubbing condition depends on the operating condition of a rubbing roller and the condition of the protective layer formed between conductive layers crossing each other and an uppermost surface of the substrate having the rubbing treatment applied thereto. Therefore, the options to form the side of at least one of the conductive layers to be slanted by etching, or to extend at least one of the conductive layers along the rubbing direction around the overlapping portion are also recommended to ensure further prevention for the alignment defects.

4. Preferred Electrode Structures for Preventing "Display Failure"

During the consideration for the preceding structures, the inventors analyzed the problem of a display failure of a liquid crystal display device caused by deterioration of the maintaining voltage applied to the liquid crystal layer (i.e. the driving voltage of a liquid crystal layer). This problem has been considered to be caused by trace pollutants of the electrode material which dissolve into the liquid crystal layer as contaminants. Therefore, the problem has been considered to be solved by an aging treatment of the liquid crystal display device to exhaust the dissolvable material. However, the aging process actually promotes the contamination, and the region causing the display failure extends in a pixel region along the orientating direction of liquid crystal molecules.

Surveying the liquid crystal display devices having a structure of FIG. 14(A) and having the above-mentioned display failure, holes were found on the protective films (insulating films) covering corners of conductive layers CT, CL, PX in circled portions a and e, respectively. Then, the inventors considered another structure to alter the corners joining the counter electrode CT to the counter voltage signal line CL at the portion e. The corner of the another structure has a different shape as shown in FIG. 29(D) from that shown in FIG. 29(A) utilized in the structure of FIG. 14(A). The electrode structure shown in FIG. 29(A) is an enlarged image of the corner located left lower part of the circled portion e in FIG. 14(A). Each of FIGS. 29(B) and 29(E) shows a shape of an insulating film formed over each corner shown in FIGS. 29(A) and 29(D) by chemical vapor deposition.

The active matrix type liquid crystal display has at least two kinds of insulating films above its the substrate. One is a protective film PS1 (also called "gate insulating film") to separate a channel of the switching device (such as a transistor TFT in FIG. 14(A)) for applying driving voltage to the pixel electrode PX and a electrode (such as a gate line GL in FIG. 14(A)) for controlling the switching device. A channel is a region through which carriers (electrons or positive holes) pass, and shown as an amorphous silicon region AS of the switching device TFT in FIG. 14(A). The other is a protective film PS2 covering such conductive layers as the pixel electrode, etc. so as to reduce roughness appearing in the uppermost surface of the substrate caused by these conductive layers. This uppermost surface faces the liquid crystal layer and aligns liquid crystal molecules therein along the predetermined direction.

Both of the insulating films of FIGS. 29(A) and 29(B) are formed as the former protective films PS1. As shown in FIGS. 29(A)-29(C), a hole can be found on the protection film PS1 covering the corner at which the counter electrode CT joins to the counter voltage signal line CL at right angles. On the other hand, as to the structure as shown in FIGS. 29(D) and 29(E) joining the counter electrode CT to the counter voltage signal line CL via two obtuse angles, no holes appear in the protection film PS1 covering these obtuse angled corners.

Applying the joint structure of FIG. 29(D) to the liquid crystal display devices, avoids the above-mentioned display failure.

Figure 30A:
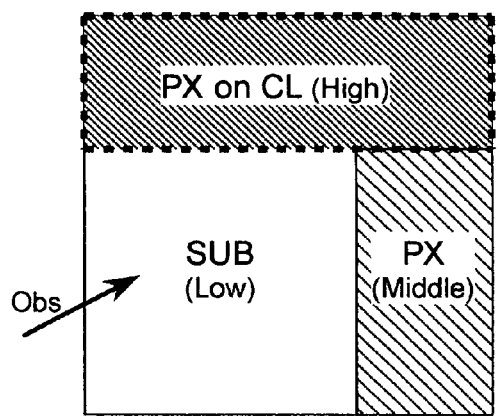
FIGS. 30(A)-30(E) are explanatory figures showing the relationship between the electrode structure and a shape of a protective films formed thereon.

Furthermore, the inventors considered the shape of the pixel electrode PX in the circled portion a of the liquid crystal display devices shown in FIG. 14(A). The electrode structure shown in FIG. 30(A) is an enlarged image of the corner located in the lower left part of the circled portion a in FIG. 14(A). In FIG. 30(A), the pixel electrode PX crosses over the counter voltage signal line CL (in the region PX on CL) and has its branches joining vertically thereto at the crossing portion and extending above the counter voltage signal line CL (in the region PX on CL). These branches (only one of them shown in the left portion of FIG. 30(A)) face to the counter voltage signal line CT via the protective film PS1 (not shown) to form a capacitance for maintaining the voltage of the pixel electrode.

Figure 30B:
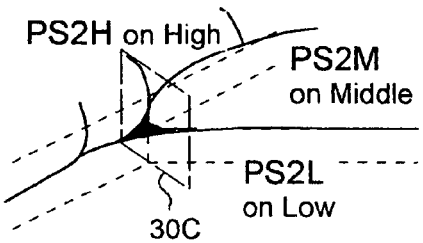
Figure 30C:
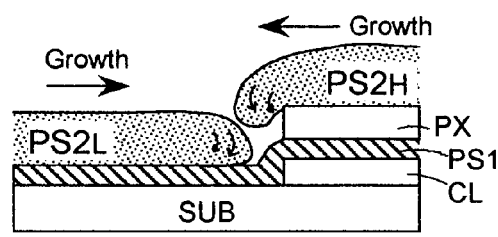
Figure 30D:
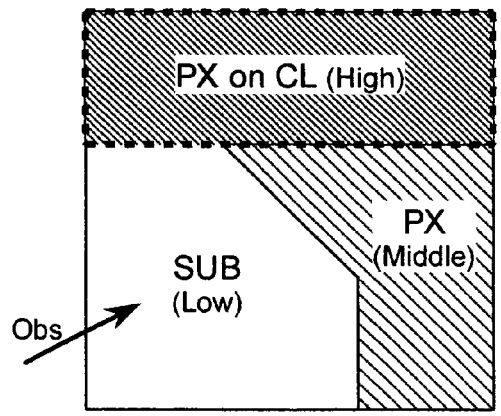
Figure 30E:
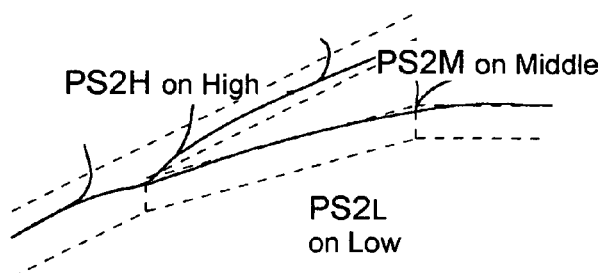

The inventors considered another electrode structure joining the pixel electrode PX to its branch with obtuse angles as shown in FIG. 30(D), and fabricated both of the electrode structure of FIGS. 30(A) and 30(D), and formed protective films PS2 over both structures by chemical vapor deposition. FIGS. 30(B) and 30(E) show shapes of the insulating films as viewed in the direction of an arrow Obs in FIGS. 30(A) and 30(D), respectively. Holes can be found in the protective film PS2 covering the corner joining the pixel electrode PX to its branch as shown in FIG. 30(A), but cannot be found on the protective films PS2 covering such corners as shown in FIG. 30(D).

Applying the joint structure of FIG. 30(D) to the liquid crystal display devices also, avoids the above-mentioned display failure.

According to these facts, the inventors recognized that the above-mentioned display failure by decrease of the driving voltage applied to a liquid crystal layer might be caused by conducting layers having different voltages applied thereto and being exposed to the liquid crystal layer via the holes piercing the protective layers covering these conductive layers respectively. This phenomenon is illustrated in FIGS. 31(A) through 31(C).

Figure 31A:
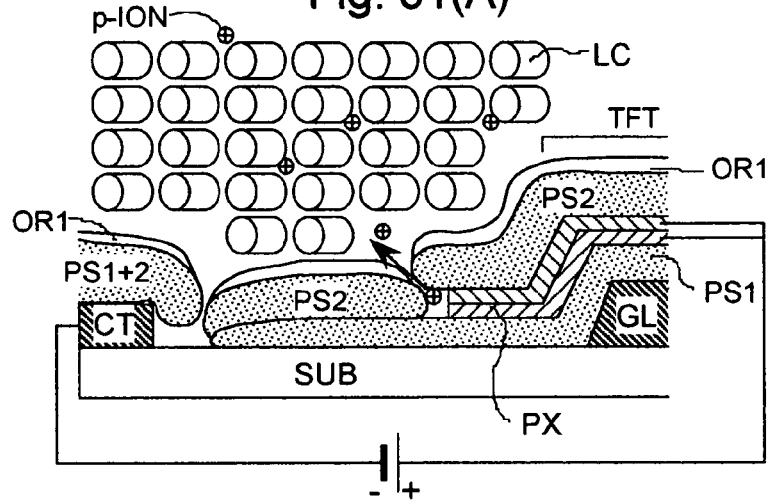
FIGS. 31A-31C are cross sectional images for explaining the progress of the contamination in the liquid crystal layer that reduces driving voltage applied to the liquid crystal molecules.

First of all, assuming the structure having the counter electrode CT formed on the substrate SUB and covered with the protective films PS1 and PS2, and the pixel electrode formed on the protective film PS1 and covered with the protective film PS2, and applying voltage between the pixel electrode PX and the counter electrode CT as shown in FIG. 31(A), this voltage will be maintained hereinafter in this explanation. Thus the potential of the pixel electrode PX is higher (positive) than that of the counter electrode CT (negative). Both of the electrodes PX and CT are exposed to the region called the liquid crystal layer in which liquid crystal molecules LC are sealed via a hole extending through the orientation film ORI1 and the protective film PS2 or the protective films PS2 and PS1.

In the condition of FIG. 31(A), the material of the pixel electrode PX dissolves as positive ions p-ION into the liquid crystal layer. Assuming the liquid crystal layer as a solvent, the polarity of the liquid crystal layer turns to positive in accordance with the amount of the positive ions therein. Therefore the pixel electrode can hardly produce its positive ions gradually.

Figure 31B:
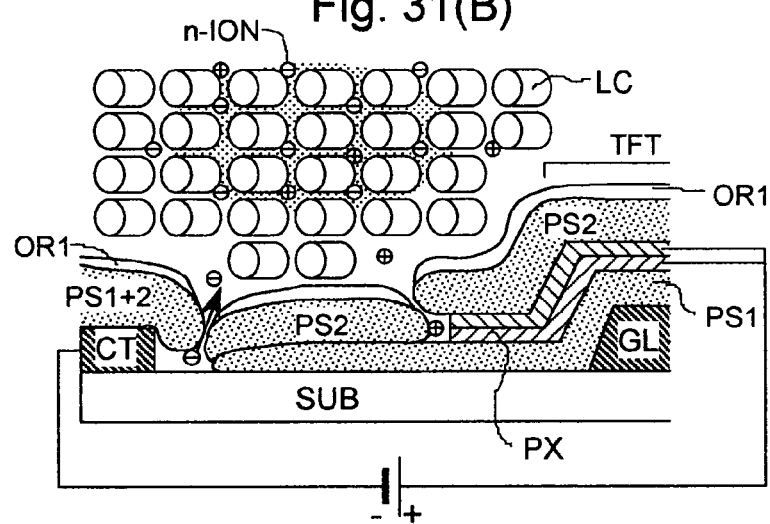
Figure 31C:
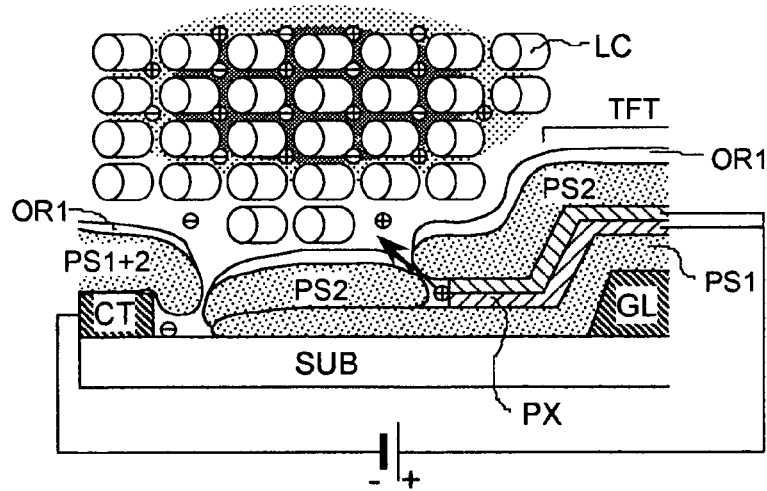

But the counter electrode CT of negative potential is also exposed to the liquid crystal layer, and its polarity turned to positive induce the counter electrode CT to dissolve as negative ions n-ION into the liquid crystal as shown in FIG. 31(B). Consequently the contamination of the liquid crystal layer is enhanced, and its resistance drops partially (dark colored region).

The excess of negative ions turns the polarity of the liquid crystal layer and induce the pixel electrode PX to dissolve as positive ions again. As FIG. 31(C) shows, the contamination and the resistance drop of the liquid crystal layer become significant (as darker colored region shows), and generate a leakage current between both of the electrodes PX and CT. Therefore, maintaining a voltage difference for controlling liquid crystal molecules' orientation between these electrodes becomes difficult. For an example of a displaying manner called "Normally black type" (reducing optical transmittance of pixel as reducing an electric field applied to its liquid crystal layer), an unexpected black spot appears in a pixel region passing light therethrough.

The preceding explanation is simplified in terms of steps whereas the actual phenomenon is considered to continuously proceed by variation of fine deviation from equilibrium of polarity in the liquid crystal layer.

According to the fact and the phenomenon mentioned above, the inventors have considered another advantage in the fifth embodiment of FIG. 22. By virtue of the crossing angle θA and the joining angle θB being obtuse angles as shown in FIG. 22, the ability of the passivation films PS1 and PS2 of covering the wiring lines and electrodes is increased, which makes it possible to prevent a failure of display unevenness due to an electrolytic reaction between the wiring lines or between the electrodes.

Therefore, by making the crossing angle θA and the joining angle θB obtuse angles, the voltage reduction in the liquid crystal layer by its contamination can be prevented and the liquid crystal display device is not affected by the display failure. If these corners have right angles, the film is not deposited at these corners sufficiently by CVD or the like and small holes are formed there. These small holes have been formed to generate the contamination in the liquid crystal layer.

Figure 32:
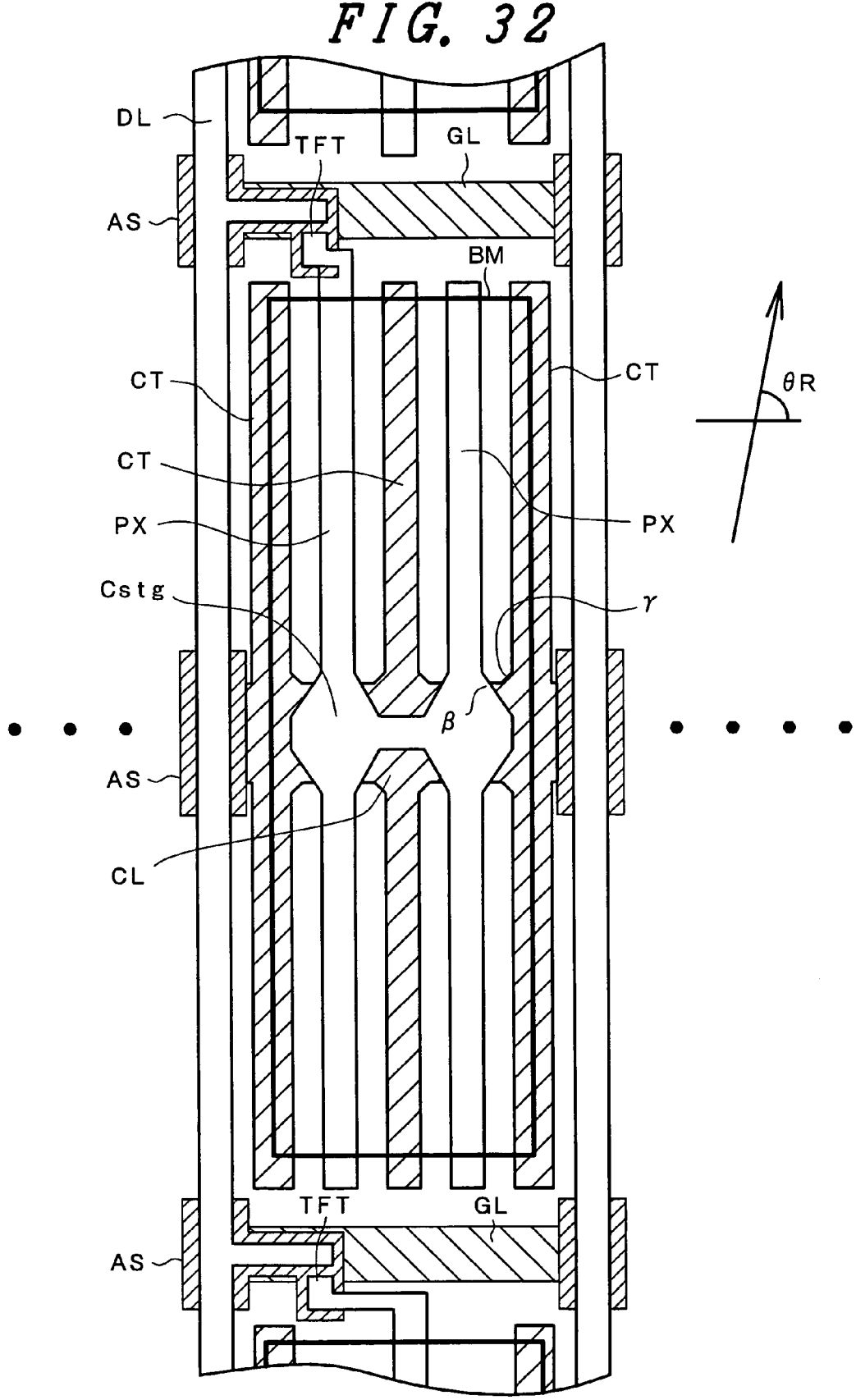
FIG. 32 is a schematic plan view of one pixel that is enclosed by a light shield film, that is, the main structure of a liquid crystal display device according to an eighth embodiment of the invention.
Figure 33:
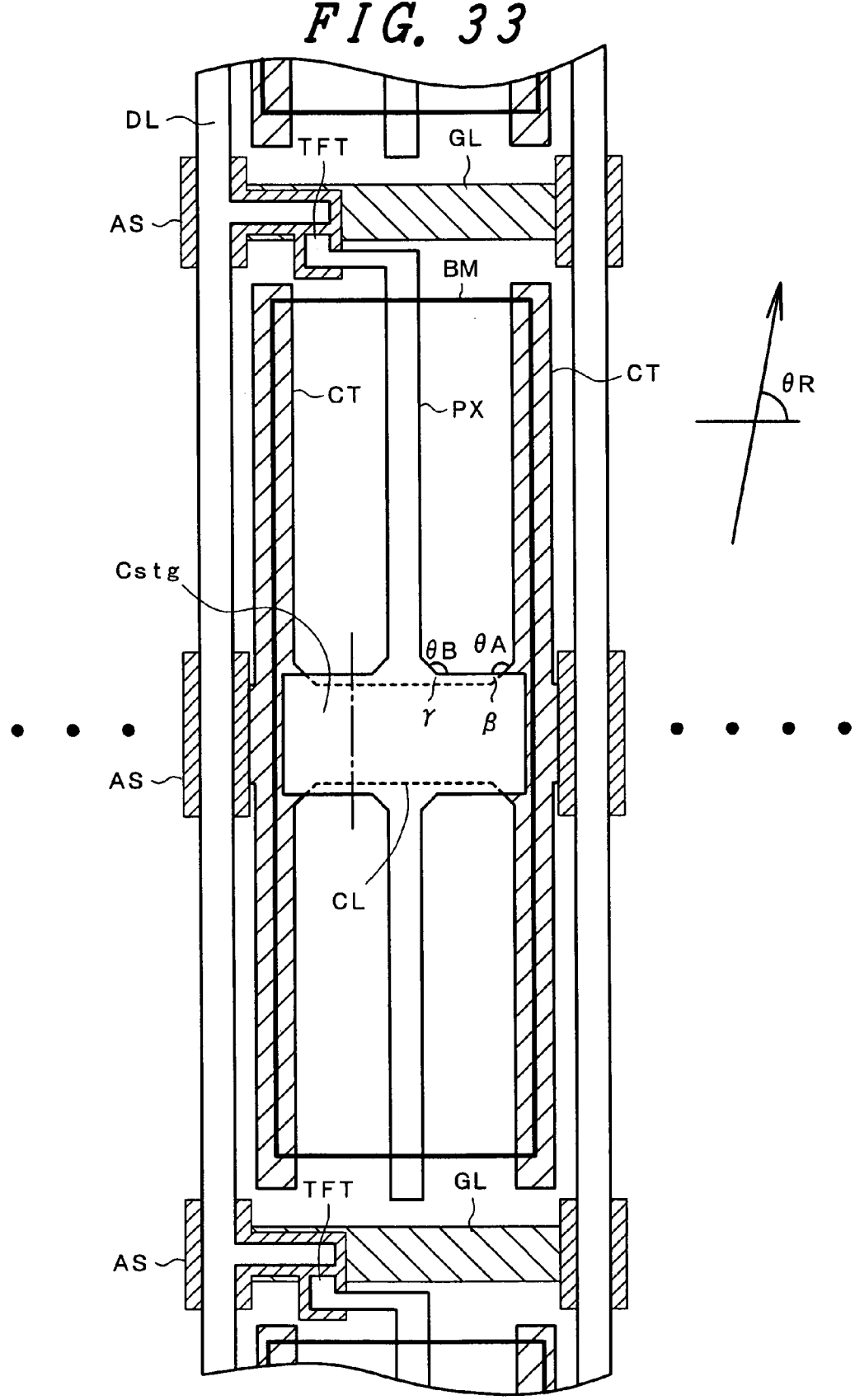
FIG. 33 is a schematic plan view of one pixel that is enclosed by a light shield film, that is, the main structure of a liquid crystal display device according to a ninth embodiment of the invention.

FIG. 32 is a schematic plan view of one pixel that is enclosed by a light shield film, that is, the main structure of a liquid crystal display device according to an eighth embodiment of the invention. This embodiment has the same configuration as the fifth embodiment of FIG. 22 other than the numbers of comb-teeth portions of pixel electrodes PX and counter electrodes CT are increased. This configuration is suitable for a liquid crystal display device having a large screen. FIG. 33 is a schematic plan view of one pixel that is enclosed by a light shield film, that is, the main structure of a liquid crystal display device according to a ninth embodiment of the invention. In the sixth embodiment, if right angles or acute angles are formed at the crossing portions β of the counter voltage signal line CL and the storage capacitor Cstg and the joining portions γ of the pixel electrode PX and the storage capacitor Cstg as shown in FIG. 23, it is difficult to form the passivation films PS1 and PS2 smoothly and a rubbing defect may occur. Accordingly, in this embodiment, as in the case of the fifth embodiment, the crossing angle θA and the joining angle θB at the wiring crossing portions β and the wiring joining portions γ, respectively, that are exposed in the opening of the light shield film BM are made obtuse angles (smaller than 180°). As a result, the passivation films can be formed smoothly in the vicinity of the wiring crossing portions β and the wiring joining portions γ. Therefore, the level differences can be reduced and the occurrence of a rubbing defect can be prevented.

Further, by virtue of the crossing angle θA and the joining angle θB being obtuse angles, the ability of the passivation films PS1 and PS2 to cover the wiring lines and electrodes is increased, which makes it possible to prevent a failure of display unevenness due to an electrolytic reaction between the wiring lines or between the electrodes.

Figure 34:
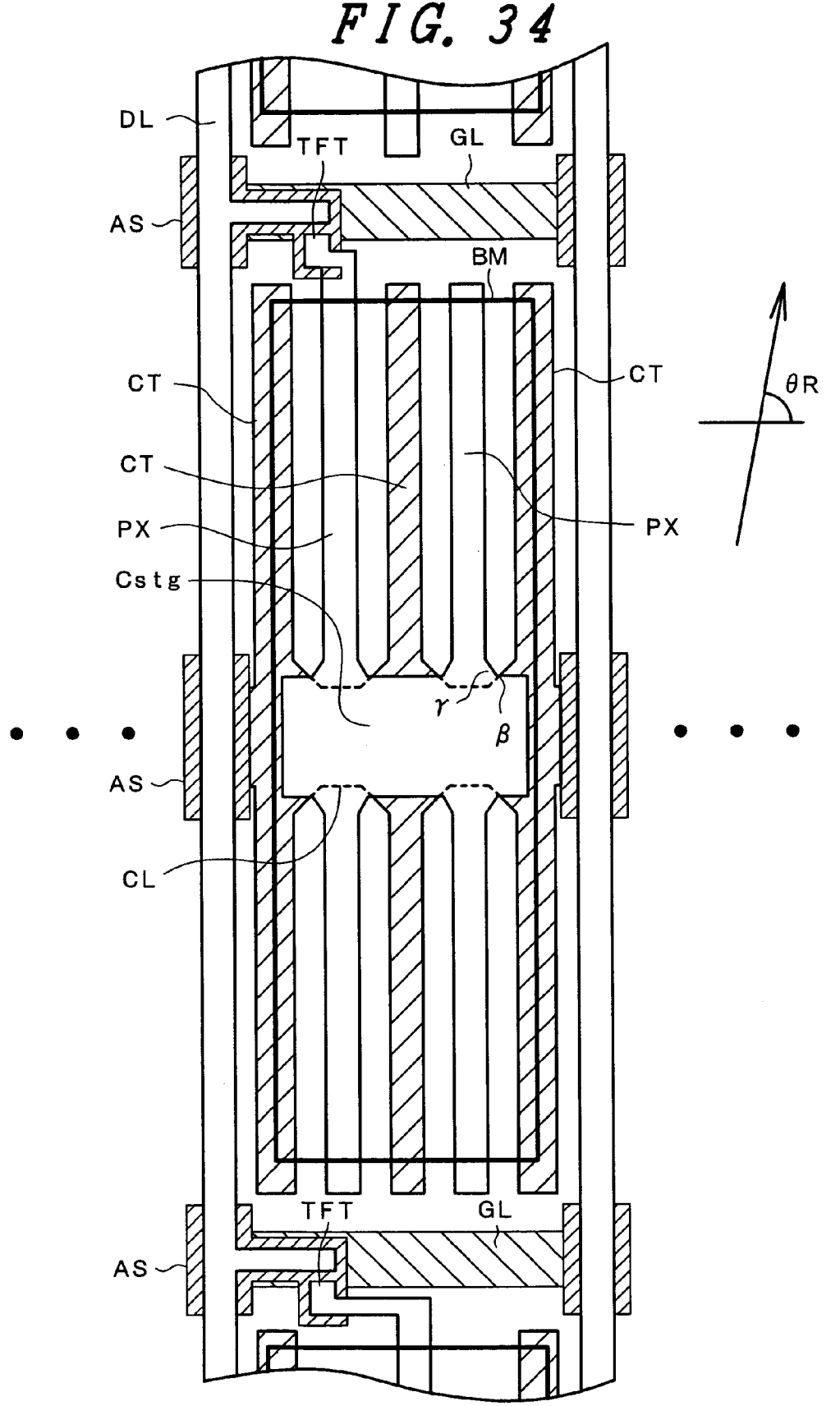
FIG. 34 is a schematic plan view of one pixel that is enclosed by a light shield film, that is, the main structure of a liquid crystal display device according to a 10th embodiment of the invention.

FIG. 34 is a schematic plan view of one pixel that is enclosed by a light shield film, that is, the main structure of a liquid crystal display device according to a tenth embodiment of the invention. This embodiment has the same configuration as the ninth embodiment of FIG. 33 except that the numbers of comb-teeth portions of pixel electrodes PX and counter electrodes CT are increased. This configuration is suitable for a liquid crystal display device having a large screen.

Considering the relationship between the preceding results shown in FIGS. 29 and 30 and the phenomenon explained by FIGS. 31(A) through 31(C), the inventors recognized that the structures of the fifth, eighth, ninth, and tenth embodiments can be simplified while serving to prevent the display failure mentioned previously. For example, the structure of the fifth embodiment can be simplified as following two structures. One structure joins the counter electrode CT to the counter voltage signal line CL at an obtuse angle, i.e. an angle larger than 90 degrees as shown in FIG. 35(A), and the other structure forms a corner appearing in the portion at which the pixel electrode PX crosses over or under the counter voltage signal line CL, with an obtuse angle as shown in FIG. 35(B).

For explaining the basis for these variations, consideration is given to the holes on the insulating films as shown in FIGS. 29(C) and 30(C). As both a cross sectional image of 29C-29C in FIG. 29(C) and a cross sectional image of plate 30C in FIG. 30(C) show, in the process for forming the protective films on surfaces having a different heights, the protective film PS1H or PS2H growing on a higher surface covers a lower surface around the corner before the protective film PS1L or PS2L growing on the lower surface arrives at the corner. Therefore, the protective film PS1L or PS2L growing on the lower surface cannot arrive at the corner. On the other hand, each of the protective films has its front of growth that is curled along arrows shown in its cross section. The curled front of growth prevent each of protective films PS1H, PS2H growing on the higher surfaces from reaching the lower surface even if it is pushed out from the higher surface and extending above the lower surface. Such behavior of the protective films prevent both of the protective films growing on higher and lower surface from joining each other tightly, and consequently the above-mentioned hole (gap) appears at the interface between these protective films.

According to this fact, it is necessary to take measures in the viewpoint (1) for suppressing growth rate of the protective film on higher surface around its corner, and in the viewpoint (2) for promoting growth rate of the protective film on lower surface. The viewpoint (1) is to prevent the protective film on the higher surface from being pushed out extremely at the corner, and the viewpoint (2) is to enable a growth front of the protective film on the lower surface to reach the corner before it is covered by another protective film pushed out from the higher surface. Both structures in FIGS. 35(A) and 35(B) are suitable for these purposes.

Figure 35A:
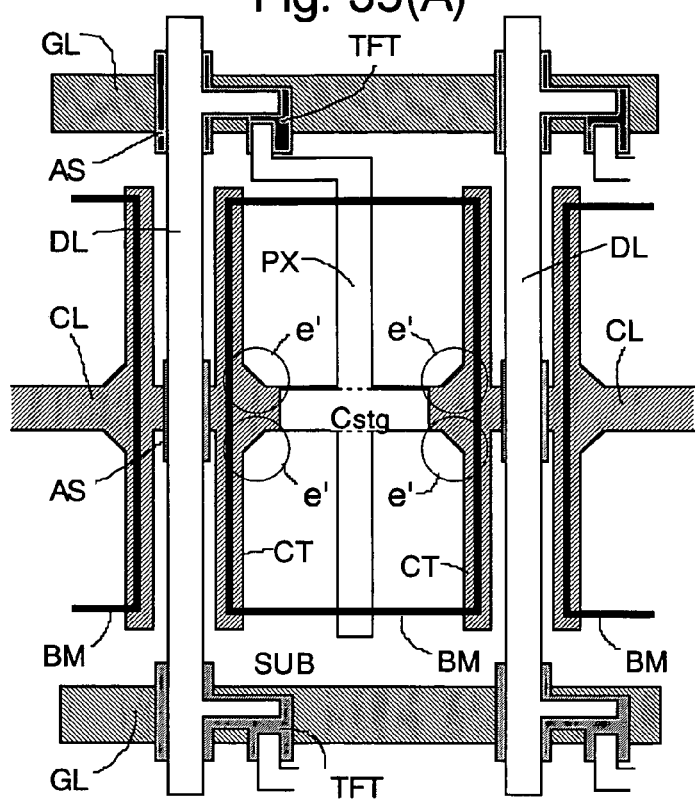
FIGS. 35(A) and 35(B) are plan views of two kinds of the electrode structure for solving the display failure caused by the reduction of the liquid crystal driving voltage.
Figure 35B:
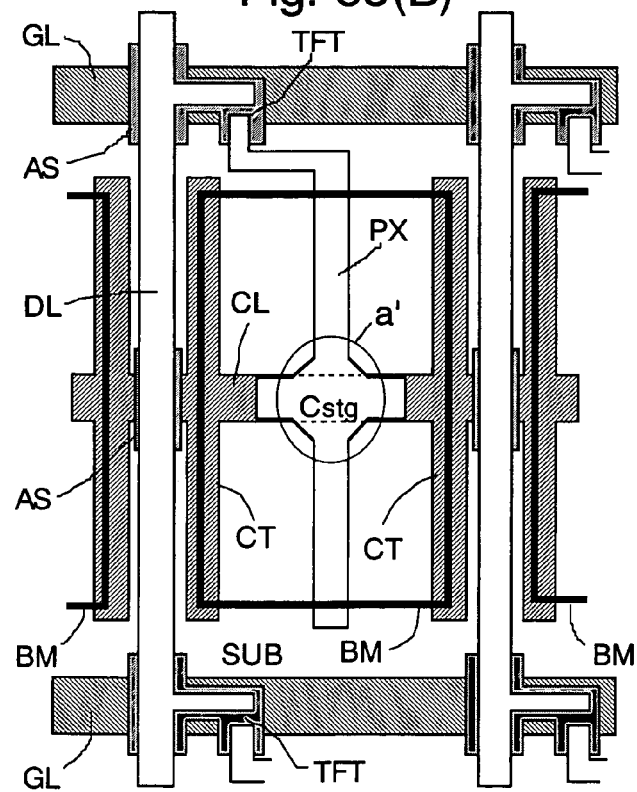

As to the viewpoint (1), on each surface of two layers joining (see CT and CL in FIG. 35(A)) or crossing (see CL and PX in FIG. 35(B)) at a portion, the protective film grows on independently and extends towards the portion (e' or a'). The protective films grown from these surfaces respectively run into each other at the portion, accelerate their growth rate, and are pushed out from the surface of the portion finally. Both of the structures in FIGS. 35(A) and 35(B) enlarge the surface of the portion sufficiently to avoid such a pushing out by setting the joining or crossing angle obtuse.

As to the viewpoint (2), assuming the surface (SUB) having two objects joining (CT and CL in FIG. 35(A)) or crossing (CL and PX in FIG. 35(B)) above its surface, two objects become an obstacle for the protective film growing on the rest of the surface (SUB). As shown in cross sectional images of FIGS. 29(C) and 30(C), the growth front of the protective film is so roundish that it can hardly reach to the corner of walls, if the corner is formed by the objects joining or crossing at right angles or an acute angle. As both of the structures in FIGS. 35(A) and 35(B) have the corner formed of obtuse angles, the corner resembles the growth front of the protective film rather. Thus, it becomes easier for the growth front to reach the corner.

Based on above studies, the following structure also can be recommended for solving the problem of the display failure.

Figure 36A:
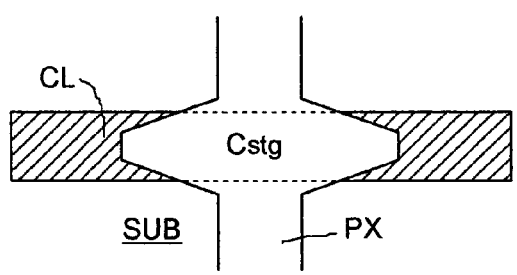
FIGS. 36 through 38 are partial plan views of the other electrode structures for solving the display failure caused by the reduction of the liquid crystal driving voltage.
Figure 36B:
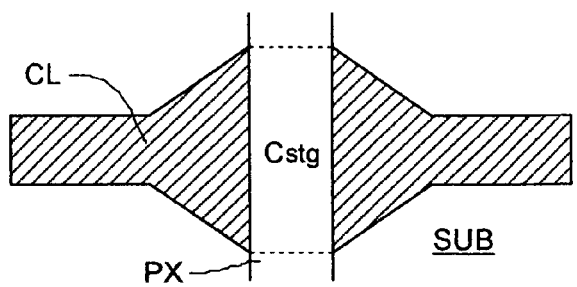

First, the structures having modified crossing shape of the pixel electrode PX and the counter voltage signal line CT in a circled portion a' of FIG. 35(B) are shown in FIGS. 36(A) and 36(B). Both structures are also suitable to enhance a capacity for stabilizing potential of the pixel electrode (called "additional capacitance" or "storage capacitor" also) by enlarging each portion of the pixel electrode PX and the counter electrode CT facing via an insulating layer each other.

The structure of FIG. 36(A) joins the pixel electrode to its branches at one obtuse angle for each corner in contrast to that of FIG. 35(B) forming two obtuse angles for each corner. The structure of FIG. 36(B) enlarges the width of the counter voltage signal line CL with its obtuse angled corner around the crossing instead of forming branches of the pixel electrode PX in that of FIG. 35(B). Both structures are also suitable for prevention for the alignment defects mentioned previously.

Figure 37:
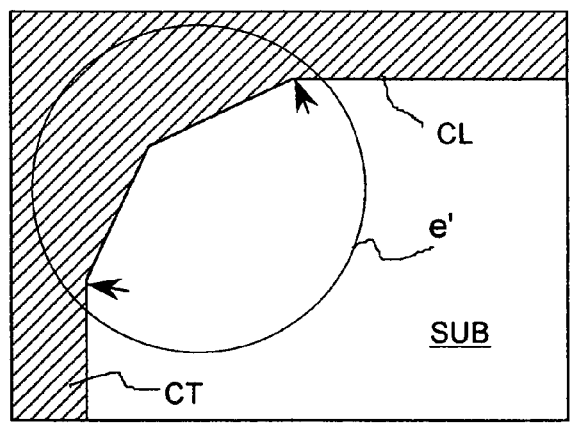

Next, based on the consideration of the viewpoint (2), the number of obtuse angles in the corner of the joining portions e' in FIG. 35(A) or the crossing portion a' in FIG. 35(B) can increase more than two. FIG. 37 shows a part of the structure joining the counter electrode CT to the counter voltage signal line CL in FIG. 35(A) at the corner consisting of three obtuse angles. It is clear from FIG. 37 that by increasing the number of obtuse angles in the joining corner, its shape more closely resembles the growth front of the protective film on the substrate so that the protective film can reach the corner more easily. Therefore, the corner consisting of infinite number of obtuse angles, i.e. the curved corner also helps the protective film reach to the corner and prevents a hole from appearing at the corner.

Figure 38A:
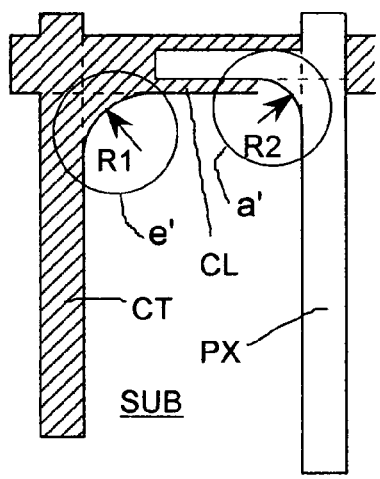
Figure 38B:
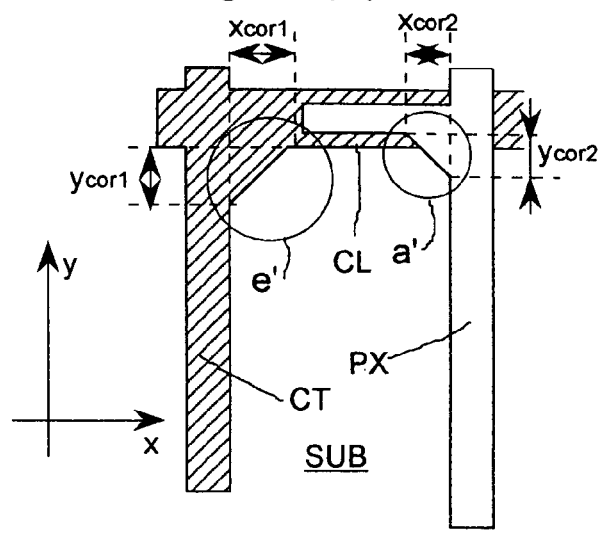

FIG. 38(A) shows the electrode structure having curved corners at the joining portion e' of FIG. 35(A) and the crossing portion a' of FIG. 35(B), partially. Further consideration for more preferable condition for embodying this structure is mentioned as follows. One of its criteria is a radius of the curvature of the corner. Consideration for preferable radii R1 and R2 in FIG. 38(A) is carried out referring FIG. 38(B). Extrapolating the edge of conductive layer CL along x-axis and the edges of conducting layer CT and PX along y-axis, each distance from the crossing point of extrapolated lines to the obtuse angle is defined as $x_{cor}$ and $y_{cor}$. In FIG. 38(B), each value has a suffix 1 for the portion e' or a suffix 2 for the portion a'. Each preferable distance is defined by the thickness of the protective layer covering the corners, and the thickness is defined for example according to the its fabrication process. For example, the distances $x_{cor1}$ and $y_{cor1}$ for portion e' are recommended to be greater than the thickness of the protective layer PS1 covering portion e', and the distances $x_{cor2}$ and $y_{cor2}$ for portion a' are recommended to be greater than the thickness of the protective layer PS2 covering portion a'. To optimize these conditions furthermore, considerations on the processing conditions for these conductive layers are recommended.

Based on present technology, each of these values of $x_{cor1}$, $x_{cor2}$, $y_{cor1}$ and $y_{cor2}$ is recommended to be equal to or greater than 4.3 µm or equal to or greater than 5.4 µm. According to such consideration, it is recommended to define the radius R1 in the same way as that for the distances $x_{cor1}$ and $y_{cor1}$, and to define the radius R2 in the same way as that for the distances $x_{cor2}$ and $y_{cor2}$ for preferred structures. Actually, the conditions for the structure of FIG. 38(A) are considered to be easier to obtain than those for the structure of FIG. 38(B).

Applying this consideration to the structure having more than two obtuse angles in the corner as FIG. 37, the values of $x_{cor}$ and $y_{cor}$ are defined by the two obtuse angles located both ends of the corner. In FIG. 37, both of the obtuse angle at one end of the corner and that at another end are indicated by arrows. Setting the values of $x_{cor}$ and $y_{cor}$ greater than the thickness T of the protective layer, these two obtuse angles are separated by the distance greater than $(2T)^{1/2}$. The same definition in this length as that of FIG. 37 can be applied to the corner whichever having a plurality of obtuse angles.

There are some possibilities for solving the problem of the display failure without employing the aforementioned structure. According to the explanation based on FIGS. 31(A) through 31(C), there are two alternative ways for solving this problem. One is to form at least one group of (1) the pixel electrode PX, or (2) the counter electrode CT and the counter voltage signal line CL of such materials called "refractory metal" as Mo, Ti, Ta, and W or its silicide. Each element or compound belonging to this group is considered to dissolve hardly into the liquid crystal layer. Another is to form one group of (1) the pixel electrode PX, or (2) the counter electrode CT and the counter voltage signal line CL of a conductive oxide. The conductive oxide like ITO ($In_2O_3$ doped with 1-5 weight % of $SnO_2$) or $SnO_2$ hardly dissolves as ions (especially, positive ions) into the liquid crystal layer. Both ways may enable the structures of FIGS. 14(A), 15, 16 and 27 to be free from the problem of the display failure, but also can be combined with the structures of FIGS. 22, 32 through 38 to confirm their reliability in the production of the liquid crystal display devices.

In contrast to these alternatives, the structures of FIGS. 22, 32 through 38 mentioned above still have great advantages. These structures permit use of such materials having high electric conductivity as Al, alloy of Al, and Cu, and such adhesive materials to the substrate etc. as Cr for electrodes and lines connected thereto. Although the liquid crystal molecules having the dielectric anisotropy higher than 20 in the absolute value are prone to be contaminated easily by the ions dissolved from the electrodes, these structures in accordance with the present inventions still maintain their reliabilities in avoiding the contamination of liquid crystal molecules themselves. Therefore, each of the above embodiments can provide a liquid crystal display device capable of producing good display quality by preventing display failures such as a contrast reduction and display unevenness.

5. The Transparent Electrode in the Pixel Region of IPS-Type LCD

During the consideration for prevention of the display failure, the inventors considered the IPS-type liquid crystal display device having a feature of forming at least one of the pixel electrode PX and the counter electrode CT of transparent conductive materials. Such a structure has been already utilized in the liquid crystal display device called "vertical electric field type" in which the counter electrode is disposed on opposite side of the liquid crystal layer to the pixel electrode so that the counter electrode faces to the pixel electrode in the pixel region. However, for the IPS-type liquid crystal display, both of optical transmittances of the pixel electrode and the counter electrode are kept lower than in the vertical electric field type.

Figure 39:
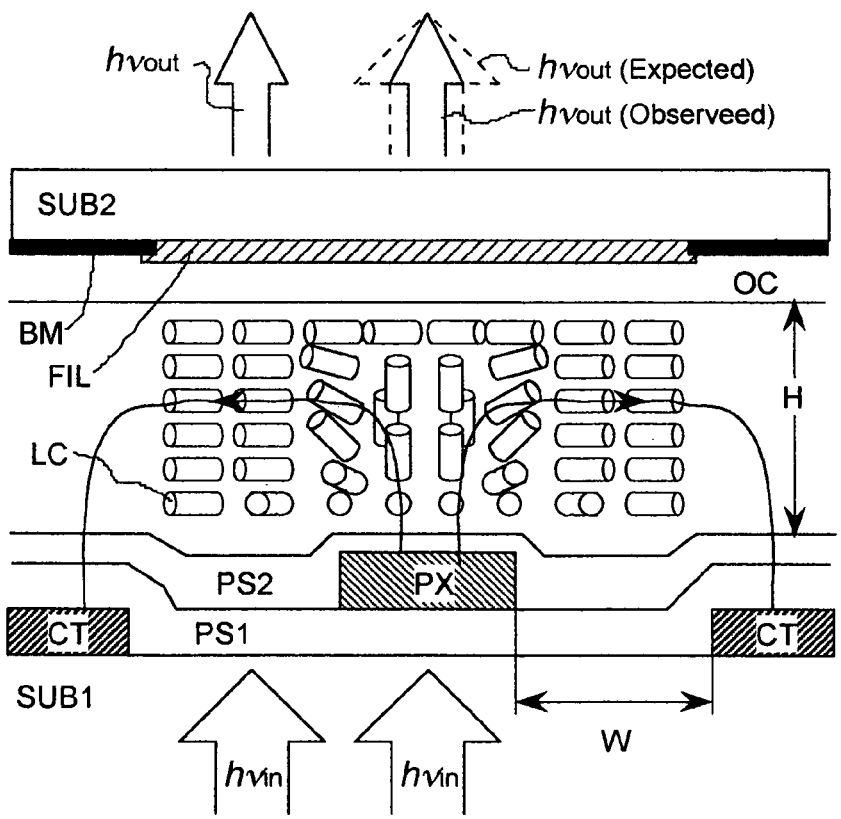
FIG. 39 is a cross sectional image for explaining optical transmittance in the IPS-type liquid crystal display device.

In the IPS-type, the electric field to control orientation of liquid crystal molecules LC is applied to the liquid crystal layer so as to have a main component substantially in parallel to a main surface of the substrates SUB1, SUB2, as shown by curved lines with arrows in FIG. 39. Therefore, both of main surfaces of the substrates have spaces in the pixel region above which no conductive layer is disposed and orientations of liquid crystal molecules between these spaces determine an optical transmittance of the pixel region. For this driving manner, the distance W separating the pixel electrode PX from the counter electrode CT is larger than the closest distance H between the substrates SUB1, SUB2 in the IPS-type liquid crystal display device. A conductive layer in this explanation is defined as the layer of the pixel electrode PX, or the counter electrode CT which is used for applying an electric field or carrying an electric signal. But there are two other layers which may possibly be considered conductive or not. One is a light-shielding layer called "black matrix" BM having an opening that defines the pixel region. Another is a layer called "color filter" FIL surrounded by the black matrix laterally and which transmits light in a specific wavelength range. In order to forming the electric field shown in FIG. 39, it is preferable to keep the resistance of the black matrix BM not smaller than $10^6$ $\Omega \cdot cm$, and to keep each resistance of the layers surrounding the color filter FIL in the pixel region larger than that of the black matrix BM.

In spite of these structure, simulated data show that the electric field above the pixel electrode extends almost vertically to the substrate SUB2, like that of vertical electric field type. The density of electric fields above the pixel electrodes higher than that between the electrodes PX and CT. Therefore, reducing the intensity of incident light of $hv_{in}$ (shown with a size of an arrow) and emitting light of $hv_{out}$ between the electrodes PX and CT by controlling the optical transmittance of the liquid crystal layer, it is expected that the optical transmittance above the pixel electrode PX cannot be reduced as that between the electrodes and the output intensity of $hv_{out}$ extremely higher (shown with a dotted arrow) than that between the electrodes. According to this expectation, the light passing through the pixel electrode PX makes gray shade displaying impossible. In spite of this expectation, the inventors determined that the pixel electrode PX of transparent conductive material does not affect fine-controlled gray shade displaying function, but rather improve luminance of the pixel region.

The transparent conductive material mentioned herein is not necessarily a material transmitting incident light thereto completely, and can be defined as a conductive material having less optical absorption than the other conductive materials disposed around. One of its definitions is described as a material having higher optical transmittance for incident visible light than 70% and preferably 80% and electric conductivity equal to or higher than that of semiconductor material. The visible light is defined to have its wavelength in a range from 380 nm to 770 nm.

Figure 40A:
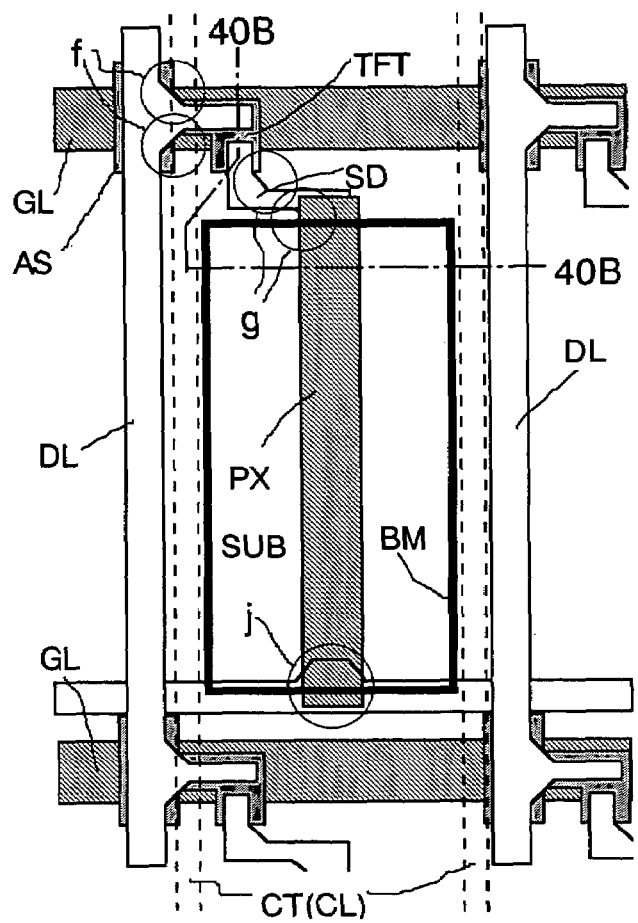
FIGS. 40(A) and 40(B) are a plan view and its cross sectional image showing further variation of the invented liquid crystal display device.

As the definition grade of the liquid crystal display device goes higher, the above mentioned display failure by the reduction of driving voltage applied to the liquid crystal layer may appear outside of the pixel region defined by the opening of the black matrix BM. FIG. 40(A) shows the electrode structures of an eleventh embodiment of the invention suitable for this circumstance. Although the liquid crystal display device of this structure is called IPS-type since a component of the electric field is substantially parallel to the surface of the substrate, its counter electrodes CT are disposed on opposite side of the liquid crystal layer to the pixel electrode. The counter electrode CT is shown as dot line in FIG. 40(A).

Figure 40B:
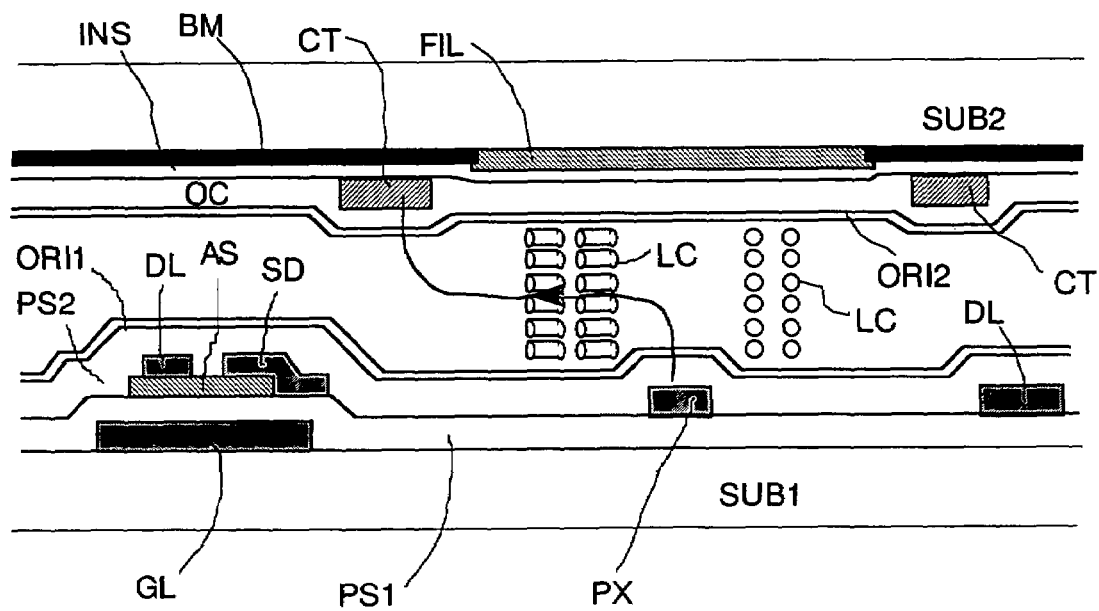

As FIG. 40(B) which is a cross sectional image of 40B-40B in FIG. 40(A) shows, there are spaces under the opening of the black mask BM where any conductive layer as the pixel electrode PX, the common capacitance line CC forming a storage capacitance with the pixel electrode, or the counter electrode CT is not disposed on both of the substrates. The counter electrode CT is disposed between two insulating layers OC (explained above) and INS, so as to insulated from the black matrix BM. The pixel electrode PX formed of a transparent conductive material is connected to the metal layer SD at its end so as to attain an ohmic contact sufficiently to the channel layer (a-Si) AS of the transistor TFT.

In the higher definition display, many pixels having the electrode structures are arranged densely to form a pixel array (an entire matrix portion AR, see FIGS. 5, 8). The previous consideration paid attention to the contamination inside the pixel region. However, the higher definition display requires its pixels to be so small and densely arranged that the contamination may happen between the pixels. Thus, it is necessary to consider conductive layers having corner disposed in the pixel array facing the liquid crystal layer.

Reviewing such a wide range, the voltage differences to be noticed appear between the video signal line (DL) and the pixel electrode PX, between the pixel electrode PX and the common capacitance line CC. Therefore each of the corners in circled portions f, g, j in FIG. 40(A) is formed with an obtuse angle. Forming the pixel electrode PX of a transparent conductive material as ITO, is preferred so as to obtain sufficient luminance from the small pixel, but disposing the metal layer SD between the pixel electrode PX and the transistor TFT is still effective. The corners of the common capacitance line CC in circled portion j (forming a T-shaped crossing with the pixel electrode PX) also prevent the alignment defects.

The structure of FIG. 40(A) has some points in common with that of the vertical electric field type liquid crystal display. That is, this structure can be easily modified to embodying in the vertical electric field type liquid crystal display. And the structure of FIG. 40(A) will be effective for the liquid crystal display device of higher definition grade than that of XGA-grade (1024 pixels along gate line and 768 pixels along video signal line), as UXGA-grade (1600 pixels along gate line and 1280 pixels along video signal line). Because the number of pixels along gate line will be three times of the number defined above in this standard, the higher definition standard (especially beyond the UXGA-grade) requires each size of the pixel regions to be smaller.

As already described above, the application range of the invention is not limited to the above-described lateral electric field type active matrix liquid crystal display device, and the invention can also be utilized to prevent alignment defects of alignment films in the vertical electric field type or simple matrix liquid crystal display device.

As described above, according to the invention, a liquid crystal display device having good image quality can be provided in which an alignment defect does not occur at steps of a storage capacitor portion formed in each pixel region, the contrast is increased, and there is no display unevenness.

Finally, each of the discussed structures for solving the alignment defects (the rubbing failure), for solving the display failure (the contamination of liquid crystal layer), and for forming the pixel electrode of a transparent conductive material can be embodied individually or in combinations. However, to meet the demand from the production facilities, or the performance required to the liquid crystal display these structures can be combined properly. Any manner of these combinations will not deteriorate the merit of each structure to be combined.

What is claimed is:

1. A display device comprising:
   a first substrate and a second substrate;
   a plurality of video signal lines, a plurality of gate signal lines, and a plurality of counter voltage signal lines formed on the first substrate;
   a plurality of pixel electrodes formed on the first substrate;
   a plurality of counter electrodes formed on the first substrate and connected to the counter voltage signal lines;
   a plurality of thin film transistors formed on the first substrate;
   a plurality of pixels, each pixel including a pixel electrode of the plurality of pixel electrodes, a part of at least one counter electrode of the plurality of counter electrodes, and a thin film transistor of the plurality of thin film transistors;
   wherein the thin film transistor includes a first semiconductor layer, a drain electrode electrically connected to a drain signal line, and a source electrode electrically connected to the pixel electrode; and
   wherein the first semiconductor layer has an edge protruding from the gate signal line, the protruding edge is positioned under the pixel electrode in plan view, and the pixel electrode is connected to the first semiconductor layer on the protruding edge;
   wherein the pixel electrode and the counter electrode intersect at a center of the pixel; and
   wherein a second semiconductor layer is arranged between one of the counter electrode signal lines and one of the video signal lines, the second semiconductor layer being arranged at a position where the one of the counter electrode signal lines and the one of the video signal lines cross in plan view, the one of the counter electrode signal lines being arranged at the center of the pixel and extending in parallel to the gate signal lines.

2. A display device according to claim 1, wherein a black matrix is formed on the second substrate, and the protruding edge is overlapped with the black matrix in plan view.

3. A display device according to claim 2, wherein the display device is liquid crystal display device.

4. A display device according to claim 1, wherein the second semiconductor layer which is arranged at the position where the one of the counter electrode signal lines which is arranged at the center of the pixel and the one of the video signal lines cross in plan view has a width which is wider than a width of the one of the video signal lines.

5. A display device comprising:
   first substrate and second substrate;
   a plurality of video signal lines, a plurality of gate signal lines, and a plurality of counter voltage signal lines formed on the first substrate;
   a plurality of pixel electrodes formed the first substrate;
   a plurality of counter electrodes formed on the first substrate and connected to the counter voltage signal lines;
   a plurality of thin film transistors formed on the first substrate;
   a plurality of pixels, each pixel including a pixel electrode of the plurality of pixel electrodes, a part of at least one counter electrode of the plurality of counter electrodes, and a thin film transistor of the plurality of thin film transistors;
   wherein the thin film transistor includes a first semiconductor layer, a drain electrode electrically connected to a drain signal line, and a source electrode electrically connected to the pixel electrode;
   wherein the first semiconductor layer has a protruding corner from the gate signal line, the protruding corner is positioned under the pixel electrode in plan view, and the pixel electrode is connected to the first semiconductor layer on the protruding corner;
   wherein the pixel electrode and the counter electrode intersect at a center of the pixel; and
   wherein a second semiconductor layer is arranged between one of the counter electrode signal lines and one of the video signal lines, the second semiconductor layer being arranged at a position where the one of the counter electrode signal lines and the one of the video signal lines cross in plan view, the one of the counter electrode signal lines being arranged at the center of the pixel and extending in parallel to the gate signal lines.

6. A display device according to claim 5, wherein a black matrix is formed on the second substrate, and the protruding corner is overlapped with the black matrix in plan view.

7. A display device according to claim 6, wherein the display device is liquid crystal display device.

8. A display device according to claim 5, wherein the second semiconductor layer which is arranged at the position where the one of the counter electrode signal lines which is arranged at the center of the pixel and the one of the video signal lines cross in plan view has a width which is wider than a width of the one of the video signal lines.

* * * * *